US012669590B2

(12) United States Patent
Ikeda

(10) Patent No.: US 12,669,590 B2
(45) Date of Patent: Jun. 30, 2026

(54) PHOTODETECTION DEVICE AND PHOTODETECTION SYSTEM

(71) Applicant: SONY SEMICONDUCTOR SOLUTIONS CORPORATION, Kanagawa (JP)

(72) Inventor: Yasuji Ikeda, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 683 days.

(21) Appl. No.: 18/249,387

(22) PCT Filed: Sep. 2, 2021

(86) PCT No.: PCT/JP2021/032246
§ 371 (c)(1),
(2) Date: Apr. 18, 2023

(87) PCT Pub. No.: WO2022/091573
PCT Pub. Date: May 5, 2022

(65) Prior Publication Data
US 2024/0111033 A1 Apr. 4, 2024

(30) Foreign Application Priority Data
Oct. 26, 2020 (JP) ................................. 2020-179257

(51) Int. Cl.
*G01S 7/48* (2006.01)
*G01S 7/481* (2006.01)
(Continued)

(52) U.S. Cl.
CPC .......... *G01S 7/4863* (2013.01); *G01S 7/4816* (2013.01); *G01S 7/487* (2013.01)

(58) Field of Classification Search
None
See application file for complete search history.

(56) References Cited

U.S. PATENT DOCUMENTS

2020/0174105 A1 6/2020 Yin et al.
2020/0233068 A1 7/2020 Henderson et al.

FOREIGN PATENT DOCUMENTS

JP 2019-009221 A 1/2019

OTHER PUBLICATIONS

International Search Report and Written Opinion of PCT Application No. PCT/JP2021/032246, issued on Nov. 9, 2021, 09 pages of ISRWO.

*Primary Examiner* — Hovhannes Baghdasaryan
(74) *Attorney, Agent, or Firm* — CHIP LAW GROUP

(57) ABSTRACT

A photodetection device according to the present disclosure includes a plurality of light-receiving sections that each generates a pulse signal including a pulse corresponding to a result of light reception, a plurality of edge detectors that each generates a detection signal by detecting an edge of the pulse in the pulse signal generated by a corresponding light-receiving section, and an adder that generates a detection value indicating number of the pulses on the basis of a plurality of the detection signals. The edge detectors each include a first latch circuit that generates a first signal by latching the pulse signal on the basis of a first clock signal, a second latch circuit that generates a second signal by latching the first signal on the basis of a second clock signal that is an inverted signal of the first clock signal, a combination circuit that generates a third signal on the basis of the pulse signal, the first signal, and the second signal, and a third latch circuit that generates the detection signal by latching the third signal on the basis of the first clock signal.

19 Claims, 20 Drawing Sheets

(51) Int. Cl.
    *G01S 7/4863*         (2020.01)
    *G01S 7/487*          (2006.01)

[FIG. 1]
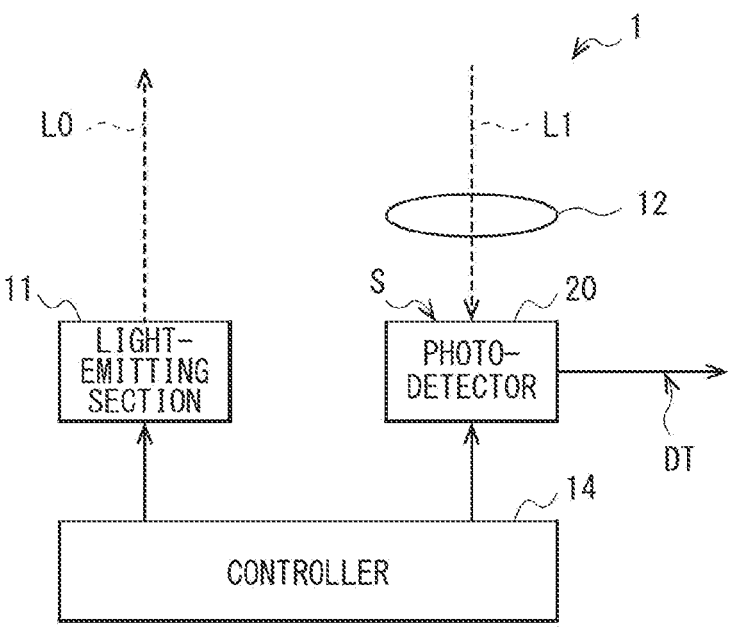
[FIG. 2]
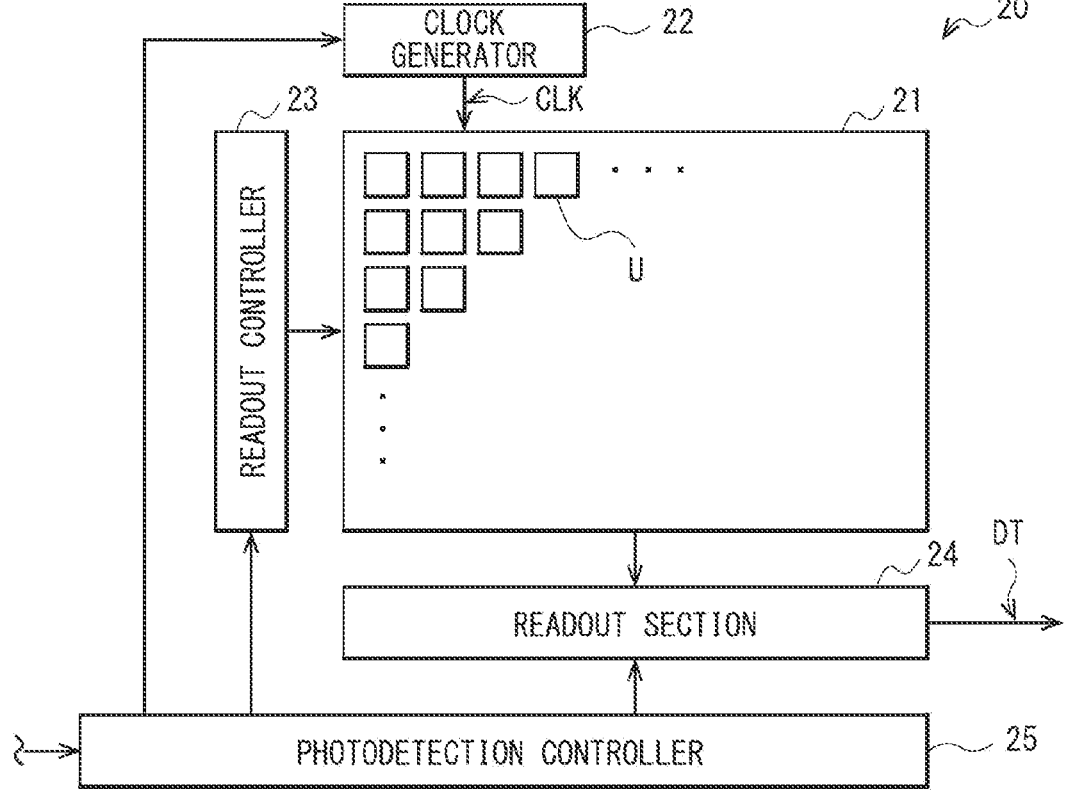

[FIG. 3]
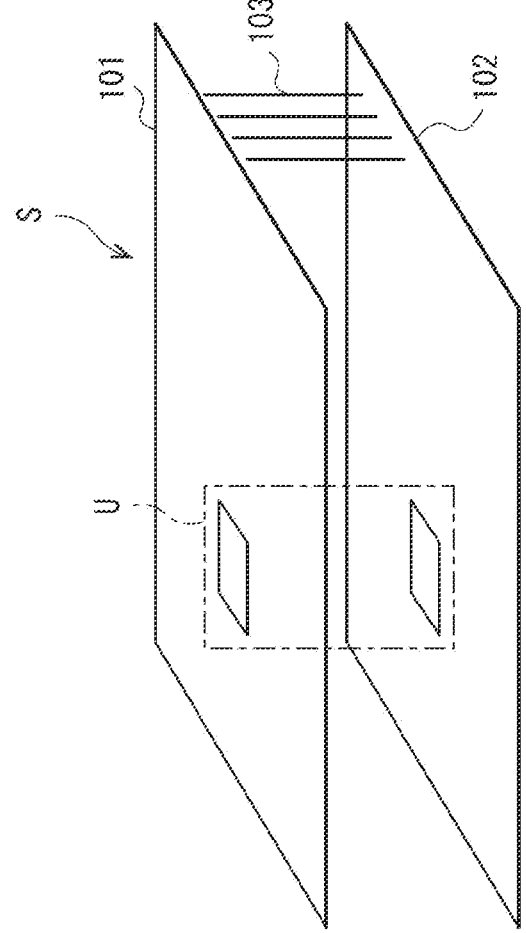

[FIG. 4]
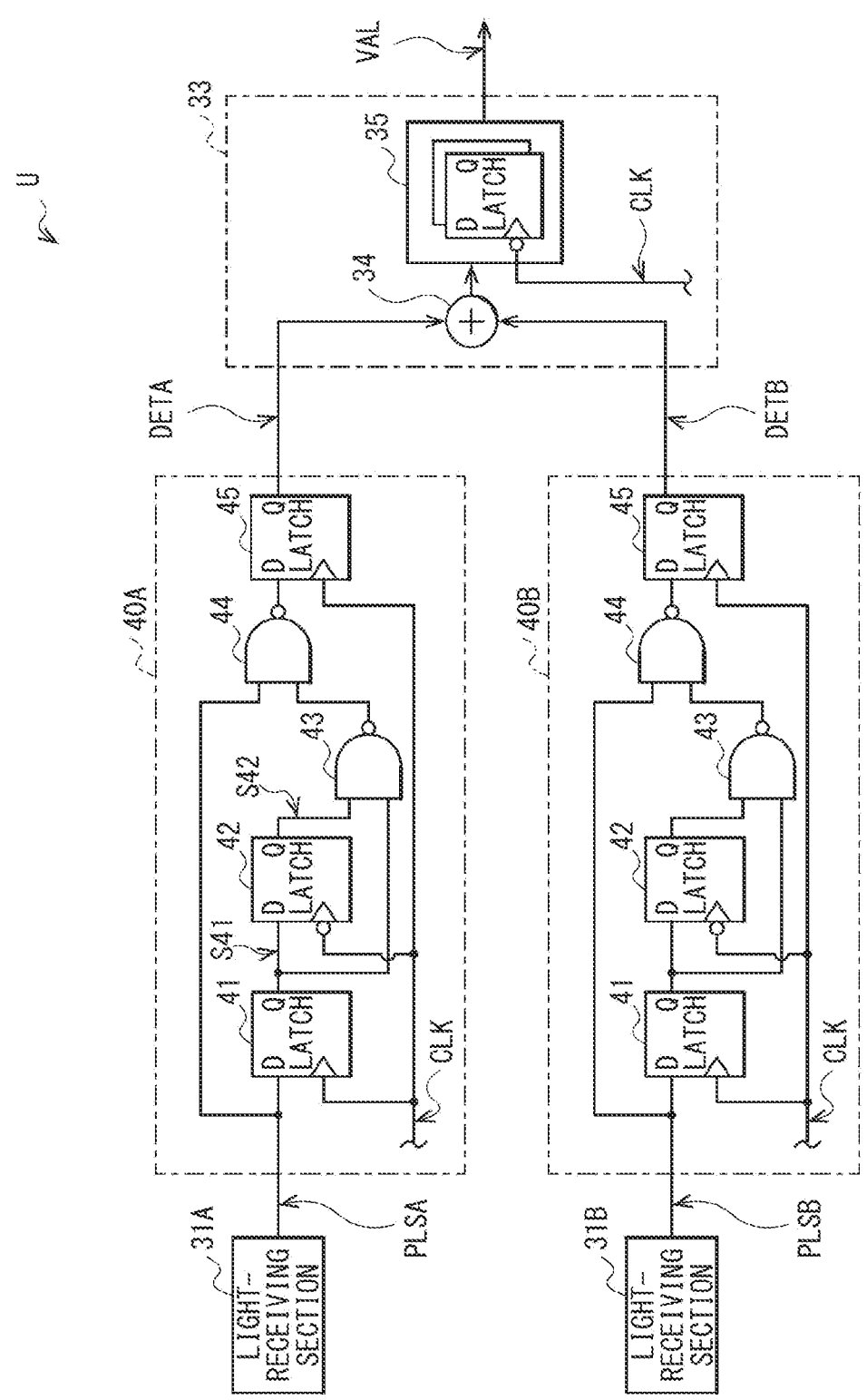

[FIG. 5]
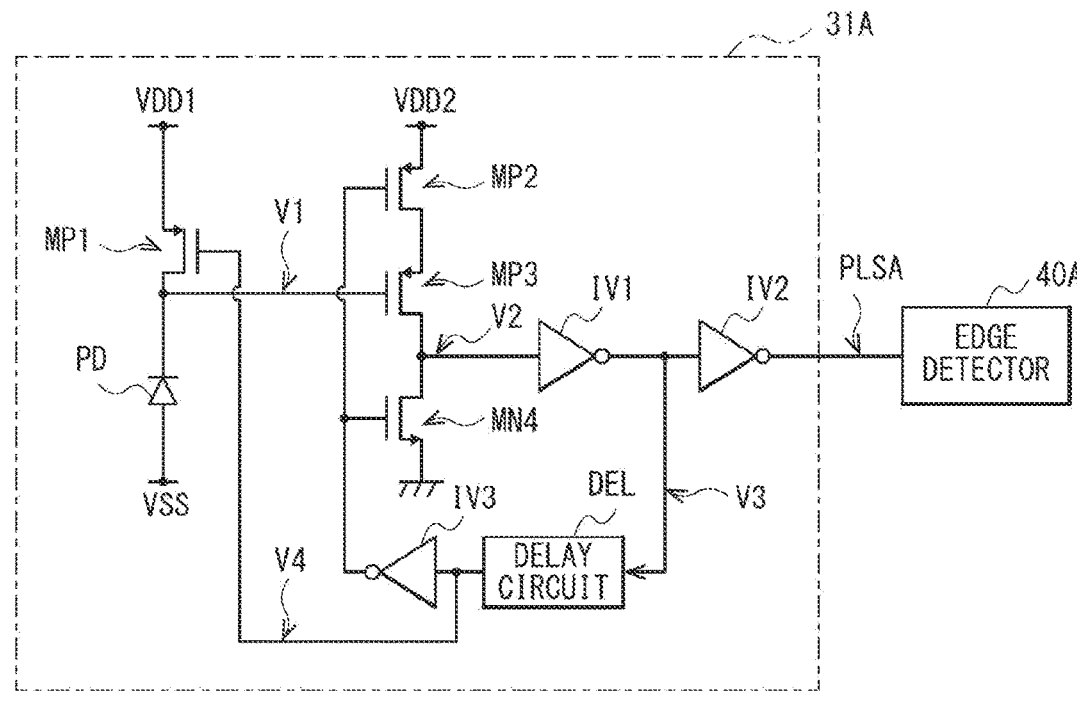
[FIG. 6A]   CATHODE VOLTAGE V1
[FIG. 6B]   VOLTAGE V2
[FIG. 6C]   VOLTAGE V3
[FIG. 6D]   VOLTAGE V4
[FIG. 6E]   PULSE SIGNAL PLSA
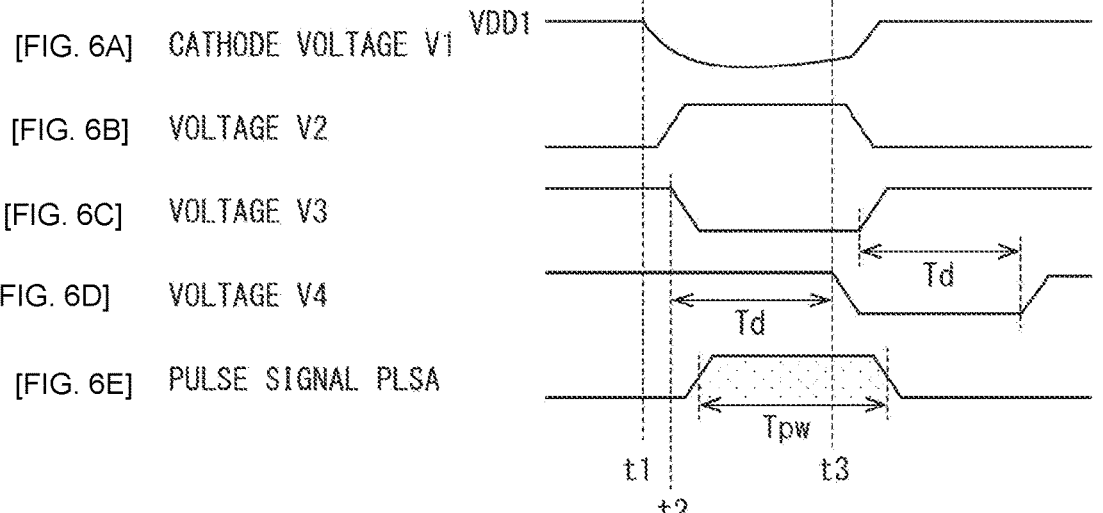

[FIG. 7]
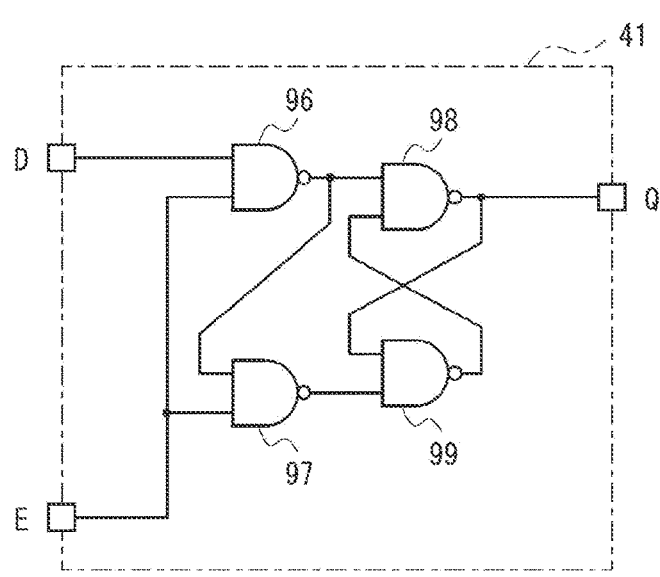
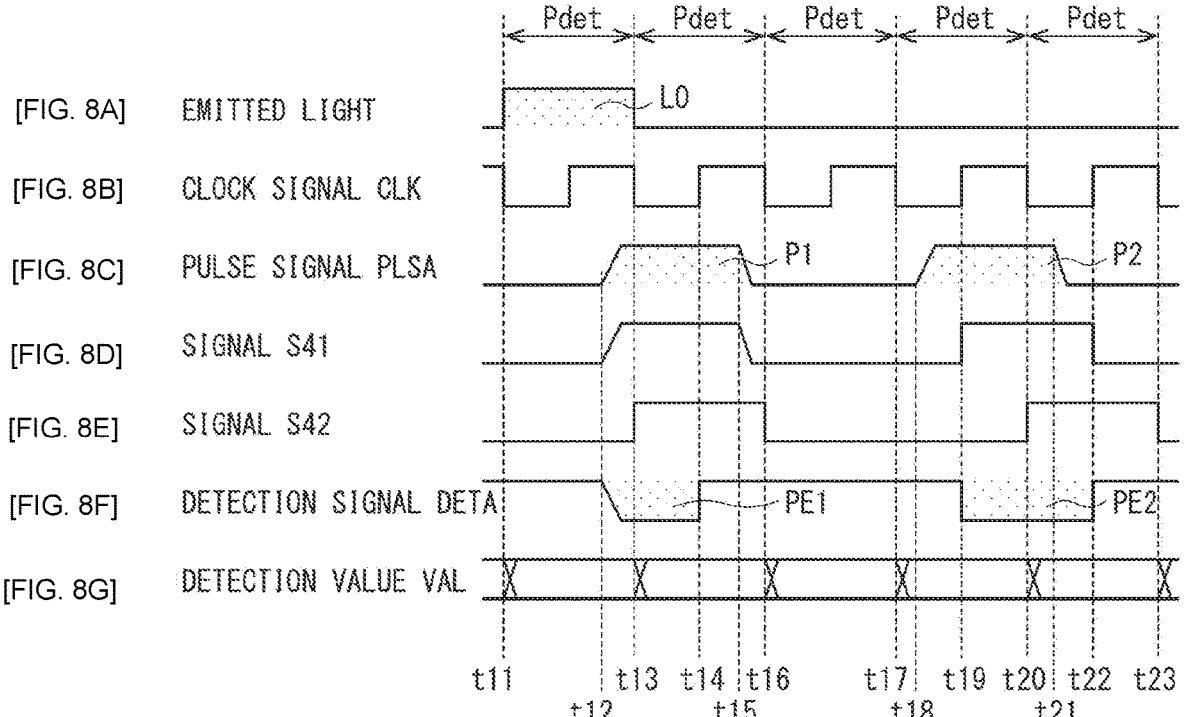
| | | |
|---|---|---|
| [FIG. 8A] | EMITTED LIGHT | |
| [FIG. 8B] | CLOCK SIGNAL CLK | |
| [FIG. 8C] | PULSE SIGNAL PLSA | |
| [FIG. 8D] | SIGNAL S41 | |
| [FIG. 8E] | SIGNAL S42 | |
| [FIG. 8F] | DETECTION SIGNAL DETA | |
| [FIG. 8G] | DETECTION VALUE VAL | |

[FIG. 9]
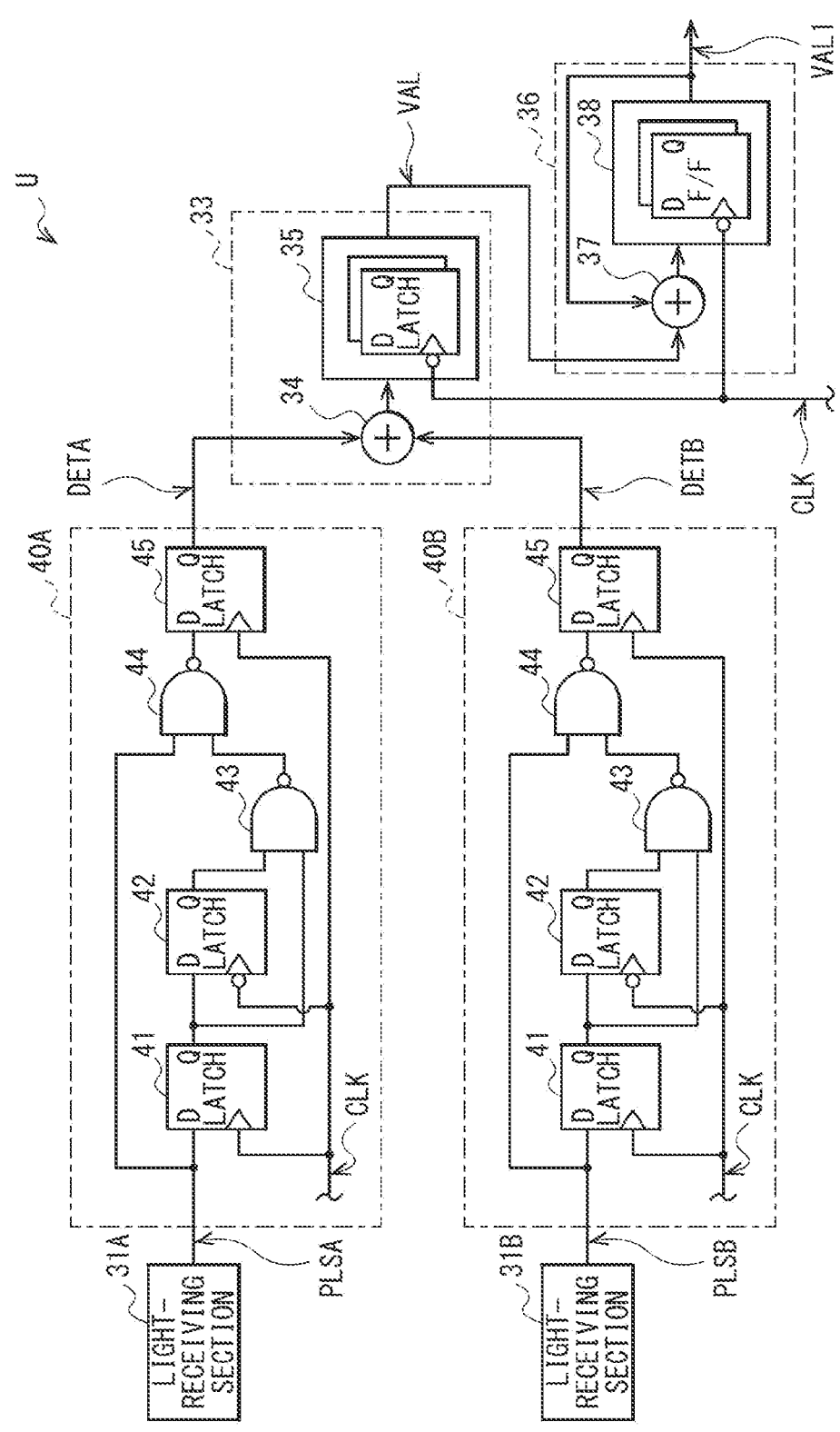

[FIG. 10]
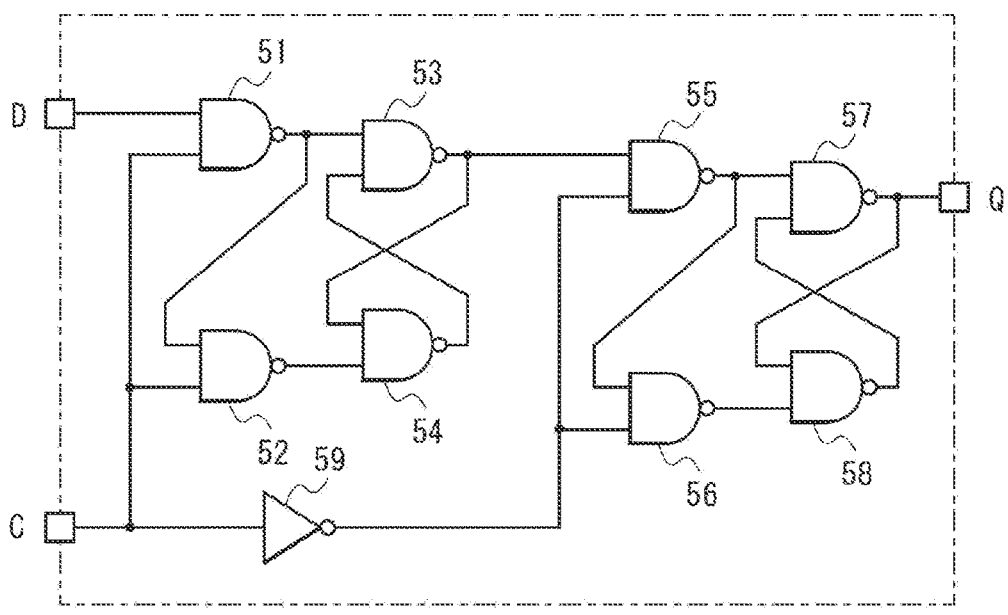

[FIG. 11]
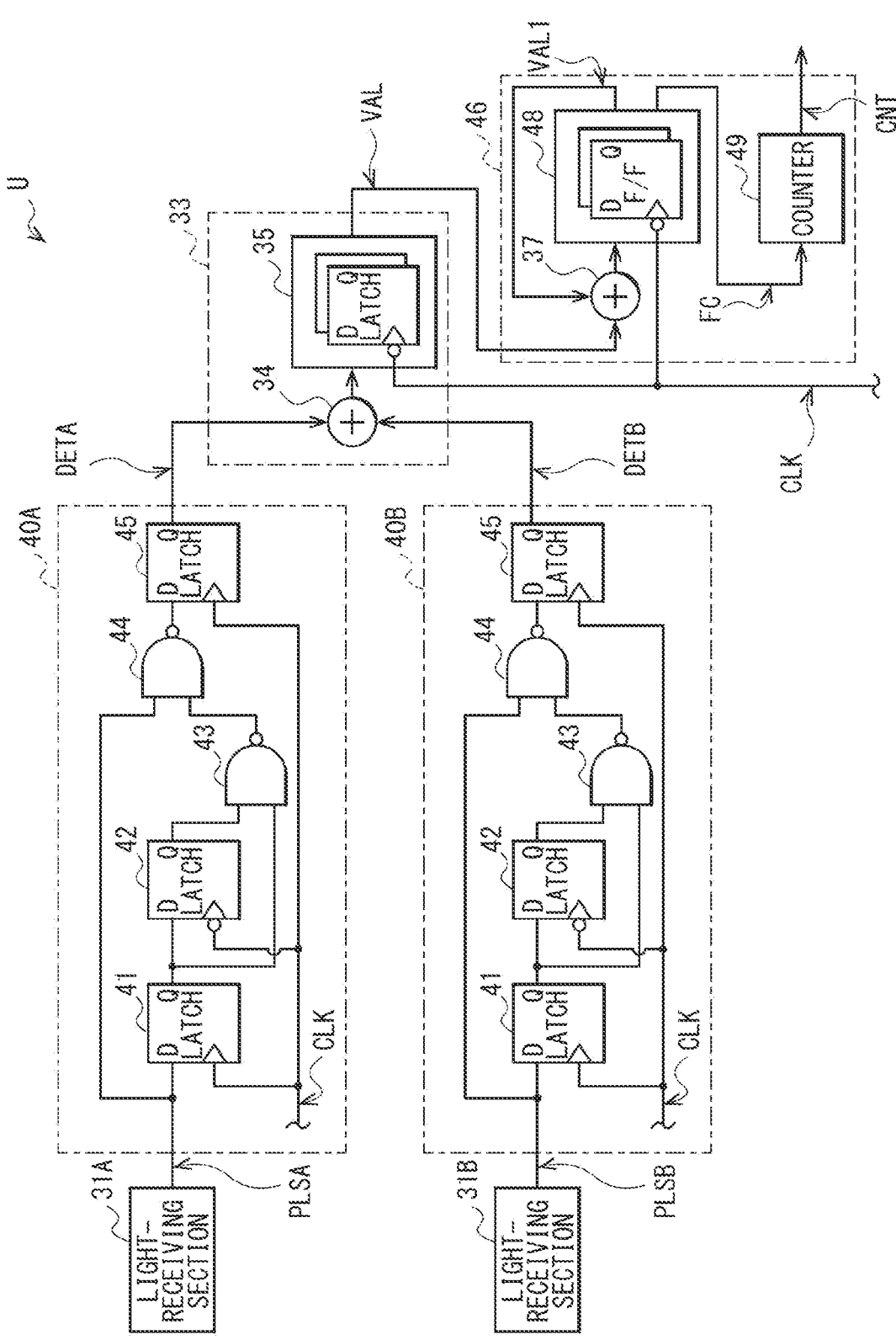

[FIG. 12]
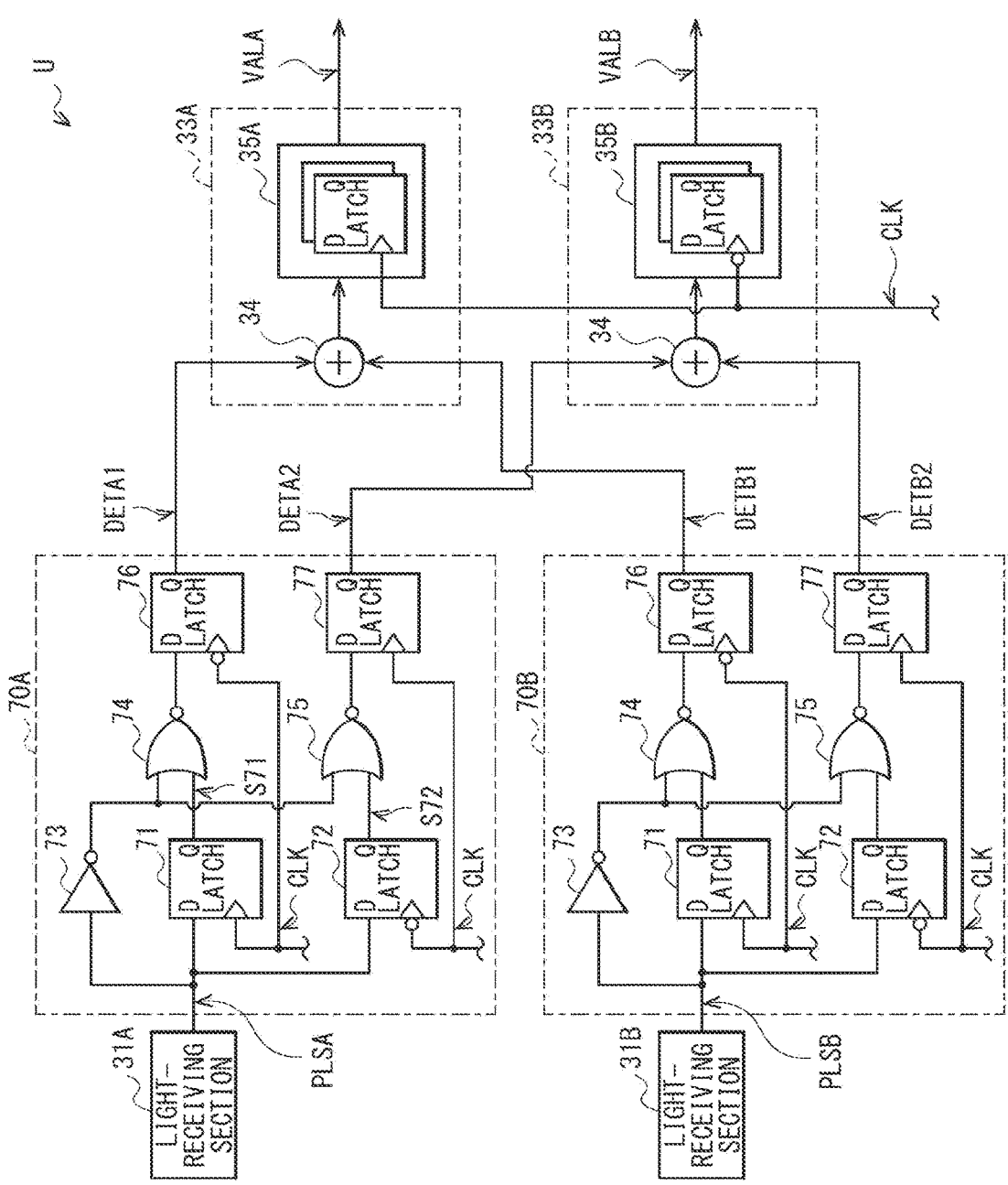

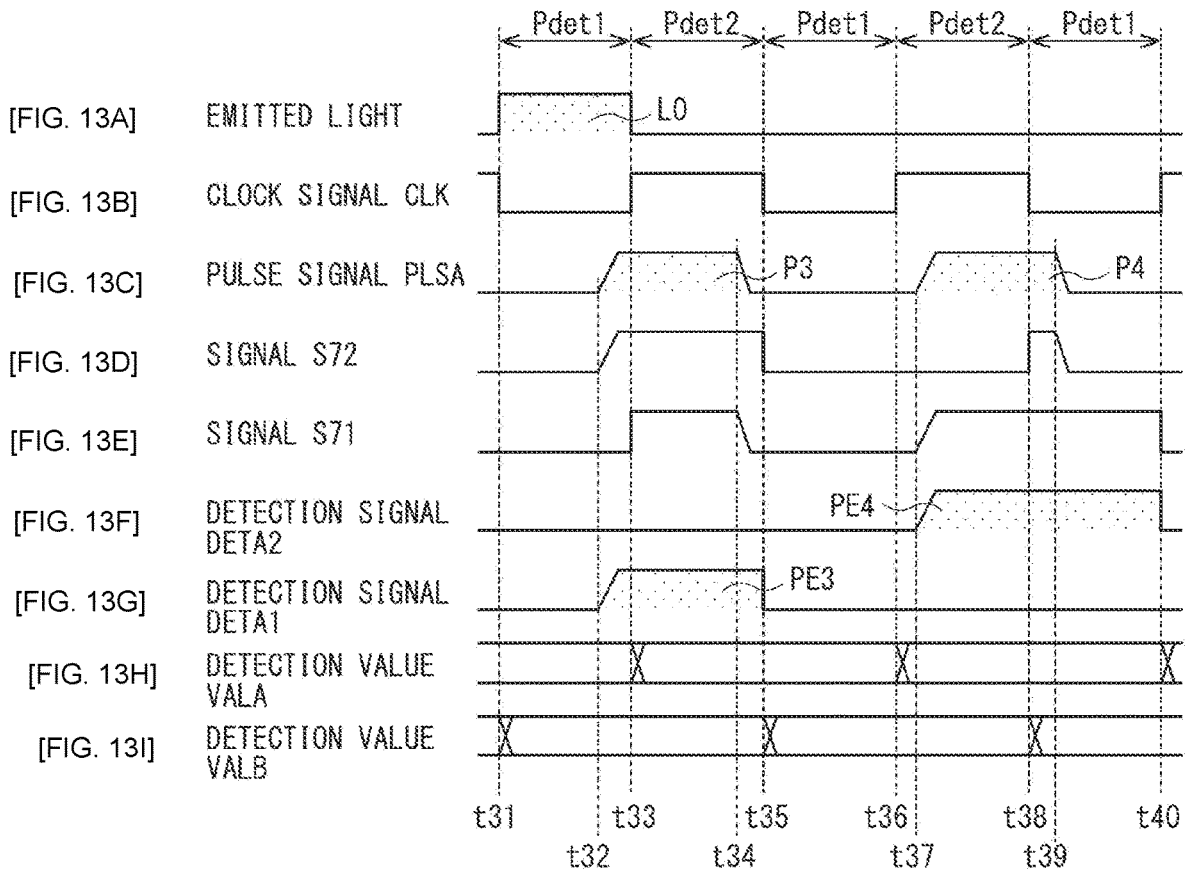

[FIG. 14]
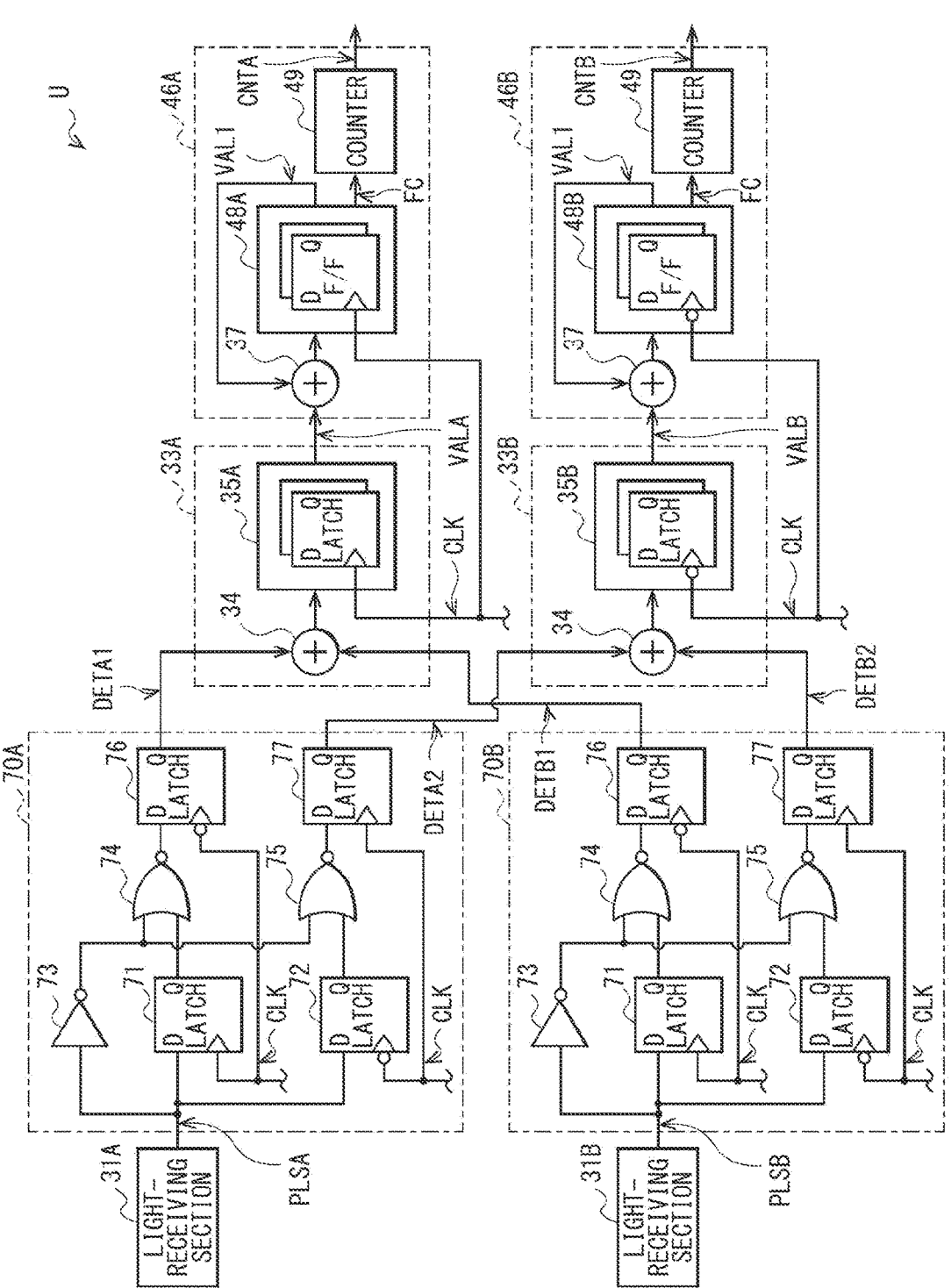

[FIG. 15]
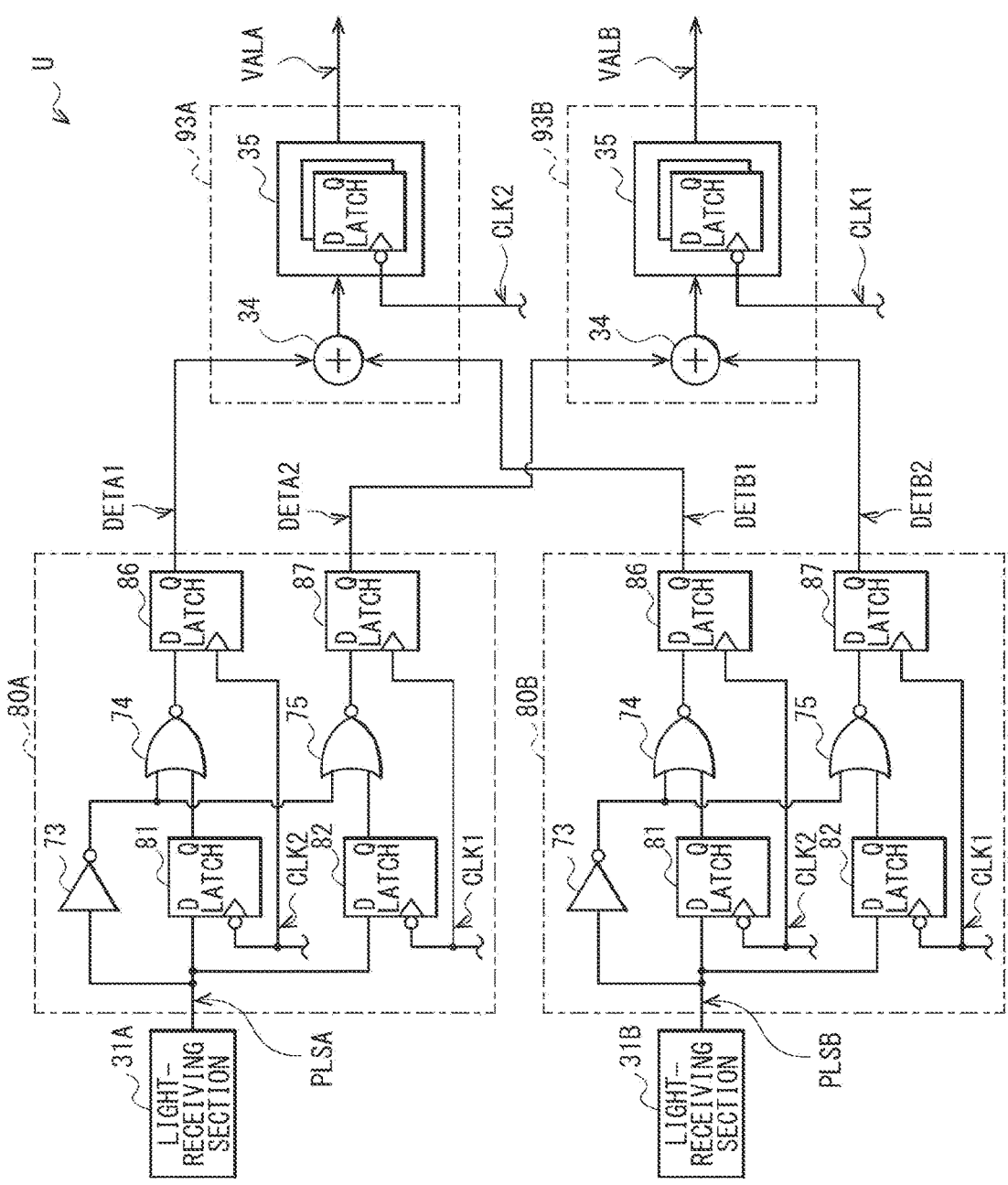

[FIG. 16]
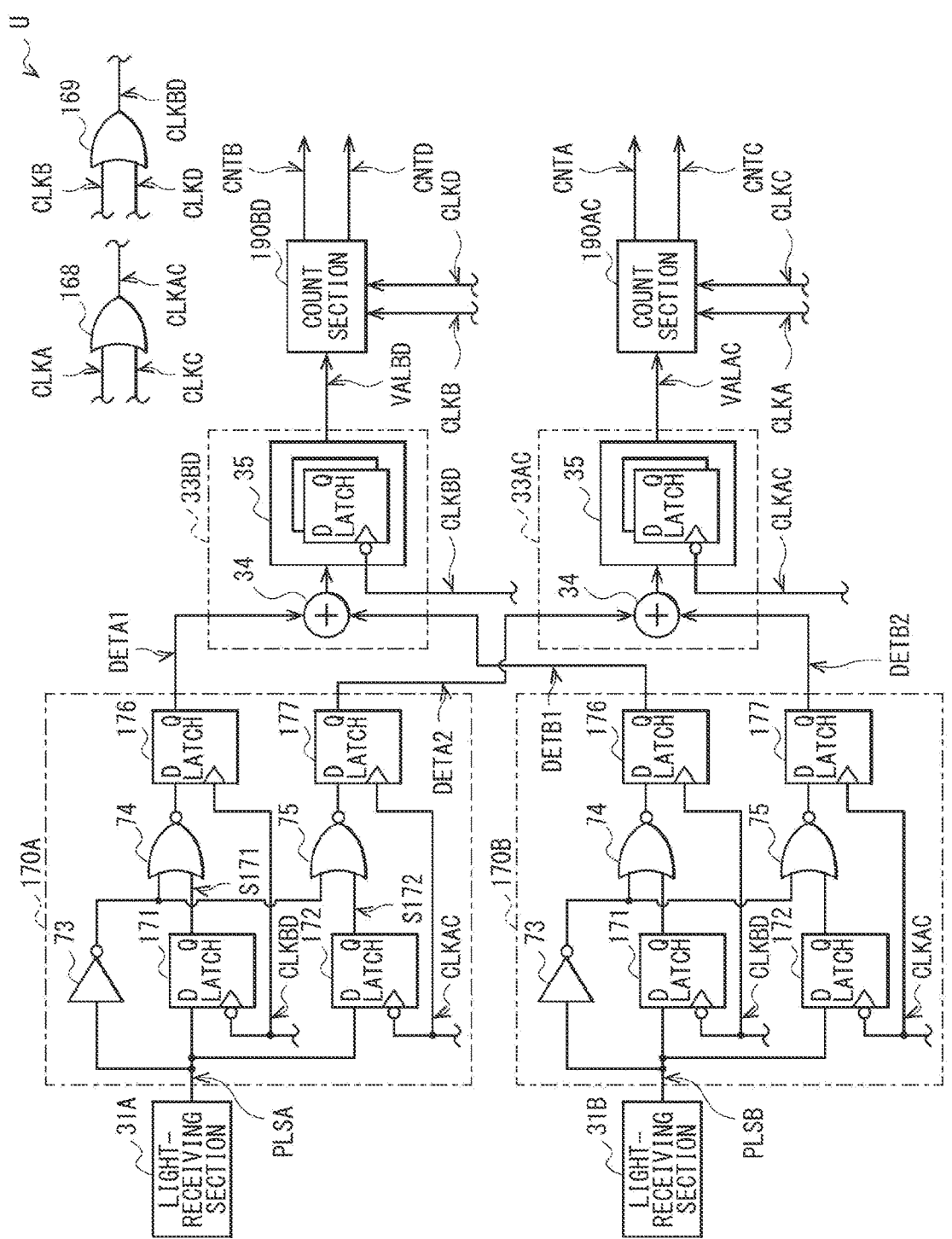

[FIG. 17A]
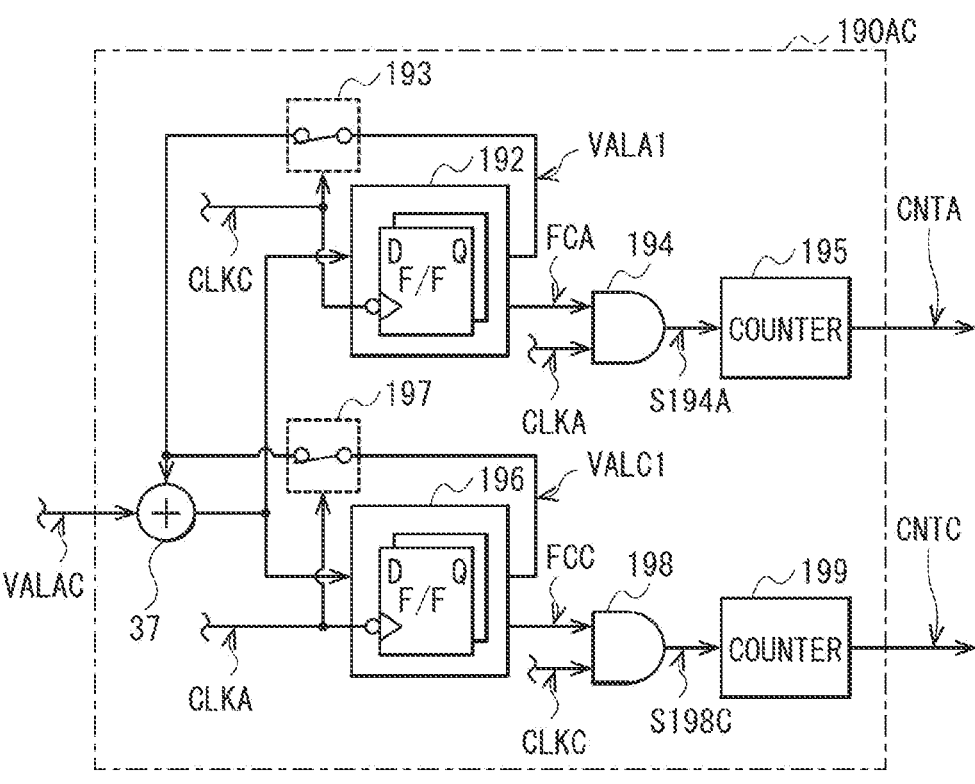
[FIG. 17B]
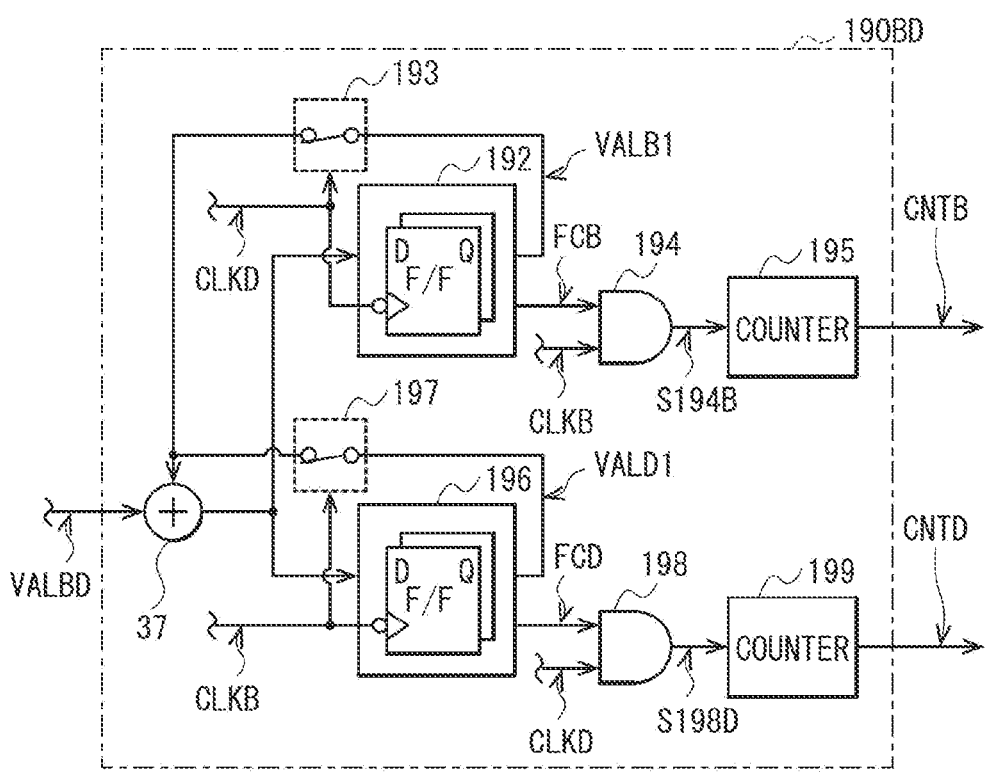

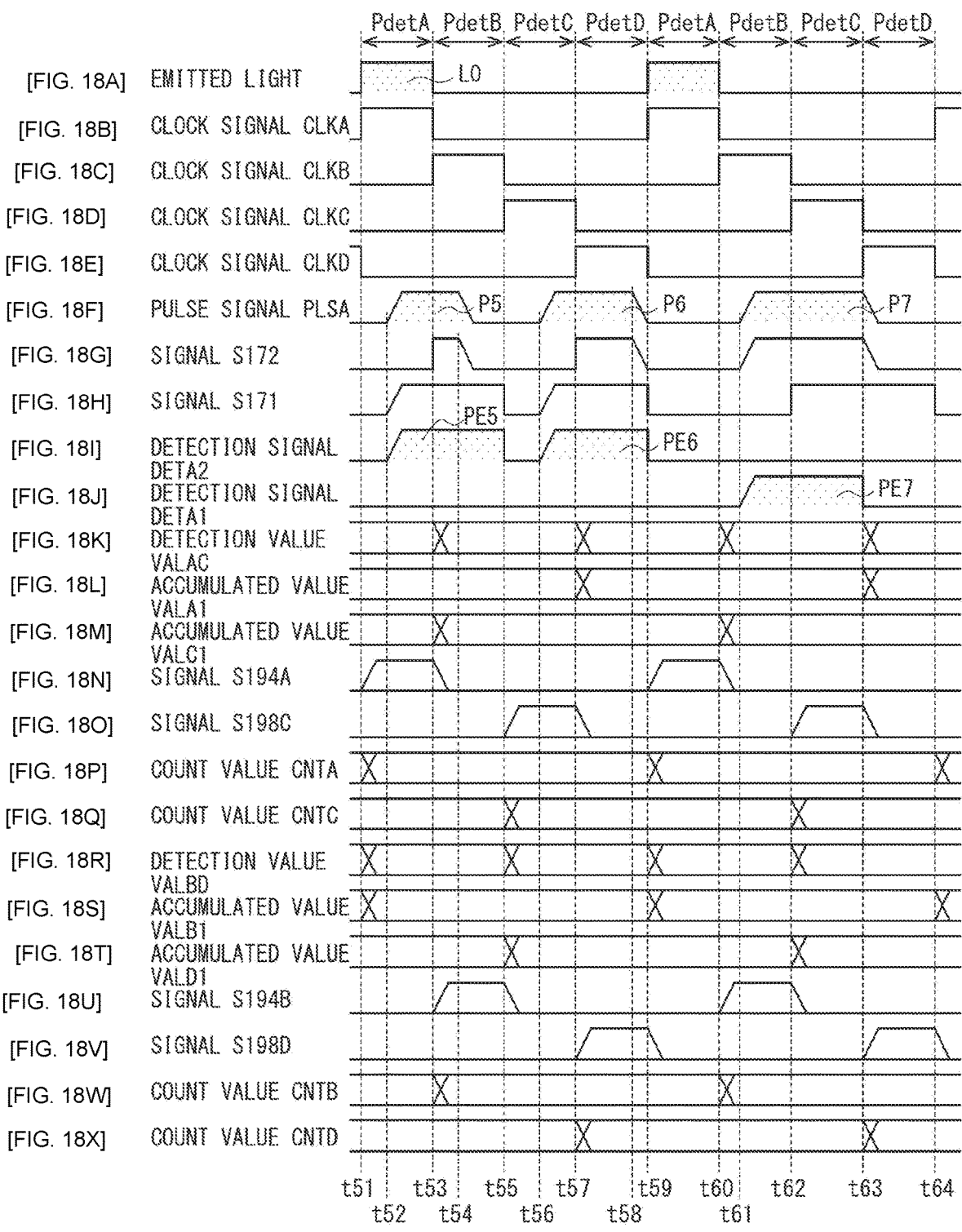

[FIG. 19]
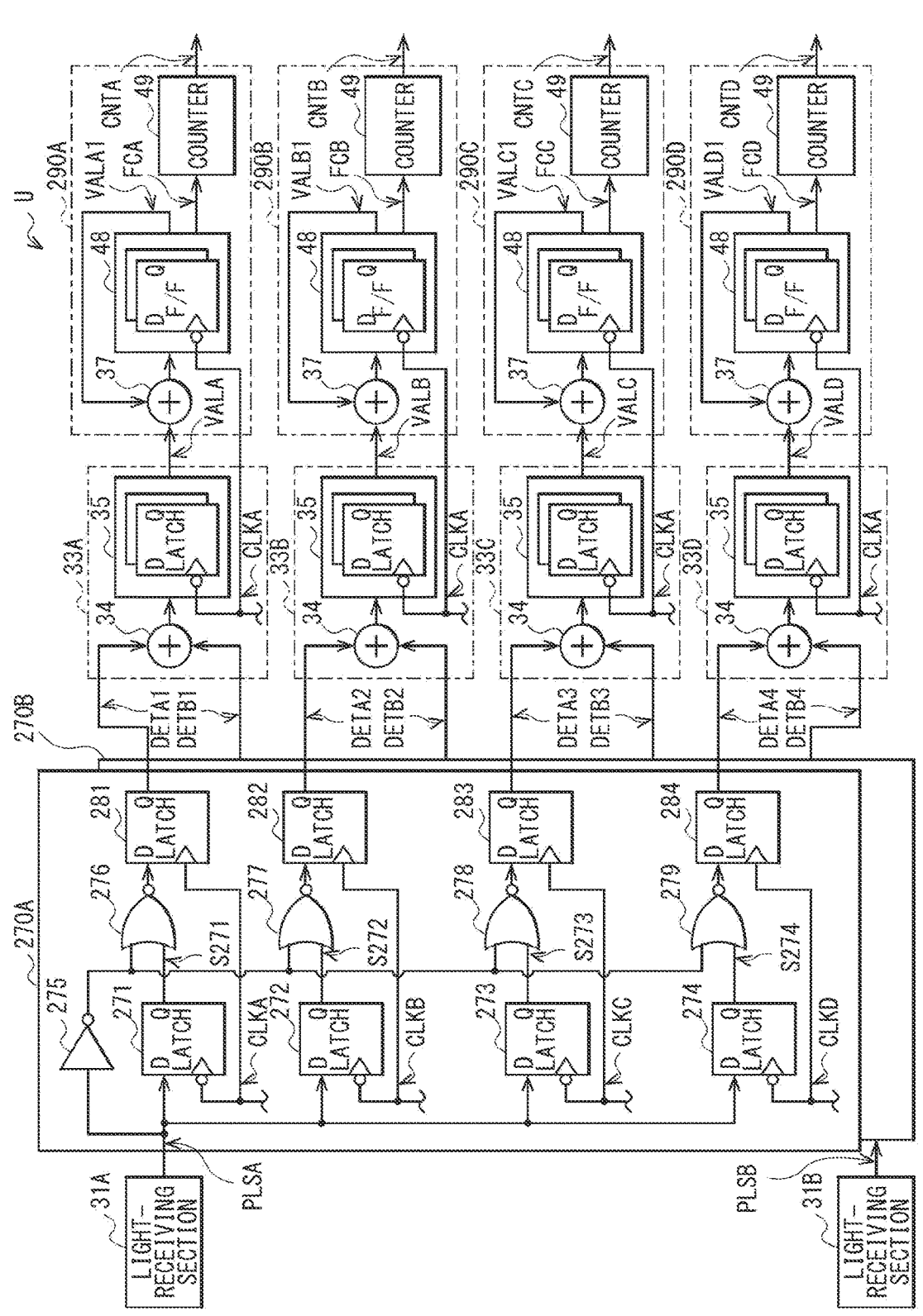

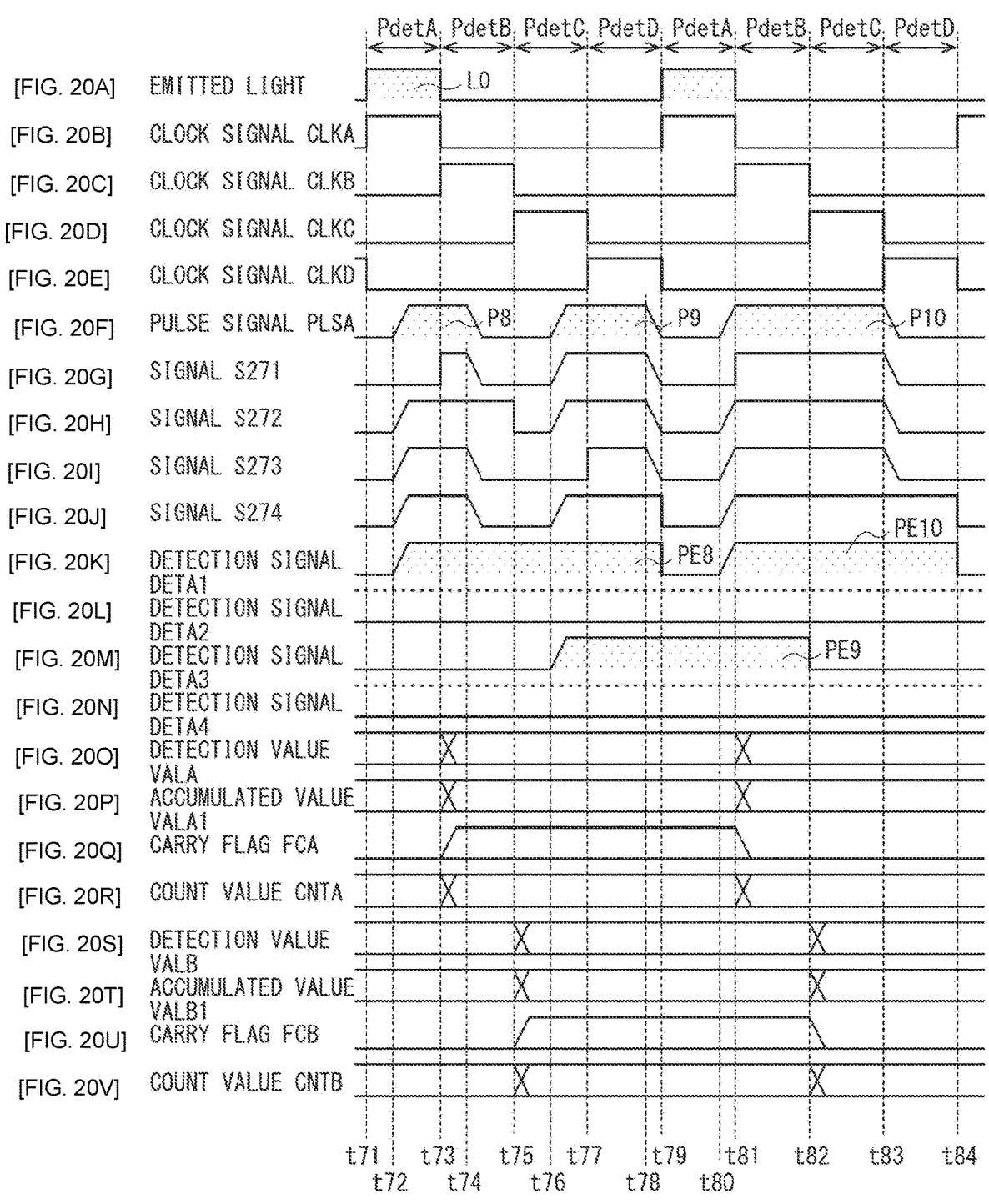

[FIG. 21]
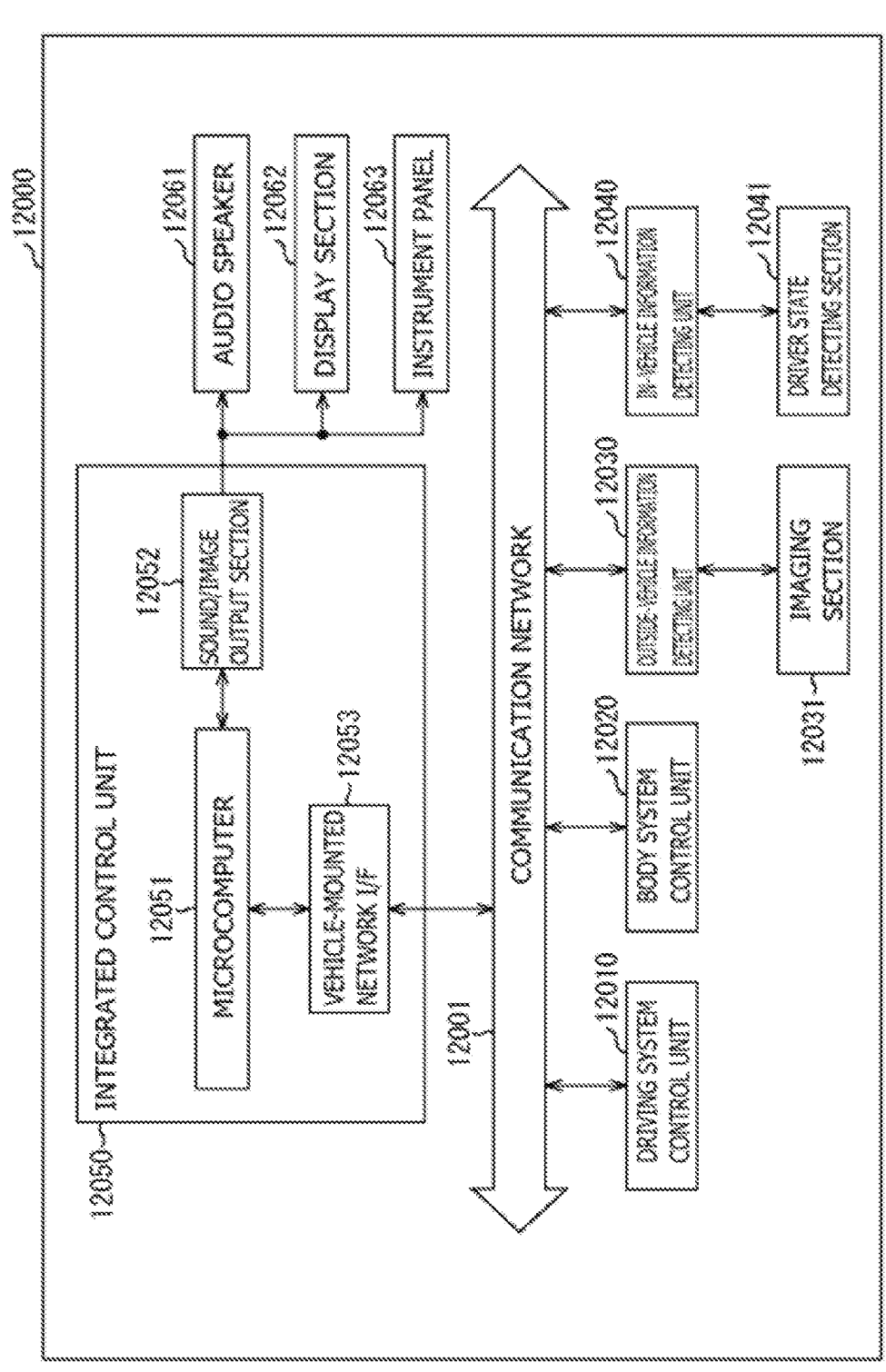

[FIG. 22]
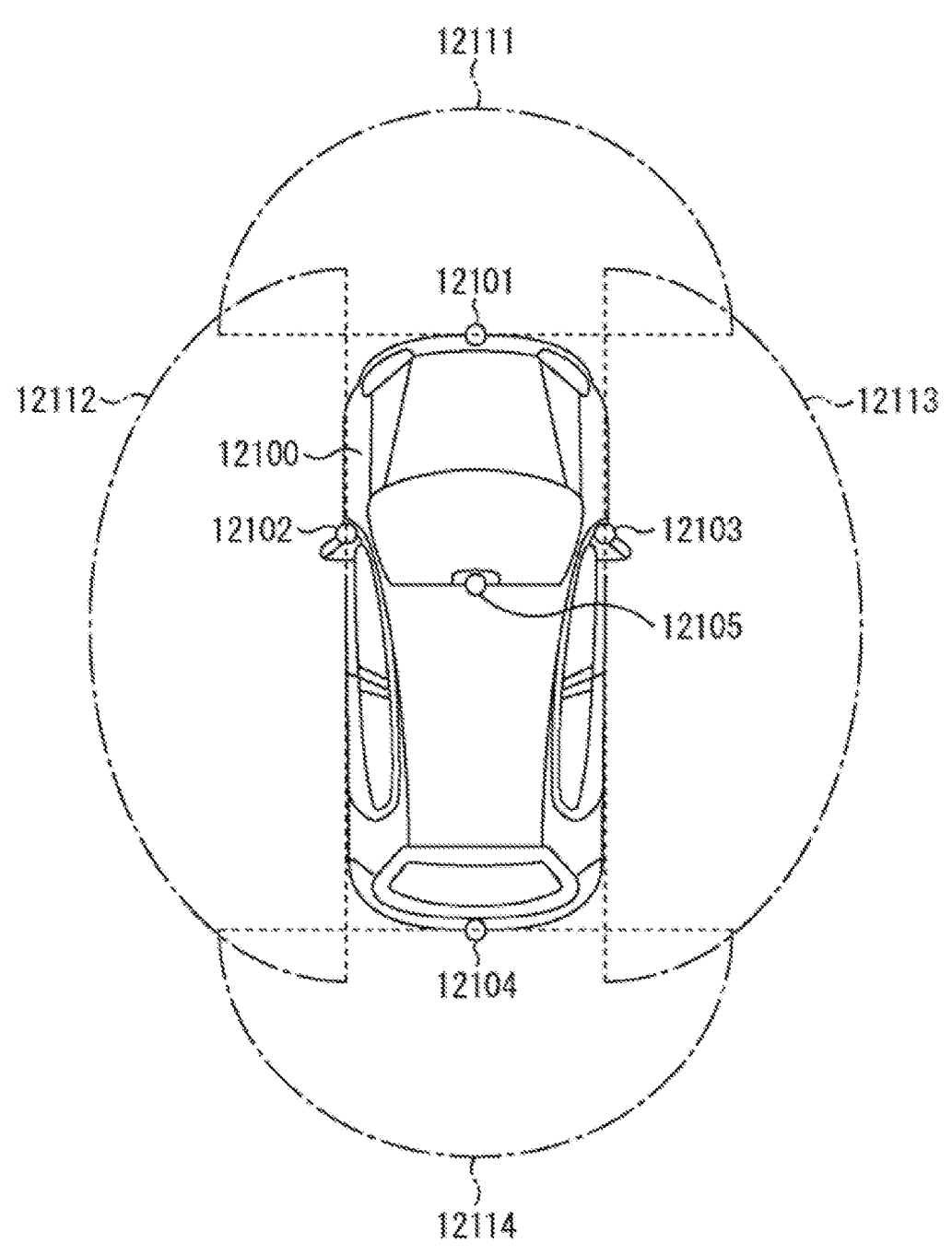

[FIG. 23]
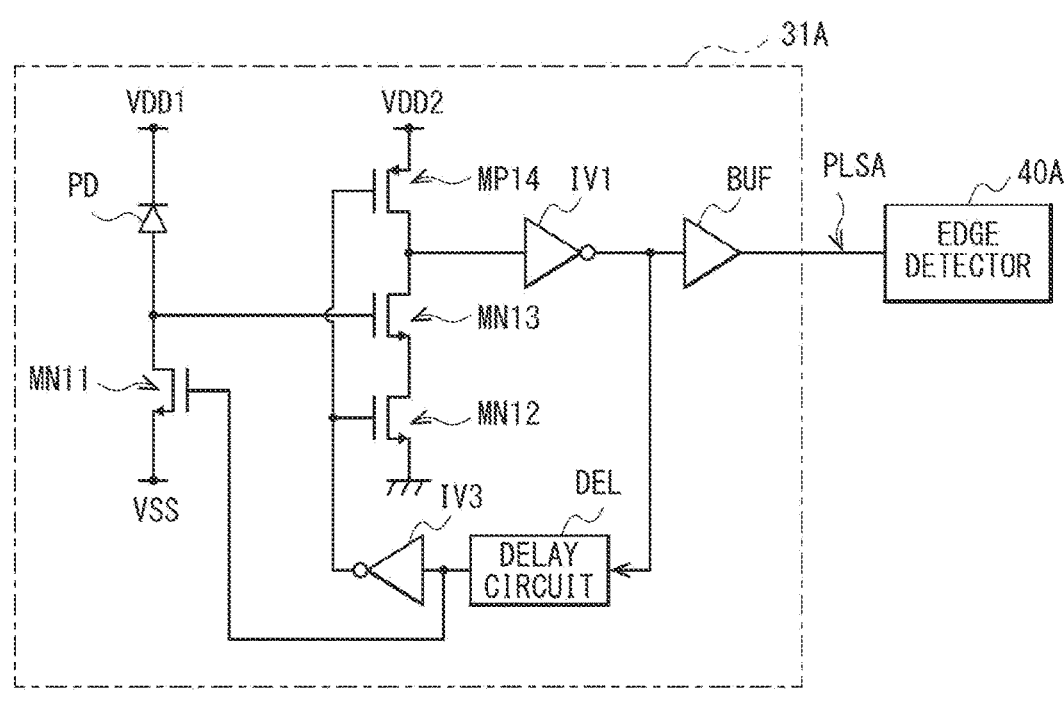

PHOTODETECTION DEVICE AND PHOTODETECTION SYSTEM

CROSS REFERENCE TO RELATED APPLICATIONS

This application is a U.S. National Phase of International Patent Application No. PCT/JP2021/032246 filed on Sep. 2, 2021, which claims priority benefit of Japanese Patent Application No. JP 2020-179257 filed in the Japan Patent Office on Oct. 26, 2020. Each of the above-referenced applications is hereby incorporated herein by reference in its entirety.

TECHNICAL FIELD

The present disclosure relates to a photodetection device and a photodetection system that detect light from a detection object.

BACKGROUND ART

A TOF (Time OF Flight) method is frequently used to measure a distance to an detection object. In this TOF method, light is emitted, and reflected light reflected by the detection object is detected. Then, in the TOF method, the distance to the measurement object is measured by measuring a time difference between a timing at which the light is emitted and a timing at which the reflected light is detected. For example, PTL 1 discloses a photodetection device that detects an edge of a pulse signal corresponding to a light reception result of a light-receiving section with use of two flip-flops on the basis of the pulse signal.

CITATION LIST

Patent Literature

PTL 1: Japanese Unexamined Patent Application Publication No. 2019-9221

SUMMARY OF THE INVENTION

In general, electronic circuits are desired to have a small circuit area, and further reduction in circuit area is expected.

It is desirable to provide a photodetection device and a photodetection system that allow for reduction in circuit area.

A first photodetection device according to an embodiment of the present disclosure includes a plurality of light-receiving sections, a plurality of edge detectors, and an adder. The plurality of light-receiving sections each includes a light-receiving element, and is configured to generate a pulse signal including a pulse corresponding to a result of light reception by the light-receiving element. Each of the plurality of edge detectors is provided for a corresponding one of the plurality of light-receiving sections, and is configured to generate a detection signal by detecting an edge of the pulse in the pulse signal generated by the corresponding one of the plurality of light-receiving sections. The adder is configured to generate a detection value indicating number of the pulses by performing addition processing on the basis of a plurality of the detection signals generated by the plurality of edge detectors. Each of the plurality of edge detectors described above includes a first latch circuit, a second latch circuit, a combination circuit, and a third latch circuit. The first latch circuit is configured to generate a first signal by latching the pulse signal on the basis of a first clock signal. The second latch circuit is configured to generate a second signal by latching the first signal on the basis of a second clock signal that is an inverted signal of the first clock signal. The combination circuit is configured to generate a third signal on the basis of the pulse signal, the first signal, and the second signal. The third latch circuit is configured to generate the detection signal by latching the third signal on the basis of the first clock signal.

A second photodetection device according to an embodiment of the present disclosure includes a plurality of light-receiving sections, a plurality of edge detectors, a first adder, and a second adder. The plurality of light-receiving section each includes a light-receiving element, and is configured to generate a pulse signal including a pulse corresponding to a result of light reception by the light-receiving element. Each of the plurality of edge detectors is provided for a corresponding one of the plurality of light-receiving sections, and is configured to generate a first detection signal and a second detection signal by detecting an edge of the pulse in the pulse signal generated by the corresponding one of the plurality of light-receiving sections. The first adder is configured to generate a first detection value indicating number of the pulses by performing addition processing on the basis of a plurality of the first detection signals generated by the plurality of edge detectors. The second adder is configured to generate a second detection value indicating number of the pulses by performing addition processing on the basis of a plurality of the second detection signals generated by the plurality of edge detectors. Each of the plurality of edge detectors described above includes a first latch circuit, a second latch circuit, a first combination circuit, and a second combination circuit. The first latch circuit is configured to generate a first signal by latching the pulse signal on the basis of a first clock signal. The second latch circuit is configured to generate a second signal by latching the pulse signal on the basis of a second clock signal. The first combination circuit is configured to generate a third signal on the basis of the pulse signal and the first signal. The second combination circuit is configured to generate a fourth signal on the basis of the pulse signal and the second signal. Each of the plurality of edge detectors is configured to generate the first detection signal on the basis of the third signal and generate the second detection signal on the basis of the fourth signal.

A first photodetection system according to an embodiment of the present disclosure includes a light-emitting section and a photodetector. The light-emitting section is configured to emit light. The photodetector is configured to detect light reflected by a detection object of the light emitted from the light-emitting section. The photodetector includes a plurality of light-receiving sections, a plurality of edge detectors, and an adder. The plurality of light-receiving sections each includes a light-receiving element, and is configured to generate a pulse signal including a pulse corresponding to a result of light reception by the light-receiving element. Each of the plurality of edge detectors is provided for a corresponding one of the plurality of light-receiving sections, and is configured to generate a detection signal by detecting an edge of the pulse in the pulse signal generated by the corresponding one of the plurality of light-receiving sections. The adder is configured to generate a detection value indicating number of the pulses by performing addition processing on the basis of a plurality of the detection signals generated by the plurality of edge detectors. Each of the plurality of edge detectors described above includes a first latch circuit, a second latch circuit, a combination circuit, and a third latch circuit. The first latch circuit is configured to generate a first signal by latching the pulse signal on the basis of a first clock signal. The second latch circuit is configured to generate a second signal by latching the first signal on the basis of a second clock signal that is an inverted signal of the first clock signal. The combination circuit is configured to generate a third signal on the basis of the pulse signal, the first signal, and the second signal. The third latch circuit is configured to generate the detection signal by latching the third signal on the basis of the first clock signal.

A second photodetection system according to an embodiment of the present disclosure includes a light-emitting section and a photodetector. The light-emitting section is configured to emit light. The photodetector is configured to detect light reflected by a detection object of the light emitted from the light-emitting section. The photodetector includes a plurality of light-receiving sections, a plurality of edge detectors, a first adder, and a second adder. The plurality of light-receiving section each includes a light-receiving element, and is configured to generate a pulse signal including a pulse corresponding to a result of light reception by the light-receiving element. Each of the plurality of edge detectors is provided for a corresponding one of the plurality of light-receiving sections, and is configured to generate a first detection signal and a second detection signal by detecting an edge of the pulse in the pulse signal generated by the corresponding one of the plurality of light-receiving sections. The first adder is configured to generate a first detection value indicating number of the pulses by performing addition processing on the basis of a plurality of the first detection signals generated by the plurality of edge detectors. The second adder is configured to generate a second detection value indicating number of the pulses by performing addition processing on the basis of a plurality of the second detection signals generated by the plurality of edge detectors. Each of the plurality of edge detectors described above includes a first latch circuit, a second latch circuit, a first combination circuit, and a second combination circuit. The first latch circuit is configured to generate a first signal by latching the pulse signal on the basis of a first clock signal. The second latch circuit is configured to generate a second signal by latching the pulse signal on the basis of a second clock signal. The first combination circuit is configured to generate a third signal on the basis of the pulse signal and the first signal. The second combination circuit is configured to generate a fourth signal on the basis of the pulse signal and the second signal. Each of the plurality of edge detectors is configured to generate the first detection signal on the basis of the third signal and generate the second detection signal on the basis of the fourth signal.

In the first photodetection device and the first photodetection system according to the embodiments of the present disclosure, each of the plurality of light-receiving sections generates the pulse signal including the pulse corresponding to the result of light reception by the light-receiving element, and each of the plurality of edge detectors generates the detection signal by detecting the edge of the pulse in the pulse signal generated by the corresponding light-receiving section. In each of the plurality of edge detectors, the first latch circuit generates the first signal by latching the pulse signal on the basis of the first clock signal, the second latch circuit generates the second signal by latching the first signal on the basis of the second clock signal that is the inverted signal of the first clock signal, the combination circuit generates the third signal on the basis of the pulse signal, the first signal, and the second signal, and the third latch circuit generates the detection signal by latching the third signal on the basis of the first clock signal. Further, the adder generates the detection value indicating the number of pulses by performing addition processing on the basis of the plurality of the detection signals generated by the plurality of edge detectors.

In the second photodetection device and the second photodetection system according to the embodiments of the present disclosure, each of the plurality of light-receiving sections generates the pulse signal including the pulse corresponding to the result of light reception by the light-receiving element, and each of the plurality of edge detectors generates the first detection signal and the second detection signal by detecting the edge of the pulse in the pulse signal generated by the corresponding light-receiving section. In each of the plurality of edge detectors, the first latch circuit generates the first signal by latching the pulse signal on the basis of the first clock signal, the second latch circuit generates the second signal by latching the pulse signal on the basis of the second clock signal, the first combination circuit generates the third signal on the basis of the pulse signal and the first signal, the second combination circuit generates the fourth signal on the basis of the pulse signal and the second signal, the first detection signal is generated on the basis of the third signal, and the second detection signal is generated on the basis of the fourth signal. Further, the first adder generates the first detection value indicating the number of the pulses by performing addition processing on the basis of the plurality of the first detection signals generated by the plurality of edge detectors, and the second adder generates the second detection value indicating the number of the pulses by performing addition processing on the basis of the plurality of the second detection signals generated by the plurality of edge detectors.

BRIEF DESCRIPTION OF DRAWINGS

FIG. 1 is a block diagram illustrating a configuration example of a photodetection system according to an embodiment of the present disclosure.

FIG. 2 is a block diagram illustrating a configuration example of a photodetector illustrated in FIG. 1.

FIG. 3 is an explanatory diagram illustrating an implementation example of the photodetector illustrated in FIG. 1.

FIG. 4 is a circuit diagram illustrating a configuration example of a photodetection unit according to a first embodiment.

FIG. 5 is a circuit diagram illustrating a configuration example of a light-receiving section illustrated in FIG. 4.

FIGS. 6A, 6B, 6C, 6D, and 6E are timing waveform diagrams illustrating an operation example of the light-receiving section illustrated in FIG. 5.

FIG. 7 is a circuit diagram illustrating a configuration example of a latch illustrated in FIG. 4.

FIGS. 8A, 8B, 8C, 8D, 8E, 8F, and 8G are timing waveform diagrams illustrating an operation example of the photodetection unit illustrated in FIG. 4.

FIG. 9 is a circuit diagram illustrating a configuration example of a photodetection unit according to a modification example of the first embodiment.

FIG. 10 is a circuit diagram illustrating a configuration example of a flip-flop illustrated in FIGS. 8A, 8B, 8C, 8D, 8E, 8F, and 8G.

FIG. 11 is a circuit diagram illustrating a configuration example of a photodetection unit according to another modification example of the first embodiment.

FIG. 12 is a circuit diagram illustrating a configuration example of a photodetection unit according to a second embodiment.

FIGS. 13A, 13B, 13C, 13D, 13E, 13F, 13G, 13H, and 13I are timing waveform diagrams illustrating an operation example of the photodetection unit illustrated in FIG. 12.

FIG. 14 is a circuit diagram illustrating a configuration example of a photodetection unit according to a modification example of the second embodiment.

FIG. 15 is a circuit diagram illustrating a configuration example of a photodetection unit according to another modification example of the second embodiment.

FIG. 16 is a circuit diagram illustrating a configuration example of a photodetection unit according to a third embodiment.

FIG. 17A is a circuit diagram illustrating a configuration example of a count section illustrated in FIG. 16.

FIG. 17B is a circuit diagram illustrating a configuration example of another count section illustrated in FIG. 16.

FIGS. 18A, 18B, 18C, 18D, 18E, 18F, 18G, 18H, 18I, 18J, 18K, 18L, 18M, 18N, 18O, 18P, 18Q, 18R, 18S, 18T, 18U, 18V, 18W, and 18X are timing waveform diagrams illustrating an operation example of the photodetection unit illustrated in FIG. 16.

FIG. 19 is a circuit diagram illustrating a configuration example of a photodetection unit according to a fourth embodiment.

FIGS. 20A, 20B, 20C, 20D, 20E, 20F, 20G, 20H, 20I, 20J, 20K, 20L, 20M, 20N, 20O, 20P, 20Q, 20R, 20S, 20T, 20U, and 20V are timing waveform diagrams illustrating an operation example of the photodetection unit illustrated in FIG. 19.

FIG. 21 is a block diagram depicting an example of schematic configuration of a vehicle control system.

FIG. 22 is a diagram of assistance in explaining an example of installation positions of an outside-vehicle information detecting section and an imaging section.

FIG. 23 is a circuit diagram illustrating a configuration example of a light-receiving section according to a modification example.

MODES FOR CARRYING OUT THE
INVENTION

In the following, some embodiments of the present disclosure are described in detail with reference to the drawings. It is to be noted that description is given in the following order.

1. First Embodiment
2. Second Embodiment
3. Third Embodiment
4. Fourth Embodiment
5. Example of Application to Mobile Body 1. First Embodiment Configuration Example FIG. 1 illustrates a configuration example of a photodetection system (photodetection system 1) according to an embodiment. The photodetection system 1 includes a ToF (Time-of-Flight) sensor, and is configured to emit light and detect reflected light reflected by a detection object OBJ. The photodetection system 1 includes a light-emitting section 11, an optical system 12, a photodetector 20, and a controller 14.

The light-emitting section 11 is configured to emit a light pulse L0 toward the detection object OBJ on the basis of an instruction from the controller 14. The light-emitting section 11 emits the light pulse L0 on the basis of an instruction from the controller 14 by performing a light emission operation of alternately repeating emission and non-emission of light. The light-emitting section 11 includes, for example, a light source that emits infrared light. This light source includes, for example, a laser light source, an LED (Light Emitting Diode), or the like.

The optical system 12 includes a lens that forms an image on a light-receiving surface S of the photodetector 20. A light pulse (reflected light pulse L1) emitted from the light-emitting section 11 and reflected by the detection object OBJ enters this optical system 12.

The photodetector 20 is configured to detect light to detect the reflected light pulse L1 on the basis of an instruction from the controller 14. The photodetector 20 then outputs a detection result as data DT.

The controller 14 is configured to supply the light-emitting section 11 and the photodetector 20 with control signals and control operations of the light-emitting section 11 and the photodetector 20 to thereby control an operation of the photodetection system 1.

FIG. 2 illustrates a configuration example of the photodetector 20. The photodetector 20 includes a photodetection array 21, a clock generator 22, a readout controller 23, a readout section 24, and a photodetection controller 25.

The photodetection array 21 includes a plurality of photodetection units U disposed in a matrix. The photodetection units U are each configured to generate a detection value VAL by detecting the reflected light pulse L1. The detection value VAL indicates the number of detection times of the reflected light pulse L1 in each of a plurality of detection periods Pdet.

FIG. 3 illustrates an implementation example of the photodetector 20. The photodetector 20 is formed on two semiconductor substrates 101 and 102. The semiconductor substrate 101 is disposed on side of a light-receiving surface S of the photodetector 20, and the semiconductor substrate 102 is disposed on side opposite to the light-receiving surface S of the photodetector 20. The semiconductor substrates 101 and 102 are superimposed on each other. A wiring line of the semiconductor substrate 101 and a wiring line of the semiconductor substrate 102 are coupled to each other by a wiring line 103. It is possible to use, for example, a metallic bond such as Cu—Cu for the wiring line 103. The photodetection units U are disposed over these two semiconductor substrates 101 and 102.

FIG. 4 illustrates a configuration example of the photodetection unit U. The photodetection unit U includes a plurality of light-receiving sections 31 (two light-receiving sections 31A and 31B in this example), a plurality of edge detectors 40 (two edge detectors 40A and 40B in this example), and an adder 33. It is to be noted that in this example, two light-receiving sections 31 and two edge detectors 40 are provided, but this is not limitative. Three or more light-receiving sections 31 and three or more edge detectors 40 may be provided.

Each of the plurality of light-receiving sections 31 is configured to generate a pulse signal PLS by detecting light. Specifically, the light-receiving section 31A generates the pulse signal PLS (pulse signal PLSA) by detecting light, and supplies the generated pulse signal PLSA to the edge detector 40A. In addition, the light-receiving section 31B generates the pulse signal PLS (pulse signal PLSB) by detecting light, and supplies the generated pulse signal PLSB to the edge detector 40B. The following describes the light-receiving section 31A as an example. It is to be noted that the same applies to the light-receiving section 31B.

FIG. 5 illustrates a configuration example of the light-receiving section 31A. The light-receiving section 31A includes a photodiode PD, transistors MP1 to MP3 and MN4, inverters IV1 to IV3, and an delay circuit DEL. The transistors MP1 to MP3 are P-type MOS (Metal Oxide Semiconductor) transistors, and the transistor MN4 is an N-type MOS transistor. For example, the photodiode PD is formed on the semiconductor substrate 101, and the transistors MP1 to MP3 and MN4, the inverters IV1 to IV3, and the delay circuit DEL are formed on the semiconductor substrate 102.

The photodiode PD is a photoelectric conversion element that converts light into electric charge. The photodiode PD has an anode supplied with a power supply voltage VSS, and a cathode coupled to a drain of the transistor MP1 and a gate of the transistor MP3. It is possible to use, for example, an avalanche photodiode (APD; Avalanche Photodiode), a single photon avalanche diode (SPAD; Single Photon Avalanche Diode), or the like for the photodiode PD.

The transistor MP1 has a gate coupled to an output terminal of the delay circuit DEL, an input terminal of the inverter IV3, a source supplied with a power supply voltage VDD1, and the drain coupled to the cathode of the photodiode PD and the gate of the transistor MP3. The transistor MP2 has a gate coupled to an output terminal of the inverter IV3 and a gate of the transistor MN4, a source supplied with a power supply voltage VDD2, and a drain coupled to a source of the transistor MP3. The transistor MP3 has the gate coupled to the cathode of the photodiode PD and the drain of the transistor MP1, the source coupled to the drain of the transistor MP2, and a drain coupled to a drain of the transistor MN4 and an input terminal of the inverter IV1. The transistor MN4 has the gate coupled to the output terminal of the inverter IV3 and the gate of the transistor MP2, the drain coupled to the drain of the transistor MP3 and the input terminal of the inverter IV1, and a source grounded.

The inverter IV1 has the input terminal coupled to the drain of the transistor MP3 and the drain of the transistor MN4, and an output terminal coupled to an input terminal of the inverter IV2 and an input terminal of the delay circuit DEL. The inverter IV2 has the input terminal coupled to the output terminal of the inverter IV1 and the input terminal of the delay circuit DEL, and an output terminal coupled to the edge detector 40A in a stage subsequent to the light-receiving section 31A.

The delay circuit DEL is configured to delay an inputted signal by a predetermined time (delay time Td) and output the delayed signal. The delay circuit DEL has the input terminal coupled to the output terminal of the inverter IV1 and the input terminal of the inverter IV2, and the output terminal coupled to the input terminal of the inverter IV3 and the gate of the transistor MP1. The delay time Td is set to cause a pulse width Tpw of the pulse signal PLSA outputted from the inverter IV2 to be equal to or larger than a time length of the detection period Pdet in which the edge detector 40A detects an edge.

The inverter IV3 has the input terminal coupled to the output terminal of the delay circuit DEL and the gate of the transistor MP1, and the output terminal coupled to the gates of the transistors MP2 and MN4.

FIGS. 6A, 6B, 6C, 6D, and 6E illustrate an operation example of the light-receiving section 31A. FIG. 6A indicates a waveform of a cathode voltage V1 of the photodiode PD. FIG. 6B indicates a waveform of a voltage V2 at the drains of the transistors MP3 and MN4. FIG. 6C indicates a waveform of a voltage V3 at the output terminal of the inverter IV1. FIG. 6D indicates a waveform of a voltage V4 at the output terminal of the delay circuit DEL. FIG. 6E indicates a waveform of the pulse signal PLSA.

In a case where light enters the photodiode PD, the cathode voltage V1 of the photodiode PD starts to decrease from the power supply voltage VDD1 at a timing t1 (FIG. 6A). On the basis of this change in the cathode voltage V1, the transistor MP3 changes from an off state to an on state, and the voltage V2 changes from a low level to a high level (FIG. 6B). On the basis of this change in the voltage V2, the voltage V3 at the output terminal of the inverter IV1 starts to change from the high level to the low level at a timing t2 (FIG. 6C). On the basis of this change in the voltage V3, the voltage of the pulse signal PLSA changes from the low level to the high level (FIG. 6E).

In addition, on the basis of the change in the voltage V3 of the inverter IV1, the voltage V4 at the output terminal of the delay circuit DEL starts to change from the high level to the low level at a timing t3 when only the delay time Td of the delay circuit DEL has elapsed from the timing t2 (FIG. 6D). On the basis of this change in the voltage V4, the transistor MP1 changes from the off state to the on state, and the cathode voltage V1 of the photodiode PD changes toward the power supply voltage VDD1 (FIG. 6A). In addition, on the basis of this change in the voltage V4, the voltage at the output terminal of the inverter IV3 changes from the low level to the high level, which causes the transistor MP2 to change from the on state to the off state and causes the transistor MN4 to change from the off state to the on state, and causes the voltage V2 to change from the high level to the low level (FIG. 6B). On the basis of this change in the voltage V2, the voltage V3 at the output terminal of the inverter IV1 changes from the low level to the high level (FIG. 6C), and on the basis of this change in the voltage V3, the voltage of the pulse signal PLSA changes from the high level to the low level (FIG. 6E). Thereafter, the voltage V4 at the output terminal of the delay circuit DEL then changes from the low level to the high level (FIG. 6D).

Thus, the light-receiving section 31A generates the pulse signal PLSA by detecting light. A pulse width Tpw of the pulse signal PLSA is set to be equal to or larger than the time length of the detection period Pdet in which the edge detector 40A detects an edge. The delay circuit DEL delays an input signal, which makes it possible for the light-receiving section 31A to generate the pulse signal PLSA having such a pulse width Tpw.

Each of the plurality of edge detectors 40 (FIG. 4) is configured to generate a detection signal DET by detecting an edge of the pulse signal PLS supplied from the light-receiving section 31. Specifically, the edge detector 40A generates the detection signal DET (detection signal DETA) by detecting an edge of the pulse signal PLSA supplied from the light-receiving section 31A, and supplies the generated detection signal DETA to the adder 33. In addition, the edge detector 40B generates the detection signal DET (detection signal DETB) by detecting an edge of the pulse signal PLSB supplied from the light-receiving section 31B, and supplies the generated detection signal DETB to the adder 33. For example, the plurality of edge detectors 40 is formed on the semiconductor substrate 102. The following describes the edge detector 40A as an example.

The edge detector 40A includes latches 41 and 42, negative AND (NAND) circuits 43 and 44, and a latch 45.

The latches 41, 42, and 45 are each configured to latch a signal at a data terminal D on the basis of a signal at an enable terminal E and output a signal indicating a latched result from an output terminal Q. The following describes the latch 41 as an example. It is to be noted that the same applies to the latches 42 and 45.

FIG. 7 illustrates a configuration example of the latch 41. The latch 41 includes NAND circuits 96 to 99. The NAND circuit 96 has a first input terminal coupled to the data terminal D of the latch 41, a second input terminal coupled to the enable terminal E of the latch 41 and a second input terminal of the NAND circuit 97, and an output terminal coupled to a first input terminal of the NAND circuit 97 and a first input terminal of the NAND circuit 98. The NAND circuit 97 has the first input terminal coupled to the output terminal of the NAND circuit 96 and the first input terminal of the NAND circuit 98, the second input terminal coupled to the enable terminal E of the latch 41 and the second input terminal of the NAND circuit 96, and an output terminal coupled to a second input terminal of the NAND circuit 99. The NAND circuit 98 has the first input terminal coupled to the output terminal of the NAND circuit 96 and the first input terminal of the NAND circuit 97, the second input terminal coupled to an output terminal of the NAND circuit 99, and an output terminal coupled to a first input terminal of the NAND circuit 99 and the output terminal Q of the latch 41. The NAND circuit 99 has the first input terminal coupled to the output terminal of the NAND circuit 98 and the output terminal Q of the latch 41, the second input terminal coupled to the output terminal of the NAND circuit 97, and the output terminal coupled to the second input terminal of the NAND circuit 98.

In the edge detector 40A (FIG. 4), the latch 41 has the data terminal D supplied with the pulse signal PLSA, the enable terminal E supplied with the clock signal CLK, and the output terminal Q coupled to the data terminal D of the latch 42 and an second input terminal of the NAND circuit 43. The latch 42 has the data terminal D coupled to the output terminal Q of the latch 41 and the second input terminal of the NAND circuit 43, the enable terminal E supplied with an inverted signal (hereinafter referred to as clock signal CLKB) of the clock signal CLK, and the output terminal Q coupled to an first input terminal of the NAND circuit 43. The NAND circuit 43 has the first input terminal coupled to the output terminal Q of the latch 42, the second input terminal coupled to the output terminal Q of the latch 41 and the data terminal D of the latch 42, and an output terminal coupled to a second input terminal of the NAND circuit 44. The NAND circuit 44 has a first input terminal supplied with the pulse signal PLSA, the second input terminal coupled to the output terminal of the NAND circuit 43, and an output terminal coupled to the data terminal D of the latch 45. The latch 45 has the data terminal D coupled to the output terminal of the NAND circuit 44, the enable terminal E supplied with the clock signal CLK, and the output terminal Q coupled to the adder 33. The latch 45 outputs the detection signal DETA from the output terminal Q.

The edge detector 40A has been described above, but the same applies to the edge detector 40B. In the edge detector 40B, the data terminal D of the latch 41 and the first input terminal of the NAND circuit 44 are supplied with the pulse signal PLSB. The output terminal Q of the latch 45 is coupled to the adder 33. This latch 45 outputs the detection signal DETB from the output terminal Q.

With this configuration, the edge detector 40A detects a rising edge of the pulse signal PLSA to generate the detection signal DETA including an edge pulse PE based on this rising edge. Likewise, the edge detector 40B detects a rising edge of the pulse signal PLSB to generate the detection signal DETB including the edge pulse PE based on this rising edge.

The adder 33 is configured to generate the detection value VAL indicating the number of detection times of the reflected light pulse L1 in each of the plurality of detection period Pdet by performing addition processing, on the basis of the detection signal DETA generated by the edge detector 40A and the detection signal DETB generated by the edge detector 40B. For example, the adder 33 is formed on the semiconductor substrate 102. The adder 33 includes an adder circuit 34 and a latch section 35.

The adder circuit 34 is configured to calculate the number of edge pulses PE in the detection signals DETA and DETB. Specifically, for example, the adder circuit 34 outputs "0" in a case where the edge pulse PE is not generated in both the detection signals DETA and DETB, outputs "1" in a case where the edge pulse PE is generated in one of the detection signals DETA and DETB, and outputs "2" in a case where the edge pulse PE is generated in both the detection signals DETA and DETB. The adder circuit 34 supplies such values of "0" to "2" with use of, for example, a 2-bit signal.

The latch section 35 is configured to generate the detection value VAL on the basis of the inverted signal (clock signal CLKB) of the clock signal CLK by latching a signal outputted from the adder circuit 34. The latch section 35 includes two latches. The two latches latch the 2-bit signal supplied from the adder circuit 34.

The clock generator 22 (FIG. 2) is configured to generate the clock signal CLK on the basis of an instruction from the photodetection controller 25 and supply the clock signal CLK to the plurality of photodetection units U in the photodetection array 21.

The readout controller 23 is configured to control an operation of supplying the readout section 24 with the detection value VAL generated in each of the plurality of photodetection units U in the photodetection array 21, on the basis of an instruction from the photodetection controller 25. For example, the readout controller 23 controls operations of the plurality of photodetection units U to sequentially select the photodetection units U for one row, and cause the selected photodetection units U to supply the detection values VAL to the readout section 24.

The readout section 24 is configured to generate data DT including the detection values VAL supplied from the plurality of photodetection units U in the photodetection array 21 and output the generated data DT on the basis of an instruction from the photodetection controller 25.

The photodetection controller 25 is configured to control the operation of the photodetector 20 on the basis of an instruction from the controller 14 (FIG. 1) by supplying the clock generator 22, the readout controller 23, and the readout section 24 with control signals and controlling operations of the clock generator 22, the readout controller 23, and the readout section 24.

Here, the light-receiving section 31 corresponds to a specific example of a "light-receiving section" in the present disclosure. The edge detector 40 corresponds to a specific example of a "edge detector" in the present disclosure. The adder 33 corresponds to a specific example of an "adder" in the present disclosure. The photodiode PD corresponds to a specific example of a "light-receiving element" in the present disclosure. The pulse signal PLS corresponds to a specific example of a "pulse signal" in the present disclosure. The detection signal DET corresponds to a specific example of a "detection signal" in the present disclosure.

The detection value VAL corresponds to a specific example of a "detection value" in the present disclosure. The latch 41 corresponds to a specific example of a "first latch circuit" in the present disclosure. The latch 42 corresponds to a specific example of a "second latch circuit" in the present disclosure. The NAND circuits 43 and 44 correspond to specific examples of a "combination circuit" in the present disclosure. The latch 45 corresponds to a specific example of a "third latch circuit" in the present disclosure.

[Operation and Workings]

Next, the operation and workings of the photodetection system 1 according to the present embodiment are described.

(Overview of Overall Operation)

First, an overview of the overall operation of the photodetection system 1 is described with reference to FIGS. 1 and 2. The light-emitting section 11 emits the light pulse L0 toward the detection object OBJ on the basis of an instruction from the controller 14. The optical system 12 forms an image on the light-receiving surface S of the photodetector 20. The photodetector 20 detects the reflected light pulse L1 on the basis of an instruction from the controller 14. The controller 14 supplies the light-emitting section 11 and the photodetector 20 with control signals and controls operations of the light-emitting section 11 and the photodetector 20 to thereby control the operation of the photodetection system 1.

In the photodetector 20, the photodetection units U of the photodetection array 21 each generate the detection value VAL by detecting the reflected light pulse L1. The detection value indicates the number of detection times of the reflected light pulse L1 in each of the plurality of detection period Pdet The clock generator 22 generates the clock signal CLK on the basis of an instruction from the photodetection controller 25, and supplies the clock signal CLK to the plurality of photodetection units U. The readout controller 23 controls an operation of supplying the readout section 24 with the detection value VAL generated in each of the plurality of photodetection units U in the photodetection array 21, on the basis of an instruction from the photodetection controller 25. The readout section 24 generates the data DT including the detection values VAL supplied from the plurality of photodetection units U in the photodetection array 21 and outputs the generated data DT on the basis of an instruction from the photodetection controller 25. The photodetection controller 25 controls the operation of the photodetector 20 on the basis of an instruction from the controller 14 by supplying the clock generator 22, the readout controller 23, and the readout section 24 with control signals and controlling the operations of the clock generator 22, the readout controller 23, and the readout section 24.

(Detailed Operation)

In the photodetection unit U (FIG. 4), the light-receiving section 31A generates the pulse signal PLSA by detecting light, and supplies the generated pulse signal PLSA to the edge detector 40A. The edge detector 40A generates the detection signal DETA by detecting the edge of the pulse signal PLSA, and supplies the generated detection signal DETA to the adder 33. The light-receiving section 31B generates the pulse signal PLSB by detecting light, and supplies the generated pulse signal PLSB to the edge detector 40B. The edge detector 40B generates the detection signal DETB by detecting the edge of the pulse signal PLSB, and supplies the generated detection signal DETB to the adder 33. The adder 33 performs addition processing on the basis of the detection signal DETA generated by the edge detector 40A and the detection signal DETB generated by the edge detector 40B to generate the detection value VAL. This operation is described in detail below.

FIGS. 8A, 8B, 8C, 8D, 8E, 8F, and 8G illustrate an operation example of the photodetection unit U. FIG. 8A indicates a waveform of light emitted from the light-emitting section 11. FIG. 8B indicates a waveform of the clock signal CLK. FIG. 8C indicates a waveform of the pulse signal PLSA. FIG. 8D indicates a waveform of a signal S41 outputted from the latch 41 of the edge detector 40A. FIG. 8E indicates a waveform of a signal S42 outputted from the latch 42 of the edge detector 40A. FIG. 8F indicates a waveform of the detection signal DETA. FIG. 8G indicates a waveform of a signal indicating the detection value VAL. One period of the clock signal CLK is the detection period Pdet in the edge detectors 40A and 40B.

In a period from a timing t11 to a timing t13, the light-emitting section 11 emits the light pulse L0 toward the detection object OBJ on the basis of an instruction from the controller 14 (FIG. 8A). A portion of the light pulse L0 is reflected by the detection object OBJ. The reflected light pulse L1 then enters the photodetector 20 through the optical system 12. The light-receiving section 31A generates the pulse signal PLSA by detecting the reflected light pulse L1 (FIG. 8C). This pulse signal PLSA includes a pulse P1 starting from a timing t12 and a pulse P2 starting from a timing t18.

The latch 41 of the edge detector 40A captures the pulse signal PLSA and outputs the captured signal from the output terminal Q in a case where the clock signal CLK is in the high level, and generates the signal S41 by maintaining a signal at the output terminal Q in a case where the clock signal CLK is in the low level (FIGS. 8B, 8C, and 8D). Accordingly, the signal S41 changes from the low level to the high level in response to a rising edge of the pulse signal PLSA at the timing t12 in a period in which the clock signal CLK is in the high level, and changes from the high level to the low level in response to a falling edge of the pulse signal PLSA at a timing t15 in a period in which the clock signal CLK is in the high level. In addition, the signal S41 changes from the low level to the high level in response to a rising edge of the clock signal CLK at a timing t19 after the pulse signal PLSA has risen, and changes from the high level to the low level in response to a rising edge of the clock signal CLK at a timing t22 after the pulse signal PLSA has fallen.

The latch 42 of the edge detector 40A captures the signal S41 and outputs the captured signal from the output terminal Q in a case where the clock signal CLK is in the low level, and generates the signal S42 by maintaining a signal at the output terminal Q in a case where the clock signal CLK is in the high level (FIGS. 8B, 8C, and 8E). Accordingly, the signal S42 changes from the low level to the high level in response to a falling edge of the clock signal CLK at the timing t13 after the signal S41 has risen, and changes from the high level to the low level in response to the falling edge of the clock signal CLK at a timing t16 after the signal S41 has fallen. In addition, the signal S42 changes from the low level to the high level in response to a falling edge of the clock signal CLK at a timing t20 after the signal S41 has risen, and changes from the high level to the low level in response to a falling edge of the clock signal CLK at a timing t23 after the signal S41 has fallen.

The latch 45 of the edge detector 40A captures a signal outputted from the NAND circuit 44 and outputs the captured signal from the output terminal Q in a case where the clock signal CLK is in the high level, and generates the detection signal DETA by maintaining a signal at the output terminal Q in a case where the clock signal CLK is in the low level (FIG. 8E).

Accordingly, the detection signal DETA changes from the high level to the low level in response to the rising edge of the pulse signal PLSA at the timing t12 in the period in which the clock signal CLK is in the high level, and changes from the low level to the high level in response to a rising edge of the clock signal CLK at a timing t14. This pulse (edge pulse PE1) of the detection signal DETA is a pulse based on a rising edge of the pulse P1 (FIG. 8C) of the pulse signal PLSA. The timing t12 at which the pulse P1 of the pulse signal PLSA starts is a timing in the detection period Pdet from the timing t11 to the timing t13; therefore, the edge pulse PE1 of the detection signal DETA straddles the timing t13 at which this detection period Pdet ends.

In addition, the detection signal DETA changes from the high level to the low level in response to the rising edge of the clock signal CLK at the timing t19 after the pulse signal PLSA has risen, and changes from the low level to the high level in response to a falling edge of the clock signal CLK at the timing t22. This pulse (edge pulse PE2) of the detection signal DETA is a pulse based on a rising edge of the pulse P2 (FIG. 8C) of the pulse signal PLSA. The timing t18 at which the pulse P2 of the pulse signal PLSA starts is a timing in the detection period Pdet from a timing t17 to the timing t20; therefore, the edge pulse PE2 of the detection signal DETA straddles the timing t20 at which this detection period Pdet ends.

As described above, the edge pulse PE of the detection signal DETA straddles a timing at which the detection period Pdet ends. Accordingly, it is possible for the adder 33 in a stage subsequent to the edge detectors 40A and 40B to correctly perform addition processing at this timing on the basis of the edge pulses PE generated by the edge detectors 40A and 40B. In addition, the edge pulse PE ends in the detection period Pdet subsequent to that detection period Pdet. Specifically, the edge pulse PE1 starting from the timing t12 ends at the timing t14 in the detection period Pdet (the timing t13 to the timing t16) subsequent to the detection period Pdet including the timing t12. This makes it possible to reduce, for example, a possibility of double counting of one edge pulse PE.

Thus, the light-receiving section 31A generates the pulse signal PLSA by detecting the reflected light pulse L1, and the edge detector 40A detects the rising edge of the pulse signal PLSA to generate the detection signal DETA including the edge pulse PE based on this rising edge.

Likewise, the light-receiving section 31B generates the pulse signal PLSB by detecting the reflected light pulse L1, and the edge detector 40B detects the rising edge of the pulse signal PLSB to generate the detection signal DETB including the edge pulse PE based on this rising edge.

The adder circuit 34 of the adder 33 then calculates the number of the edge pulses PE in the detection signals DETA and DETB. Specifically, for example, the adder circuit 34 outputs "0" in a case where the edge pulse PE is not generated in both the detection signals DETA and DETB, outputs "1" in a case where the edge pulse PE is generated in one of the detection signals DETA and DETB, and outputs "2" in a case where the edge pulse PE is generated in both the detection signals DETA and DETB. Then, the latch section 35 captures a signal supplied from the adder circuit 34 and outputs the captured signal from the output terminal Q in a case where the clock signal CLK is in the low level, and generates the detection value VAL by maintaining a signal at the output terminal Q in a case where the clock signal CLK is in the high level (FIG. 8G). Accordingly, the adder 33 generates the detection value VAL on the basis of the falling edge of the clock signal CLK. As described above, the edge pulse PE (FIG. 8F) of the detection signal DETA straddles the timing at which the detection period Pdet ends. The same applies to the detection signal DETB. The timing at which the detection period Pdet ends is a timing of the falling edge of the clock signal CLK. Accordingly, it is possible for the adder 33 to correctly perform addition processing at the timing of the falling edge of the clock signal CLK.

As described above, each of the plurality of photodetection units U in the photodetection array 21 generates the detection value VAL by detecting the reflected light pulse L1. The readout section 24 generates the data DT including the detection values VAL supplied from the plurality of photodetection units U in the photodetection array 21 and outputs the generated data DT on the basis of an instruction from the photodetection controller 25.

A circuit in a stage subsequent to the photodetection system 1 is able to measure time from emission of the light pulse L0 by the light-emitting section 11 to detection of the reflected light pulse L1 by the photodetection unit U on the basis of, for example, the detection value VAL in each detection period Pdet that is included in this data DT and is obtained by a certain photodetection unit U, and measure a distance to the detection object OBJ on the basis of the time.

Thus, in the photodetection system 1, each of the plurality of edge detectors 40 includes a first latch circuit (latch 41) that generates a first signal (signal S41) by latching the pulse signal PLS on the basis of the clock signal CLK, a second latch circuit (latch 42) that generates a second signal (signal S42) by latching the first signal (signal S41) on the basis of the clock signal CLKB that is the inverted signal of the clock signal CLK, a combination circuit (NAND circuits 43 and 44) that generates a third signal on the basis of the pulse signal PLS, the first signal (signal S41), and the second signal (signal S42), and a third latch circuit (latch 45) that generates the detection signal DET by latching the third signal on the basis of the clock signal CLK. This makes it possible to reduce a circuit area, as compared with a technology described in PTL 1, for example. In other words, in PTL 1, an edge detector includes two flip-flops (that is, four latches), which may cause an increase in circuit area. In contrast, in the photodetection system 1 according to the present embodiment, only three latches are provided, which makes it possible to reduce the circuit area. Accordingly, it is possible to reduce the size of the photodetector 20, for example. Alternatively, it is possible to provide more photodetection units U in the photodetection array 21, which makes it possible to increase resolution.

In addition, in the photodetection system 1, the pulse width Tpw of the pulse signal PLS is equal to or larger than the time width of the detection period Pdet. Specifically, in the photodetection system 1, the delay circuit DEL is provided to cause the pulse width Tpw to be equal to or larger than the time width of the detection period Pdet. Accordingly, it is possible for the edge detector 40 to normally detect the edge of the pulse signal PLS, which makes it possible to reduce a possibility of decreasing detection accuracy of the photodetection system 1. In other words, for example, in a case where the pulse width Tpw of the pulse signal PLS is narrow, the edge detector 40 may not be able to normally detect the edge of the pulse signal PLS. In this case, detection accuracy in the photodetection system 1 is decreased. In contrast, in the photodetection system 1, the pulse width Tpw of the pulse signal PLS is equal to or larger than the time width of the detection period Pdet. Accordingly, in the photodetection system 1, it is possible for the edge detector 40 to normally detect the edge of the pulse signal PLS, which makes it possible to reduce the possibility of decreasing detection accuracy.

[Effects]

As described above, in the present embodiment, each of the plurality of edge detectors includes the first latch circuit that generates the first signal by latching the pulse signal on the basis of the clock signal, the second latch circuit that generates the second signal by latching the first signal on the basis of the inverted signal of the clock signal, the combination circuit that generates the third signal on the basis of the pulse signal, the first signal, and the second signal, and the third latch circuit that generates the detection signal by latching the third signal on the basis of the clock signal, which makes it possible to reduce a circuit area.

In the present embodiment, the pulse width of the pulse signal is equal to or larger than the time width of the detection period, which makes it possible to reduce a possibility of decreasing detection accuracy.

Modification Example 1-1

In the embodiment described above, the adder 33 calculates the number of the edge pulses PE in each of the plurality of detection periods Pdet to generate the detection value VAL, but this it not limitative. For example, the number of the edge pulses PE in a plurality of detection periods Pdet may be calculated. The present modification example is described in detail below with reference to some examples.

A photodetection system 1A according to the present modification example includes a photodetector 20A, as with the photodetection system 1 (FIG. 1) according to the embodiment described above. The photodetector 20A includes a photodetection array 21A, a readout controller 23A, and a readout section 24A, as with the photodetector 20 (FIG. 2) according to the embodiment described above.

FIG. 9 illustrates an example of the photodetection unit U in the photodetection array 21A. The photodetection unit U includes a count section 36. The count section 36 is configured to generate an accumulated value VAL1 by performing cumulative addition processing on the basis of the detection value VAL generated by the adder 33 over a plurality of detection periods Pdet. The count section 36 includes an adder circuit 37 and a flip-flop (F/F) section 38. The adder circuit 37 is configured to add the detection value VAL generated by the adder 33 and a value (accumulated value VAL1) held by the flip-flop section 38. The flip-flop section 38 is configured to sample a signal outputted from the adder circuit 37 and hold a sampled result as the accumulated value VAL1 on the basis of the falling edge of the clock signal CLK. The flip-flop section 38 includes a plurality of flip-flops. The flip-flops each include, for example, NAND circuits 51 to 58 and an inverter 59, as illustrated in FIG. 10. The flip-flops are master-slave flip-flops. The NAND circuits 51 to 54 configure a master latch, and the NAND circuits 55 to 58 configure a slave latch. The flip-flop section 38 is reset every time a period A including a plurality of detection periods Pdet elapses. Here, the adder circuit 37 and the flip-flop section 38 correspond to specific examples of a "cumulative adder" in the present disclosure. The accumulated value VAL1 corresponds to a specific example of an "accumulated value" in the present disclosure.

The readout controller 23A is configured to control an operation of supplying the readout section 24A with the accumulated value VAL1 generated in each of the plurality of photodetection units U in the photodetection array 21A, on the basis of an instruction from the photodetection controller 25.

The readout section 24A is configured to generate the data DT including the accumulated values VAL1 supplied from the plurality of photodetection units U in the photodetection array 21A and output the generated data DT on the basis of an instruction from the photodetection controller 25.

Thus, in the photodetection system 1A, cumulative addition processing is performed on the basis of the detection values VAL to generate the accumulated value VAL1 of the detection values VAL. Accordingly, in the photodetection system 1A, it is possible to measure time from emission of the light pulse L0 by the light-emitting section 11 to detection of the reflected light pulse L1 by the photodetection unit U with use of, for example, the period A including a plurality of detection periods Pdet as a unit.

Another photodetection system 1B according to the present modification example includes a photodetector 20B, as with the photodetection system 1 (FIG. 1) according to the embodiment described above. The photodetector 20B includes a photodetection array 21B, a readout controller 23B, and a readout section 24B, as with the photodetector 20 (FIG. 2) according to the embodiment described above.

FIG. 11 illustrates an example of the photodetection unit U in the photodetection array 21B. The photodetection unit U includes a count section 46. The count section 46 is configured to generate a count value CNT by performing cumulative addition processing on the basis of the detection value VAL generated by the adder 33 over a plurality of detection periods Pdet. The count section 46 includes an adder circuit 37, a flip-flop section 48, and a counter 49. The flip-flop section 48 is configured to sample a signal outputted from the adder circuit 37 and hold a sampled result as the accumulated value VAL1 on the basis of the falling edge of the clock signal CLK, as with the flip-flop section 38. In addition, the flip-flop section 48 has a function of setting a carry flag FC active every time the accumulated value VAL1 reaches a predetermined upper limit value. The counter 49 is configured to increment the count value CNT on the basis of this carry flag FC. In other words, in the count section 46, the flip-flop section 48 operates as a low-order counter, and the counter 49 operates as a high-order counter. The flip-flop section 48 and the counter 49 are reset every time the period A including a plurality of detection periods Pdet elapses. It is to be noted that, in this example, the count value CNT is a count value of the counter 49, but this is not limitative. The count value CNT may include the count value of the counter 49 as a high-order bit and the accumulated value VAL1 as a low-order bit. Here, the adder circuit 37 and the flip-flop section 48 correspond to specific examples of a "cumulative adder" in the present disclosure. The counter 49 corresponds to a specific example of a "counter" in the present disclosure.

The readout controller 23B is configured to control an operation of supplying the readout section 24B with the count value CNT generated in each of the plurality of photodetection units U in the photodetection array 21B, on the basis of an instruction from the photodetection controller 25.

The readout section 24B is configured to generate the data DT including the count values CNT supplied from the plurality of photodetection units U in the photodetection array 21B and output the generated data DT on the basis of an instruction from the photodetection controller 25.

Thus, in the photodetection system 1B, cumulative addition processing is performed on the basis of the detection values VAL to generate the count value CNT that is an accumulated value of the detection values VAL. Accordingly, in the photodetection system 1B, it is possible to measure time from emission of the light pulse L0 by the light-emitting section 11 to detection of the reflected light pulse L1 by the photodetection unit U with use of, for example, the period A including a plurality of detection periods Pdet as a unit. In particular, in the photodetection system 1B, for example, the period A is set longer than that in the photodetection system 1A, thereby making it possible to expand a count range.

Modification Example 1-2

In the embodiment described above, as illustrated in FIG. 4, the edge detector 40 includes the NAND circuits 43 and 44, but this is not limitative. In place of the NAND circuits 43 and 44, the edge detector 40 may include various combination circuits that perform a similar logical operation.

Other Modification Examples

Two or more of these modification examples may be combined.

2. Second Embodiment

Next, description is given of a photodetection system 2 according to a second embodiment. The present embodiment has a configuration in which two adders are provided and the edge pulse PE generated by the edge detector is supplied to an adder corresponding to the detection period Pdet in which the edge pulse PE is not generated of the two adders. It is to be noted that components substantially the same as those of the photodetection system 1 according to the first embodiment described above are denoted by the same reference numerals, and description thereof is omitted as appropriate.

The photodetection system 2 includes a photodetector 60, as with the photodetection system 1 (FIG. 1) according to the first embodiment described above. The photodetector 60 includes a photodetection array 61, a readout controller 63, and a readout section 64, as with the photodetector 20 (FIGS. 20A, 20B, 20C, 20D, 20E, 20F 20G, 20H, 20I, 20J, 20K, 20L, 20M, 20N, 20O, 20P, 20Q, 20R, 20S, 20T, 20U, and 20V) according to the first embodiment described above.

FIG. 12 illustrates an example of the photodetection unit U in the photodetection array 61. The photodetection unit U includes a plurality of light-receiving sections 31 (two light-receiving sections 31A and 31B in this example), a plurality of edge detectors 70 (two edge detectors 70A and 70B in this example), and two adders 33A and 33B. It is to be noted that, in this example, two light-receiving sections 31 and two edge detectors 70 are provided, but this is not limitative. Three or more light-receiving sections 31 and three or more edge detectors 70 may be provided.

The edge detector 70A is configured to generate detection signals DETA1 and DETA2 by detecting an edge of the pulse signal PLSA supplied from the light-receiving section 31A, and supply the detection signal DETA1 to the adder 33A and supply the detection signal DETA2 to the adder 33B. The edge detector 70B is configured to generate detection signals DETB1 and DETB2 by detecting an edge of the pulse signal PLSB supplied from the light-receiving section 31B, and supply the detection signal DETB1 to the adder 33A and supply the detection signal DETB2 to the adder 33B.

The edge detector 70A includes latches 71 and 72, an inverter 73, negative OR (NOR) circuits 74 and 75, and latches 76 and 77. The latches 71, 72, 76, and 77 each have a circuit configuration similar to that of the latch 41 (FIG. 7) according to the first embodiment described above.

In the edge detector 70A, the latch 71 has the data terminal D supplied with the pulse signal PLSA, the enable terminal E supplied with the clock signal CLK, and the output terminal Q coupled to a second input terminal of the NOR circuit 74. The latch 72 has the data terminal D supplied with the pulse signal PLSA, the enable terminal E supplied with the inverted signal (clock signal CLKB) of the clock signal CLK, and the output terminal Q coupled to a second input terminal of the NOR circuit 75. The inverter 73 has an input terminal supplied with the pulse signal PLSA, and an output terminal coupled to a first input terminal of the NOR circuit 74 and a first input terminal of the NOR circuit 75. The NOR circuit 74 has the first input terminal coupled to the output terminal of the inverter 73 and the first input terminal of the NOR circuit 75, the second input terminal coupled to the output terminal Q of the latch 71, and an output terminal coupled to the data terminal D of the latch 76. The NOR circuit 75 has the first input terminal coupled to the output terminal of the inverter 73 and the first input terminal of the NOR circuit 74, the second input terminal coupled to the output terminal Q of the latch 72, and an output terminal coupled to the data terminal D of the latch 77. The latch 76 has the data terminal D coupled to the output terminal of the NOR circuit 74, the enable terminal E supplied with the inverted signal (clock signal CLKB) of the clock signal CLK, and the output terminal Q coupled to the adder 33A. The latch 76 outputs the detection signal DETA1 from the output terminal Q. The latch 77 has the data terminal D coupled to the output terminal of the NOR circuit 75, the enable terminal E supplied with the clock signal CLK, and the output terminal Q coupled to the adder 33B. The latch 77 outputs the detection signal DETA2 from the output terminal Q.

The edge detector 70A has been described above, but the same applies to the edge detector 70B. In the edge detector 70B, the data terminals D of the latches 71 and 72 and the input terminal of the inverter 73 are supplied with the pulse signal PLSB. The latch 76 has the output terminal Q coupled to the adder 33A, and the latch 77 has the output terminal Q coupled to the adder 33B. The latch 76 outputs the detection signal DETB1 from the output terminal Q, and the latch 77 outputs the detection signal DETB2 from the output terminal Q.

With this configuration, the edge detector 70A detects a rising edge of the pulse signal PLSA to generate the detection signals DETA1 and DETA2 including the edge pulse PE based on this rising edge. Likewise, the edge detector 70B detects a rising edge of the pulse signal PLSB to generate the detection signals DETB1 and DETB2 including the edge pulse PE based on this rising edge.

The adder 33A is configured to generate a detection value VALA by performing addition processing, on the basis of the detection signal DETA1 generated by the edge detector 70A and the detection signal DETB1 generated by the edge detector 70B. The adder 33A includes the adder circuit 34 and a latch section 35A. The latch section 35A is configured to capture a signal supplied from the adder circuit 34 and output the captured signal from the output terminal Q in a case where the clock signal CLK is in the high level, and generate the detection value VALA by maintaining a signal at the output terminal Q in a case where the clock signal CLK is in the low level.

Likewise, the adder 33B is configured to generate a detection value VALB by performing addition processing, on the basis of the detection signal DETA2 generated by the edge detector 70A and the detection signal DETB2 generated by the edge detector 70B. The adder 33B includes the adder circuit 34 and a latch section 35B. The latch section 35B is configured to capture a signal supplied from the adder circuit 34 and output the captured signal from the output terminal Q in a case where the clock signal CLK is in the low level, and generate the detection value VALB by maintaining a signal at the output terminal Q in a case where the clock signal CLK is in the high level.

The readout controller 63 is configured to control an operation of supplying the readout section 64 with the detection values VALA and VALB generated in each of the plurality of photodetection units U in the photodetection array 61, on the basis of an instruction from the photodetection controller 25.

The readout section 64 is configured to generate the data DT including the detection values VALA and VALB supplied from the plurality of photodetection units U in the photodetection array 61 and output the generated data DT on the basis of an instruction from the photodetection controller 25.

Here, the edge detector 70 corresponds to a specific example of an "edge detector" in the present disclosure. The adder 33A corresponds to a specific example of a "first adder" in the present disclosure. The adder 33B corresponds to a specific example of a "second adder" in the present disclosure. The latch 71 corresponds to a specific example of a "first latch circuit" in the present disclosure. The latch 72 corresponds to a specific example of a "second latch circuit" in the present disclosure. The inverter 73 and the NOR circuit 74 correspond to specific examples of a "first combination circuit" in the present disclosure. The inverter 73 and the NOR circuit 75 correspond to specific examples of a "second combination circuit" in the present disclosure. The latch 76 corresponds to a specific example of a "third latch circuit" in the present disclosure. The latch 77 corresponds to a specific example of a "fourth latch circuit" in the present disclosure.

FIGS. 13A, 13B, 13C, 13D, 13E, 13F, 13G, 13H, and 13I illustrate an operation example of the photodetection unit U. FIG. 13A indicates a waveform of light emitted from the light-emitting section 11. FIG. 13B indicates a waveform of the clock signal CLK. FIG. 13C indicates a waveform of the pulse signal PLSA. FIG. 13D indicates a waveform of a signal S72 outputted from the latch 72 of the edge detector 70A. FIG. 13E indicates a waveform of a signal S71 outputted from the latch 71 of the edge detector 70A. FIG. 13F indicates a waveform of the detection signal DETA2. FIG. 13G indicates a waveform of the detection signal DETA1. FIG. 13H indicates a waveform of a signal indicating the detection value VALA. FIG. 13I indicates a waveform of a signal indicating the detection value VALB. A half period of the clock signal CLK is the detection period Pdet in the edge detectors 70A and 70B. Specifically, a period in which the clock signal CLK is in the low level is a detection period Pdet1, and a period in which the clock signal CLK is in the high level is a detection period Pdet2.

In a period from a timing t31 to a timing t33, the light-emitting section 11 emits the light pulse L0 toward the detection object OBJ on the basis of an instruction from the controller 14 (FIG. 13A). A portion of the light pulse L0 is reflected by the detection object OBJ. The reflected light pulse L1 then enters the photodetector 20 through the optical system 12. The light-receiving section 31A generates the pulse signal PLSA by detecting the reflected light pulse L1 (FIG. 13C). This pulse signal PLSA includes a pulse P3 starting from a timing t32 and a pulse P4 starting from a timing t37.

The latch 71 of the edge detector 70A captures the pulse signal PLSA, and outputs the captured signal from the output terminal Q in a case where the clock signal CLK is in the high level, and generates the signal S71 by maintaining a signal at the output terminal Q in a case where the clock signal CLK is in the low level (FIGS. 13B, 13C, and 13E). Accordingly, the signal S71 changes from the low level to the high level in response to a rising edge of the clock signal CLK at the timing t33 after the pulse signal PLSA has risen, and changes from the high level to the low level in response to a falling edge of the pulse signal PLSA at a timing t34 in a period in which the clock signal CLK is in the high level. In addition, the signal S71 changes from the low level to the high level in response to a rising edge of the pulse signal PLSA at a timing t37 in a period in which the lock signal CLK is in the high level, and changes from the high level to the low level in response to a rising edge of the clock signal CLK at a timing t40 after the pulse signal PLSA has fallen.

The latch 76 of the edge detector 70A captures a signal outputted from the NOR circuit 74 and outputs the captured signal from the output terminal Q in a case where the clock signal CLK is in the low level, and generates the detection signal DETA1 by maintaining a signal at the output terminal Q in a case where the clock signal CLK is in the high level (FIG. 13G). Accordingly, the detection signal DETA1 changes from the low level to the high level in response to a rising edge of the pulse signal PLSA at a timing t32 in a period in which the clock signal CLK is in the low level, and changes from the high level to the low level in response to a falling edge of the clock signal CLK at a timing t35. This pulse (edge pulse PE3) of the detection signal DETA1 is a pulse based on a rising edge of the pulse P3 (FIG. 13C) of the pulse signal PLSA. The timing t32 at which the pulse P3 of the pulse signal PLSA starts is a timing in the detection period Pdet1 from the timing t31 to the timing t33; therefore, the edge pulse PE3 of the detection signal DETA1 straddles the timing t33 at which this detection period Pdet1 ends.

The latch 72 of the edge detector 70A captures the pulse signal PLSA and outputs the captured signal from the output terminal Q in a case where the clock signal CLK is in the low level, and generates the signal S72 by maintaining a signal at the output terminal Q in a case where the clock signal CLK is in the high level (FIGS. 13B, 13C, and 13D). Accordingly, the signal S72 changes from the low level to the high level in response to the rising edge of the pulse signal PLSA at the timing t32 in a period in which the clock signal CLK is in the low level, and changes from the high level to the low level in response to the falling edge of the clock signal CLK at the timing t35 after the pulse signal PLSA has fallen. In addition, the signal S72 changes from the low level to the high level in response to a falling edge of the clock signal CLK at a timing t38 after the pulse signal PLSA has risen, and changes from the high level to the low level in response to a falling edge of the pulse signal PLSA at a timing t39 in a period in which the clock signal CLK is in the low level.

The latch 77 of the edge detector 70A captures a signal outputted from the NOR circuit 75 and outputs the captured signal from the output terminal Q in a case where the clock signal CLK is in the high level, and generates the detection signal DETA2 by maintaining a signal at the output terminal Q in a case where the clock signal CLK is in the low level (FIG. 13F). Accordingly, the detection signal DETA2 changes from the low level to the high level in response to the rising edge of the pulse signal PLSA at the timing t37 in a period in which the clock signal CLK is in the high level, and changes from the high level to the low level in response to the rising edge of the clock signal CLK at the timing t40. This pulse (edge pulse PE4) of the detection signal DETA2 is a pulse based on a rising edge of the pulse P4 (FIG. 13C) of the pulse signal PLSA. The timing t37 at which the pulse P4 of the pulse signal PLSA starts is a timing in the detection period Pdet2 from a timing t36 to the timing t38; therefore, the edge pulse PE4 of the detection signal DETA2 straddles the timing t38 at which this detection period Pdet2 ends.

Thus, the light-receiving section 31A generates the pulse signal PLSA by detecting the reflected light pulse L1. The edge detector 70A detects the rising edge of the pulse signal PLSA in the detection period Pdet1 to generate the detection signal DETA1 including the edge pulse PE based on this rising edge, and detects the rising edge of the pulse signal PLSA in the detection period Pdet2 to generate the detection signal DETA2 including the edge pulse PE based on this rising edge.

Likewise, the light-receiving section 31B generates the pulse signal PLSB by detecting the reflected light pulse L1. The edge detector 70B detects the rising edge of the pulse signal PLSB in the detection period Pdet1 to generate the detection signal DETB1 including the edge pulse PE based on this rising edge, and detects the rising edge of the pulse signal PLSB in the detection period Pdet2 to generate the detection signal DETB2 including the edge pulse PE based on this rising edge.

The adder circuit 34 of the adder 33A then calculates the number of the edge pulses PE in the detection signals DETA1 and DETB1. Then, the latch section 35A captures a signal supplied from the adder circuit 34 and outputs the captured signal from the output terminal Q in a case where the clock signal CLK is in the high level, and generates the detection value VALA by maintaining a signal at the output terminal Q in a case where the clock signal CLK is in the low level (FIG. 13H). Accordingly, the adder 33A generates the detection value VALA on the basis of the rising edge of the clock signal CLK. As described above, the edge pulse PE (FIG. 13G) of the detection signal DETA1 straddles the timing at which the detection period Pdet1 ends. The same applies to the detection signal DETB1. The timing at which the detection period Pdet1 ends is a timing of the rising edge of the clock signal CLK. Accordingly, it is possible for the adder 33A to correctly perform addition processing at the timing of the rising edge of the clock signal CLK.

Likewise, the adder circuit 34 of the adder 33B calculates the number of the edge pulses PE in the detection signals DETA2 and DETB2. Then, the latch section 35B captures a signal supplied from the adder circuit 34 and outputs the captured signal from the output terminal Q in a case where the clock signal CLK is in the low level, and generates the detection value VALB by maintaining a signal at the output terminal Q in a case where the clock signal CLK is in the high level (FIG. 13I). Accordingly, the adder 33B generates the detection value VALB on the basis of the falling edge of the clock signal CLK. As described above, the edge pulse PE (FIG. 13F) of the detection signal DETA2 straddles the timing at which the detection period Pdet2 ends. This applies to the detection signal DETB2. The timing at which the detection period Pdet2 ends is a timing of the falling edge of the clock signal CLK. Accordingly, it is possible for the adder 33A to correctly perform addition processing at the timing of the falling edge of the clock signal CLK.

Thus, the adder 33A performs addition processing on the basis of the edge pulse PE in the detection period Pdet1 to generate the detection value VALA, and the adder 33B performs addition processing on the basis of the edge pulse PE in the detection period Pdet2 to generate the detection value VALB.

As described above, each of the plurality of photodetection units U in the photodetection array 61 generates the detection values VALA and VALB by detecting the reflected light pulse L1. The readout section 64 generates the data DT including the detection values VALA and VALB supplied from the plurality of photodetection units U in the photodetection array 61 and outputs the generated data DT on the basis of an instruction from the photodetection controller 25.

Thus, in the photodetection system 2, each of the plurality of edge detectors 70 includes the first latch circuit (latch 71) that generates the first signal (signal S71) by latching the pulse signal PLS on the basis of the clock signal CLK, the second latch circuit (latch 72) that generates the second signal (signal S72) by latching the pulse signal PLS on the basis of the clock signal CLKB that is the inverted signal of the clock signal CLK, a first combination circuit (NOR circuit 74) that generates the third signal on the basis of the pulse signal PLS and the first signal (signal S71), and a second combination circuit (NOR circuit 75) that generates a fourth signal on the basis of the pulse signal PLS and the second signal (signal S72). Accordingly, in the photodetection system 2, it is possible to reduce the number of circuits even in a case where the edge pulse PE generated by the edge detector 70 is supplied to one of the two adders 33A and 33B in accordance with the detection period Pdet, which makes it possible to reduce a circuit area.

In addition, in the photodetection system 2, as with the first embodiment described above, the pulse width Tpw of the pulse signal PLS is equal to or larger than the time width of the detection period Pdet, which makes it possible for the edge detector 70 to normally detect the edge of the pulse signal PLS. This makes it possible to reduce a possibility of decreasing detection accuracy.

As described above, in the present embodiment, each of the plurality of edge detectors includes the first latch circuit that generates the first signal by latching the pulse signal on the basis of the clock signal, the second latch circuit that generates the second signal by latching the pulse signal on the basis of the inverted signal of the clock signal, the first combination circuit that generates the third signal on the basis of the pulse signal and the first signal, and the second combination circuit that generates the fourth signal on the basis of the pulse signal and the second signal, which makes it possible to reduce a circuit area even in a case where the generated edge pulse is supplied to one of the two adders in accordance with a detection period t.

In the present embodiment, the pulse width of the pulse signal is equal to or larger than the time width of the detection period, which makes it possible to reduce a possibility of decreasing detection accuracy.

Modification Example 2-1

In the embodiment described above, each of the two adders 33 performs addition processing to generate the detection value VAL. However, for example, as with the modification example 1 of the first embodiment described above, the number of the edge pulses PE in a plurality of the detection period Pdet1 may be calculated, and the number of the edge pulses PE in a plurality of the detection periods Pdet2 may be calculated. A photodetection system 2B according to the present modification example is described in detail below.

The photodetection system 2B includes a photodetector 60B, as with the photodetection system 2 according to the embodiment described above. The photodetector 60B includes a photodetection array 61B, a readout controller 63B, and a readout section 64B, as with the photodetector 60 according to the embodiment described above.

FIG. 14 illustrates an example of the photodetection unit U in the photodetection array 61B. The photodetection unit U includes count sections 46A and 46B.

The count section 46A is configured to generate a count value CNTA by performing cumulative addition processing on the basis of the detection value VALA generated by the adder 33A over a plurality of detection periods Pdet1. The count section 46A includes the adder circuit 37, a flip-flop section 48A, and the counter 49. The flip-flop section 48A is configured to sample a signal outputted from the adder circuit 37 and hold a sampled result as the accumulated value VAL1 on the basis of the falling edge of the clock signal CLK. In addition, the flip-flop section 48A has a function of setting the carry flag FC active every time the accumulated value VAL1 reaches a predetermined upper limit value. The counter 49 is configured to increment the count value CNTA on the basis of this carry flag FC. It is to be noted that, in this example, the count value CNTA is a count value of the counter 49, but this is not limitative. The count value CNTA may include the count value of the counter 49 as a high-order bit and the accumulated value VAL1 as a low-order bit.

Likewise, the count section 46B is configured to generate a count value CNTB by performing cumulative addition processing on the basis of the detection value VALA generated by the adder 33B over a plurality of detection periods Pdet2. The count section 46A includes the adder circuit 37, a flip-flop section 48B, and the counter 49. The flip-flop section 48B is configured to sample a signal outputted from the adder circuit 37 and hold a sampled result as the accumulated value VAL1 on the basis of the falling edge of the clock signal CLK. In addition, the flip-flop section 48A has a function of setting the carry flag FC active every time the accumulated value VAL1 reaches a predetermined upper limit value. The counter 49 is configured to increment the count value CNTB on the basis of this carry flag FC. It is to be noted that, in this example, the count value CNTB is a count value of the counter 49, but this is not limitative. The count value CNTB may include the count value of the counter 49 as a high-order bit and the accumulated value VAL1 as a low-order bit.

The readout controller 63B is configured to control an operation of supplying the readout section 64B with the count values CNTA and CNTB generated in each of the photodetection units U in the photodetection array 61B on the basis of an instruction from the photodetection controller 25.

The readout section 64B is configured to generate the data DT including the count values CNTA and CNTB supplied from the plurality of photodetection units U in the photodetection array 61B and output the generated data DT on the basis of an instruction from the photodetection controller 25.

Modification Example 2-2

In the embodiment described above, the photodetection unit U performs an operation on the basis of one clock signal CLK, but this is not limitative. For example, the photodetection unit U may perform an operation on the basis of two clock signals CLK. A photodetection system 2C according to the present modification example is described in detail below.

The photodetection system 2C includes a photodetector 60C, as with the photodetection system 2 according to the embodiment descried above. The photodetector 60C includes a photodetection array 61C, a clock generator 62C, a readout controller 63C, and a readout section 64C, as with the photodetector 60 according to the embodiment described above.

FIG. 15 illustrates an example of the photodetection unit U in the photodetection array 61C. The photodetection unit U includes edge detectors 80A and 80B and adders 93A and 93B.

The edge detector 80A includes latches 81 and 82, an inverter 73, NOR circuits 74 and 75, and latches 86 and 87. The latch 81 has the data terminal D supplied with the pulse signal PLSA, the enable terminal E supplied with an inverted signal (clock signal CLK2B) of a clock signal CLK2, and the output terminal Q coupled to a second input terminal of the NOR circuit 74. The latch 82 has the data terminal D supplied with the pulse signal PLSA, the enable terminal E supplied with an inverted signal (clock signal CLK1B) of a clock signal CLK1, and the output terminal Q coupled to a second input terminal of the NOR circuit 75. The latch 86 has the data terminal D coupled to an output terminal of the NOR circuit 74, the enable terminal E supplied with the clock signal CLK2, and the output terminal Q coupled to the adder 93A. The latch 86 outputs the detection signal DETA1 from the output terminal Q. The latch 87 has the data terminal D coupled to an output terminal of the NOR circuit 75, the enable terminal E supplied with the clock signal CLK1, and the output terminal Q coupled to the adder 93B. The latch 87 outputs the detection signal DETA2 from the output terminal Q.

The edge detector 80A has been described above, but the same applies to the edge detector 80B. In the edge detector 80B, the data terminals D of the latches 81 and 82 are supplied with the pulse signal PLSB. The latch 86 has the output terminal Q coupled to the adder 93A, and the latch 87 has the output terminal Q coupled to the adder 93B. The latch 86 outputs the detection signal DETB1 from the output terminal Q, and the latch 87 outputs the detection signal DETB2 from the output terminal Q.

The adder 93A includes the adder circuit 34 and the latch section 35. The latch section 35 is configured to capture a signal supplied from the adder circuit 34 and output the captured signal from the output terminal Q in a case where the clock signal CLK2 is in the low level and generate the detection value VALA by maintaining a signal at the output terminal Q in a case where the clock signal CLK2 is in the high level.

Likewise, the adder 93B includes the adder circuit 34 and the latch section 35. The latch section 35 is configured to capture a signal supplied from the adder circuit 34 and output the captured signal from the output terminal Q in a case where the clock signal CLK1 is in the low level and generate the detection value VALB by maintaining a signal at the output terminal Q in a case where the clock signal CLK1 is in the high level.

The clock generator 62C is configured to generate the clock signals CLK1 and CLK2 on the basis of an instruction from the photodetection controller 25 and supply the clock signals CLK1 and CLK2 to the plurality of photodetection units U in the photodetection array 61C.

The readout controller 63C is configured to control an operation of supplying the readout section 64C with the detection values VALA and VALB generated in each of the plurality of photodetection units U in the photodetection array 61C on the basis of an instruction from the photodetection controller 25.

The readout section 64C is configured to generate the data DT including the detection values VALA and VALB supplied from the plurality of photodetection units U in the photodetection array 61C and output the generated data DT on the basis of an instruction from the photodetection controller 25.

For example, in a case where the clock signal CLK2 is an inverted signal of the clock signal CLK1, the photodetection unit U is able to operate similarly to the photodetection unit U according to the second embodiment described above. In the present modification example, changing waveforms of the clock signals CLK1 and CLK2 makes it possible to enhance the degree of freedom of operation.

Modification Example 2-3

In the embodiment described above, as illustrated in FIG. 12, the edge detector 70 includes the inverter 73 and the NOR circuits 74 and 75, but this is not limitative. In place of the inverter 73 and the NOR circuits 74 and 75, the edge detector 70 may include various combination circuits that perform a similar logical operation.

Other Modification Examples

Two or more of these modification examples may be combined.

3. Third Embodiment

Next, description is given of a photodetection system 3 according to a third embodiment. The present embodiment has a configuration in which a four-phase clock signal is generated and the edge pulses PE are counted in each of four detection periods Pdet based on this four-phase clock signal. It is to be noted that components substantially the same as those of the photodetection system 2 according to the second embodiment described above are denoted by the same reference numerals, and description thereof is omitted as appropriate.

The photodetection system 3 includes a photodetector 160, as with the photodetection system 2 according to the second embodiment described above. The photodetector 160 includes a photodetection array 161, a clock generator 162, a readout controller 163, and a readout section 164, as with the photodetector 60 according to the second embodiment described above.

FIG. 16 illustrates an example of the photodetection unit U in the photodetection array 161. The photodetection unit U includes logical OR (OR) circuits 168 and 169, a plurality of light-receiving sections 31 (two light-receiving sections 31A and 31B in this example), a plurality of edge detectors 170 (two edge detectors 170A and 170B in this example), two adders 33BD and 33AC, and two count sections 190BD and 190AC. It is to be noted that, in this example, two light-receiving sections 31 and two edge detectors 170 are provided, but this is not limitative. Three or more light-receiving sections 31 and three or more edge detectors 170 may be provided. The photodetection unit U is provided with clock signals CLKA, CLKB, CLKC, and CLKD that configure the four-phase clock signal.

The OR circuit 168 is configured to generate the clock signal CLKAC by finding logical OR of the clock signals CLKA and CLKC. The OR circuit 169 is configured to generate the clock signal CLKBD by finding logical OR of the clock signals CLKB and CLKD.

The edge detector 170A is configured to generate the detection signals DETA1 and DETA2 by detecting an edge of the pulse signal PLSA supplied from the light-receiving section 31A, and supply the detection signal DETA1 to the adder 33BD and supply the detection signal DETA2 to the adder 33AC. The edge detector 170B is configured to generate the detection signals DETB1 and DETB2 by detecting an edge of the pulse signal PLSB supplied from the light-receiving section 31B, and supply the detection signal DETB1 to the adder 33BD and supply the detection signal DETB2 to the adder 33AC.

The edge detector 170A includes latches 171 and 172, an inverter 73, NOR circuits 74 and 75, and latches 176 and 177. The latches 171, 172, 176, and 177 each have a circuit configuration similar to that of the latch 41 (FIG. 7) according to the first embodiment described above.

In the edge detector 170A, the latch 171 has the data terminal D supplied with the pulse signal PLSA, the enable terminal E supplied with an inverted signal of the clock signal CLKBD, and the output terminal Q coupled to a second input terminal of the NOR circuit 74. The latch 172 has the data terminal D supplied with the pulse signal PLSA, the enable terminal E supplied with an inverted signal of the clock signal CLKAC, and the output terminal Q coupled to a second input terminal of the NOR circuit 75. The latch 176 has the data terminal D coupled to an output terminal of the NOR circuit 74, the enable terminal E supplied with the clock signal CLKBD, and the output terminal Q coupled to the adder 33BD. The latch 176 outputs the detection signal DETA1 from the output terminal Q. The latch 177 has the data terminal D coupled to an output terminal of the NOR circuit 75, the enable terminal E supplied with the clock signal CLKAC, and the output terminal Q coupled to the adder 33AC. The latch 177 outputs the detection signal DETA2 from the output terminal Q.

The edge detector 170A has been described above, but the same applies to the edge detector 170B. In the edge detector 170B, the data terminals D of the latches 171 and 172 and the input terminal of the inverter 73 are supplied with the pulse signal PLSB. The latch 176 has the output terminal Q coupled to the adder 33BD. The latch 177 has the output terminal Q coupled to the adder 33AC. The latch 176 outputs the detection signal DETB1 from the output terminal Q, and the latch 177 outputs detection signal DETB2 from the output terminal Q.

The adder 33AC is configured to generate a detection value VALAC by performing addition processing, on the basis of the detection signal DETA2 generated by the edge detector 170A and the detection signal DETB2 generated by the edge detector 170B. The adder 33AC includes the adder circuit 34 and the latch section 35. The latch section 35 is configured to capture a signal supplied from the adder circuit 34 and output the captured signal from the output terminal Q in a case where the clock signal CLKAC is in the low level and generate the detection value VALAC by maintaining a signal at the output terminal Q in a case where the clock signal CLKAC is in the high level.

Likewise, the adder 33BD is configured to generate a detection value VALBD by performing addition processing, on the basis of the detection signal DETA1 generated by the edge detector 170A and the detection signal DETB1 generated by the edge detector 170B. The adder 33BD includes the adder circuit 34 and the latch section 35. The latch section 35 is configured to capture a signal supplied from the adder circuit 34 and output the captured signal from the output terminal Q in a case where the clock signal CLKBD is in the low level and generate the detection value VALBD by maintaining a signal at the output terminal Q in a case where the clock signal CLKBD is in the high level.

The count section 190AC is configured to generate count values CNTA and CNTC by performing cumulative addition processing, on the basis of the detection value VALAC generated by the adder 33AC.

FIG. 17A illustrates a configuration example of the count section 190AC. The count section 190AC includes the adder circuit 37, a flip-flop (F/F) section 192, a switch 193, a logical AND (AND) circuit 194, a counter 195, a flip-flop (F/F) section 196, a switch 197, an AND circuit 198, and a counter 199. The adder circuit 37 is configured to add the detection value VALAC generated by the adder 33AC, and a value (accumulated value VALA1) held by the flip-flop section 192 or a value (accumulated value VALC1) held by the flip-flop section 196. The flip-flop section 192 is configured to sample a signal outputted from the adder circuit 37 and hold a sampled result as the accumulated value VALA1 on the basis of a falling edge of the clock signal CLKC. In addition, the flip-flop section 192 has a function of setting a carry flag FCA active every time the accumulated value VALA1 reaches a predetermined upper limit value. The switch 193 is configured to turn on or off supply of the accumulated value VALA1 held by the flip-flop section 192 to the adder circuit 37 on the basis of the clock signal CLKC. The AND circuit 194 has a first input terminal supplied with the carry flag FCA generated by the flip-flop section 192, a second input terminal supplied with the clock signal CLKA, and an output terminal coupled to an input terminal of the counter 195. The counter 195 is configured to increment the count value CNTA on the basis of a signal outputted from the AND circuit 194. The flip-flop section 196 is configured to sample a signal outputted from the adder circuit 37 and hold a sampled result as the accumulated value VALC1 on the basis of a falling edge of the clock signal CLKA. In addition, the flip-flop section 196 has a function of setting a carry flag FCC active every time the accumulated value VALC1 reaches a predetermined upper limit value. The switch 197 is configured to turn on or off supply of the accumulated value VALC1 held by the flip-flop section 196 to the adder circuit 37 on the basis of the clock signal CLKA. The AND circuit 198 has a first input terminal supplied with the carry flag FCC generated by the flip-flop section 196, a second input terminal supplied with the clock signal CLKC, and an output terminal coupled to an input terminal of the counter 199. The counter 199 is configured to increment the count value CNTC on the basis of a signal outputted from the AND circuit 198.

The count section 190BD (FIG. 16) is configured to generate count values CNTB and CNTD by performing cumulative addition processing, on the basis of the detection value VALBD generated by the adder 33BD.

FIG. 17B illustrates a configuration example of the count section 190BD. The count section 190BD includes the adder circuit 37, the flip-flop (F/F) section 192, the switch 193, the AND circuit 194, the counter 195, the flip-flop (F/F) section 196, the switch 197, the AND circuit 198, and the counter 199. The adder circuit 37 is configured to add the detection value VALBD generated by the adder 33BD, and a value (accumulated value VALB1) held by the flip-flop section 192 or a value (accumulated value VALD1) held by the flip-flop section 196. The flip-flop section 192 is configured to sample a signal outputted from the adder circuit 37 and hold a sampled result as the accumulated value VALB1 on the basis of a falling edge of the clock signal CLKD. In addition, the flip-flop section 192 has a function of setting a carry flag FCB active every time the accumulated value VALB1 reaches a predetermined upper limit value. The switch 193 is configured to turn on or off supply of the accumulated value VALB1 held by the flip-flop section 192 to the adder circuit 37 on the basis of the clock signal CLKD. The AND circuit 194 has the first input terminal supplied with the carry flag FCB generated by the flip-flop section 192, the second input terminal supplied with the clock signal CLKB, and the output terminal coupled to the input terminal of the counter 195. The counter 195 is configured to increment the count value CNTB on the basis of a signal outputted from the AND circuit 194. The flip-flop section 196 is configured to sample a signal outputted from the adder circuit 37 and hold a sampled result as the accumulated value VALD1 on the basis of a falling edge of the clock signal CLKB. In addition, the flip-flop section 196 has a function of setting a carry flag FCD active every time the accumulated value VALD1 reaches a predetermined upper limit value. The switch 197 is configured to turn on or off supply of the accumulated value VALD1 held by the flip-flop section 196 to the adder circuit 37 on the basis of the clock signal CLKB. The AND circuit 198 has the first input terminal supplied with the carry flag FCD generated by the flip-flop section 196, the second input terminal supplied with the clock signal CLKD, and the output terminal coupled to the input terminal of the counter 199. The counter 199 is configured to increment the count value CNTD on the basis of a signal outputted from the AND circuit 198.

The clock generator 162 is configured to generate the clock signals CLKA, CLKB, CLKC, and CLKD that configure the four-phase clock signal, on the basis of an instruction from the photodetection controller 25 and supply the clock signals CLKA to CLKD to the plurality of photodetection units U in the photodetection array 161.

The readout controller 163 is configured to control an operation of supplying the readout section 164 with the count values CNTA, CNTB, CNTC, and CNTD generated in each of the plurality of photodetection units U in the photodetection array 161 on the basis of an instruction from the photodetection controller 25.

The readout section 164 is configured to generate the data DT including the count values CNTA, CNTB, CNTC, and CNTD supplied from the plurality of photodetection units U in the photodetection array 161 and output the generated data DT on the basis of an instruction from the photodetection controller 25.

FIGS. 18A, 18B, 18C, 18D, 18E, 18F, 18G, 18H, 18I, 18J, 18K, 18L, 18M, 18N, 18O, 18P, 18Q, 18R, 18S, 18T, 18U, 18V, 18W, and 18X illustrate an operation example of the photodetection unit U. FIG. 18A indicates a waveform of light emitted from the light-emitting section 11. FIGS. 18B, 18C, 18D, and 18E respectively indicate waveforms of the clock signals CLKA to CLKD. FIG. 18F indicates a waveform of the pulse signal PLSA. FIG. 18G indicates a waveform of a signal S172 outputted from the latch 172 of the edge detector 170A. FIG. 18H indicates a waveform of a signal S171 outputted from the latch 171 of the edge detector 170A. FIG. 18I indicates a waveform of the detection signal DETA2. FIG. 18J indicates a waveform of the detection signal DETA1. FIG. 18K indicates a waveform of a signal indicating the detection value VALAC. FIG. 18L indicates a waveform of a signal indicating the accumulated value VALA1. FIG. 18M indicates a waveform of a signal indicating the accumulated value VALC1. FIG. 18N indicates a waveform of a signal S194A outputted from the AND circuit 194 of the count section 190AC. FIG. 18O indicates a waveform of a signal S198C outputted from the AND circuit 198 of the count section 190AC. FIG. 18P indicates a waveform of a signal indicating the count value CNTA. FIG. 18Q indicates a waveform of a signal indicating the count value CNTC. FIG. 18R indicates a waveform of a signal indicating the detection value VALBD. FIG. 18S indicates a waveform of a signal indicating the accumulated value VALB1. FIG. 18T indicates a waveform of a signal indicating the accumulated value VALD1. FIG. 18U indicates a waveform of a signal S194B outputted from the AND circuit 194 of the count section 190BD. FIG. 18V indicates a waveform of a signal S198D outputted from the AND circuit 198 of the count section 190BD. FIG. 18W indicates a waveform of a signal indicating the count value CNTB. FIG. 18X indicates a waveform of a signal indicating the count value CNTD. A quarter of a period of each of the clock signals CLKA to CLKD is the detection period Pdet in the edge detectors 170A and 170B. Specifically, a period in which the clock signal CLKA is in the high level is a detection period PdetA. A period in which the clock signal CLKB is in the high level is a detection period PdetB. A period in which the clock signal CLKC is in the high level is a detection period PdetC. A period in which the clock signal CLKD is in the high level is a detection period PdetD.

In a period from a timing t51 to a timing t53 and a period from a timing t59 to a timing t60, the light-emitting section 11 emits the light pulse L0 toward the detection object OBJ on the basis of an instruction from the controller 14 (FIG. 18A). A portion of the light pulse L0 is reflected by the detection object OBJ. The reflected light pulse L1 then enters the photodetector 20 through the optical system 12. The light-receiving section 31A generates the pulse signal PLSA by detecting the reflected light pulse L1 (FIG. 18F). This pulse signal PLSA includes a pulse P5 starting from a timing t52, a pulse P6 starting from a timing t56, and a pulse P7 starting from a timing t61.

The latch 172 of the edge detector 170A captures the pulse signal PLSA, and outputs the captured signal from the output terminal Q in a case where the clock signal CLKAC is in the low level, and generates the signal S172 by maintaining a signal at the output terminal Q in a case where the clock signal CLKAC is in the high level (FIGS. 18B, 18D, 18F, and 18G). Accordingly, the signal S172 changes from the low level to the high level in response to the falling edge of the clock signal CLKA at the timing t53 after the pulse signal PLSA has risen, and changes from the high level to the low level in response to a falling edge of the pulse signal PLSA at a timing t54 in a period in which the clock signal CLKA and the clock signal CLKC are both in the low level. In addition, the signal S172 changes from the low level to the high level in response to a falling edge of the clock signal CLKC at a timing t57 after the pulse signal PLSA has risen, and changes from the high level to the low level in response to a falling edge of the pulse signal PLSA at a timing t58 in a period in which the clock signal CLKA and the clock signal CLKC are both in the low level. In addition, the signal S172 changes from the low level to the high level in response to a rising edge of the pulse signal PLSA at the timing t61 in a period in which the clock signal CLKA and the clock signal CLKC are both in the low level, and changes from the high level to the low level in response to a falling edge of the pulse signal PLSA at a timing t63 in a period in which the clock signal CLKA and the clock signal CLKC are both in the low level.

The latch 177 of the edge detector 170A captures a signal outputted from the NOR circuit 75, and outputs the captured signal from the output terminal Q in a case where the clock signal CLKAC is in the high level, and generates the detection signal DETA2 by maintaining a signal at the output terminal Q in a case where the clock signal CLKAC is in the low level (FIG. 18I).

Accordingly, the detection signal DETA2 changes from the low level to the high level in response to a rising edge of the pulse signal PLSA at the timing t52 in a period in which the clock signal CLKA is in the high level, and changes from the high level to the low level in response to a rising edge of the clock signal CLKC at a timing t55. This pulse (edge pulse PE5) of the detection signal DETA2 is a pulse based on a rising edge of the pulse P5 (FIG. 18E) of the pulse signal PLSA. The timing t52 at which the pulse P5 of the pulse signal PLSA starts is a timing in the detection period PdetA from the timing t51 to the timing t53; therefore, the edge pulse PE5 of the detection signal DETA2 straddles the timing t53 at which this detection period PdetA ends.

In addition, the detection signal DETA2 changes from the low level to the high level in response to a rising edge of the pulse signal PLSA at the timing t56 in a period in which the clock signal CLKC is in the high level, and changes from the high level to the low level in response to a rising edge of the clock signal CLKA at the timing t59. This pulse (edge pulse PE6) of the detection signal DETA2 is a pulse based on a rising edge of the pulse P6 (FIG. 18F) of the pulse signal PLSA. The timing t56 at which the pulse P6 of the pulse signal PLSA starts is a timing in the detection period PdetC from the timing t55 to the timing t57; therefore, the edge pulse PE6 of the detection signal DETA2 straddles the timing t57 at which this detection period PdetC ends.

The latch 171 of the edge detector 170A captures the pulse signal PLSA, and outputs the captured signal from the output terminal Q in a case where the clock signal CLKBD is in the low level, and generates the signal S171 by maintaining a signal at the output terminal Q in a case where the clock signal CLKBD is in the high level (FIGS. 18C, 18E, 18F, and 18H). Accordingly, the signal S171 changes from the low level to the high level in response to the rising edge of the pulse signal PLSA at the timing t52 in a period in which the clock signal CLKB and the clock signal CLKD are both in the low level, and changes from the high level to the low level in response to a falling edge of the clock signal CLKB at the timing t55 after the pulse signal PLSA has fallen. In addition, the signal S171 changes from the low level to the high level in response to the rising edge of the pulse signal PLSA at the timing t56 in a period in which the clock signal CLKB and the clock signal CLKD are both in the low level, and changes from the high level to the low level in response to a falling edge of the clock signal CLKD at the timing t59 after the pulse signal PLSA has fallen. In addition, the signal S171 changes from the low level to the high level in response to a falling edge of the clock signal CLKB at a timing t62 after the pulse signal PLSA has risen, and changes from the high level to the low level in response to a falling edge of the clock signal CLKD at a timing t64 after the pulse signal PLSA has fallen.

The latch 176 of the edge detector 170A captures a signal outputted from the NOR circuit 74, and outputs the captured signal from the output terminal Q in a case where the clock signal CLKBD is in the high level, and generates the detection signal DETA1 by maintaining a signal at the output terminal Q in a case where the clock signal CLKBD is in the low level (FIG. 18J). Accordingly, the detection signal DETA1 changes from the low level to the high level in response to a rising edge of the pulse signal PLS at the timing t61 in a period in which the clock signal CLKB is in the high level, and changes from the high level to the low level in response to a rising edge of the clock signal CLKD at the timing t63. This pulse (edge pulse PE7) of the detection signal DETA1 is a pulse based a rising edge of the pulse P7 (FIG. 18F) of the pulse signal PLSA. The timing t61 at which the pulse P7 of the pulse signal PLSA starts is a timing in the detection period PdetB from the timing t60 to the timing t62; therefore, the edge pulse PE7 of the detection signal DETA1 straddles the timing t62 at which this detection period PdetB ends.

Thus, the light-receiving section 31A generates the pulse signal PLSA by detecting the reflected light pulse L1. The edge detector 170A detects the rising edge of the pulse signal PLSA in the detection periods PdetA and PdetC to generate the detection signal DETA2 including the edge pulse PE based on this rising edge, and detects the rising edge of the pulse signal PLSA in the detection periods PdetB and PdetD to generate the detection signal DETA1 including the edge pulse PE based on this rising edge.

Likewise, the light-receiving section 31B and the light-receiving section 31A generate the pulse signal PLSB by detecting the reflected light pulse L1. The edge detector 170B detects the rising edge of the pulse signal PLSB in the detection periods PdetA and PdetC to generate the detection signal DETB2 including the edge pulse PE based on this rising edge, and detects the rising edge of the pulse signal PLSB in the detection periods PdetB and PdetD to generate the detection signal DETB1 including the edge pulse PE based on this rising edge.

The adder circuit 34 of the adder 33AC then calculates the number of the edge pulses PE in the detection signals DETA2 and DETB2. Then, the latch section 35 captures a signal supplied from the adder circuit 34 and outputs the captured signal from the output terminal Q in a case where the clock signal CLKAC is in the low level, and generates the detection value VALAC by maintaining a signal at the output terminal Q in a case where the clock signal CLKAC is in the high level (FIG. 18K). Accordingly, the adder 33AC generates the detection value VALAC on the basis of the falling edge of the clock signal CLKA and the falling edge of the clock signal CLKC.

Likewise, the adder circuit 34 of the adder 33BD calculates the number of the edge pulses PE in the detection signals DETA1 and DETB1. Then, the latch section 35 captures a signal supplied from the adder circuit 34 and outputs the captured signal from the output terminal Q in a case where the clock signal CLKBD is in the low level, and generates the detection value VALBD by maintaining a signal at the output terminal Q in a case where the clock signal CLKBD is in the high level (FIG. 18R). Accordingly, the adder 33BD generates the detection value VALBD on the basis of the falling edge of the clock signal CLKB and the falling edge of the clock signal CLKD.

Then, in the count section 190AC, the switch 193 is turned on in the detection period PdetC on the basis of the clock signal CLKC, and the adder circuit 37 adds the detection value VALAC generated by the adder 33AC and the accumulated value VALA1 held by the flip-flop section 192 in this detection period PdetC. The flip-flop section 192 then samples a signal outputted from the adder circuit 37 on the basis of a falling edge of the clock signal CLKC to generate the accumulated value VALA1 (FIG. 18L). In addition, the flip-flop section 192 sets the carry flag FCA active every time the accumulated value VALA1 reaches a predetermined upper limit value. The AND circuit 194 outputs this carry flag FCA as the signal S194A in the detection period PdetA on the basis of the clock signal CLKA (FIG. 18N). The counter 195 increments the count value CNTA on the basis of this signal S194A (FIG. 18P).

Likewise, in the count section 190AC, the switch 197 is turned on in the detection period PdetA on the basis of the clock signal CLKA, and the adder circuit 37 adds the detection value VALAC generated by the adder 33AC and the accumulated value VALC1 held by the flip-flop section 196 in this detection period PdetA. The flip-flop section 196 then samples a signal outputted from the adder circuit 37 on the basis of a falling edge of the clock signal CLKA to generate the accumulated value VALC1 (FIG. 18M). In addition, the flip-flop section 196 sets the carry flag FCC active every time the accumulated value VALC1 reaches a predetermined upper limit value. The AND circuit 198 outputs this carry flag FCC as the signal S198C in the detection period PdetC on the basis of the clock signal CLKC (FIG. 18O). The counter 199 increments the count value CNTC on the basis of this signal S198C (FIG. 18Q).

Likewise, in the count section 190BD, the switch 193 is turned on in the detection period PdetD on the basis of the clock signal CLKD, and the adder circuit 37 adds the detection value VALBD generated by the adder 33BD and the accumulated value VALB1 held by the flip-flop section 192 in this detection period PdetD. The flip-flop section 192 then samples a signal outputted from the adder circuit 37 on the basis of a falling edge of the clock signal CLKD to generate the accumulated value VALB1 (FIG. 18S). In addition, the flip-flop section 192 sets the carry flag FCB active every time the accumulated value VALB1 reaches a predetermined upper limit value. The AND circuit 194 outputs this carry flag FCB as the signal S194B in the detection period PdetB on the basis of the clock signal CLKB (FIG. 18U). The counter 195 increments the count value CNTB on the basis of this signal S194B (FIG. 18W).

Likewise, in the count section 190BD, the switch 197 is turned on in the detection period PdetB on the basis of the clock signal CLKB, and the adder circuit 37 adds the detection value VALBD generated by the adder 33BD and the accumulated value VALD1 held by the flip-flop section 196 in this detection period PdetB. The flip-flop section 196 then samples a signal outputted from the adder circuit 37 on the basis of a falling edge of the clock signal CLKB to generate the accumulated value VALD1 (FIG. 18T). In addition, the flip-flop section 196 sets this carry flag FCD active every time the accumulated value VALD1 reaches a predetermined upper limit value. The AND circuit 198 outputs this carry flag FCD as the signal S198D in the detection period PdetD on the basis of the clock signal CLKD (FIG. 18V). The counter 199 increments the count value CNTD on the basis of this signal S198D (FIG. 18X).

Thus, the count section 190AC generates the count values CNTA and CNTC by performing cumulative addition processing on the basis of the detection value VALAC generated by the adder 33AC, and the count section 190BD generates the count values CNTB and CNTD by performing cumulative addition processing on the basis of the detection value VALBD generated by the adder 33BD.

Thus, in the photodetection system 3, each of the edge detectors 170 includes the first latch circuit (latch 171) that generates the first signal (signal S171) by latching the pulse signal PLS on the basis of the clock signal CLKBD, the second latch circuit (latch 172) that generates the second signal (signal S172) by latching the pulse signal PLS on the basis of the clock signal CLKAC, the first combination circuit (NOR circuit 74) that generates the third signal on the basis of the pulse signal PLS and the first signal (signal S171), and the second combination circuit (NOR circuit 75) that generates the fourth signal on the basis of the pulse signal PLS and the second signal (signal S172). Accordingly, it is possible to reduce the number of circuits even in a case where the edge pulse PE generated by the edge detector 170 is supplied to one of the two adders 33AC and 33BD in accordance with the detection period Pdet, which makes it possible to reduce a circuit area.

In addition, in the photodetection system 3, cumulative addition processing is performed on the basis of the detection value VALAC to generate the count value CNTA that is an accumulated value of the detection values VALA and the count value CNTC that is an accumulated value of the detection values VALC. Likewise, in the photodetection system 3, cumulative addition processing is performed on the basis of the detection value VALBD to generate the count value CNTB that is an accumulated value of the detection values VALB and the count value CNTD that is an accumulated value of the detection values VALD. This makes it possible to calculate the accumulated value of the detection values VALA in a plurality of detection periods Pdet1, calculate the accumulated value of the detection values VALB in a plurality of detection periods Pdet2, calculate the accumulated value of the detection values VALC in a plurality of detection periods Pdet3, and calculate the accumulated value of the detection values VALD in a plurality of detection periods Pdet4. As a result, in the photodetection system 3, it is possible to expand a count range, which makes it possible to enhance detection accuracy of the photodetection system 3.

As described above, in the present embodiment, each of the plurality of edge detectors includes the first latch circuit that generates the first signal by latching the pulse signal on the basis of a clock signal, the second latch circuit that generates the second signal by latching the pulse signal on the basis of another clock signal, the first combination circuit that generates the third signal on the basis of the pulse signal and the first signal, and the second combination circuit that generates the fourth signal on the basis of the pulse signal and the second signal, which makes it possible to reduce a circuit area even in a case where the generated edge pulse is supplied to one of two adders in accordance with the detection period. Other effects are similar to those in the second embodiment described above.

4. Fourth Embodiment

Next, description is given of a photodetection system 4 according to a fourth embodiment. The present embodiment is configured to count the edge pulses PE in each of four detection periods Pdet based on a four-phase clock signal by a method different from a method according to the third embodiment described above. It is to be noted that components substantially the same as those of the photodetection system 3 according to the third embodiment described above are denoted by the same reference numerals, and description thereof is omitted as appropriate.

The photodetection system 3 includes a photodetector 260, as with the photodetection system 2 according to the second embodiment described above. The photodetector 260 includes a photodetection array 261, a clock generator 262, a readout controller 263, and a readout section 264, as with the photodetector 160 according to the third embodiment described above.

FIG. 19 illustrates an example of the photodetection unit U in the photodetection array 261. The photodetection unit U includes a plurality of light-receiving sections 31 (two light-receiving sections 31A and 31B in this example), a plurality of edge detectors 270 (two edge detectors 270A and 270B in this example), four adders 33A, 33B, 33C, and 33D, and four count sections 290A, 290B, 290C, and 290D. It is to be noted that, in this example, two light-receiving sections 31 and two edge detectors 270 are provided, but this is not limitative. Three or more light-receiving sections 31 and three or more edge detectors 270 may be provided. The photodetection unit U is supplied with the clock signals CLKA, CLKB, CLKC, and CLKD that configure the four-phase clock signal.

The edge detector 270A is configured to generate the detection signal DETA1, DETA2, DETA3, and DETA4 by detecting an edge of the pulse signal PLSA supplied from the light-receiving section 31A and respectively supply the detection signals DETA1 to DETA4 to the adders 33A to 33D. The edge detector 270B is configured to generate the detection signal DETB1, DETB2, DETB3, and DETB4 by detecting an edge of the pulse signal PLSB supplied from the light-receiving section 31B and respectively supply the detection signals DETB1 to DETB4 to the adders 33A to 33D.

The edge detector 270A includes latches 271, 272, 273, and 274, an inverter 275, NOR circuits 276, 277, 278, and 279, and latches 281, 282, 283, and 284. The latches 271 to 274 and 281 to 284 each have a circuit configuration similar to that of the latch 41 (FIG. 7) according to the first embodiment described above.

In the edge detector 270A, the latch 271 has the data terminal D supplied with the pulse signal PLSA, the enable terminal E supplied with the inverted signal of the clock signal CLKA, and the output terminal Q coupled to a second input terminal of the NOR circuit 276. The latch 272 has the data terminal D supplied with the pulse signal PLSA, the enable terminal E supplied with the inverted signal of the clock signal CLKB, and the output terminal Q coupled to a second input terminal of the NOR circuit 277. The latch 273 has the data terminal D supplied with the pulse signal PLSA, the enable terminal E supplied with the inverted signal of the clock signal CLKC, and the output terminal Q coupled to a second input terminal of the NOR circuit 278. The latch 274 has the data terminal supplied with the pulse signal PLSA, the enable terminal E supplied with the inverted signal of the clock signal CLKD, and the output terminal Q coupled to a second input terminal of the NOR circuit 279. The inverter 275 has an input terminal supplied with the pulse signal PLSA and an output terminal coupled to a first input terminal of the NOR circuit 276, a first input terminal of the NOR circuit 277, a first input terminal of the NOR circuit 278, and a first input terminal of the NOR circuit 279. The NOR circuit 276 has the first input terminal coupled to the output terminal of the inverter 275, the first input terminal of the NOR circuit 277, the first input terminal of the NOR circuit 278, and the first input terminal of the NOR circuit 279, the second input terminal coupled to the output terminal Q of the latch 271, and the output terminal coupled to the data terminal D of the latch 281. The NOR circuit 277 has the first input terminal coupled to the output terminal of the inverter 275, the first input terminal of the NOR circuit 276, the first input terminal of the NOR circuit 278, and the first input terminal of the NOR circuit 279, the second input terminal coupled to the output terminal Q of the latch 272, and the output terminal coupled to the data terminal D of the latch 282. The NOR circuit 278 has the first input terminal coupled to the output terminal of the inverter 275, the first input terminal of the NOR circuit 276, the first input terminal of the NOR circuit 277, and the first input terminal of the NOR circuit 279, the second input terminal coupled to the output terminal Q of the latch 273, and the output terminal coupled to the data terminal D of the latch 283. The NOR circuit 279 has the first input terminal coupled to the output terminal of the inverter 275, the first input terminal of the NOR circuit 276, the first input terminal of the NOR circuit 277, and the first input terminal of the NOR circuit 278, the second input terminal coupled to the output terminal Q of the latch 274, and the output terminal coupled to the data terminal D of the latch 284. The latch 281 has the data terminal D coupled to the output terminal of the NOR circuit 276, the enable terminal E supplied with the clock signal CLKA, and the output terminal Q coupled to the adder 33A. The latch 281 outputs the detection signal DETA1 from the output terminal Q. The latch 282 has the data terminal D coupled to the output terminal of the NOR circuit 277, the enable terminal E supplied with the clock signal CLKB, and the output terminal Q coupled to the adder 33B. The latch 282 outputs the detection signal DETA2 from the output terminal Q. The latch 283 has the data terminal D coupled to the output terminal of the NOR circuit 278, the enable terminal E supplied with the clock signal CLKC, and the output terminal Q coupled to the adder 33C. The latch 283 outputs the detection signal DETA3 from the output terminal Q. The latch 284 has the data terminal D coupled to the output terminal of the NOR circuit 279, the enable terminal E supplied with the clock signal CLKD, and the output terminal Q coupled to the adder 33D. The latch 284 outputs detection signal DETA4 from the output terminal Q.

The edge detector 270A has been described above, but the same applies to the edge detector 270B. In the edge detector 270B, the data terminals D of the latches 271 to 274 and the input terminal of the inverter 275 are supplied with the pulse signal PLSB. The latch 281 has the output terminal Q coupled to the adder 33A. The latch 282 has the output terminal Q coupled to the adder 33B. The latch 283 has the output terminal Q coupled to the adder 33C. The latch 284 has the output terminal Q coupled to the adder 33D. The latch 281 outputs the detection signal DETB1 from the output terminal Q. The latch 282 outputs the detection signal DETB2 from the output terminal Q. The latch 283 outputs the detection signal DETB3 from the output terminal Q. The latch 284 outputs the detection signal DETB4 from the output terminal Q.

The adder 33A is configured to generate the detection value VALA by performing addition processing, on the basis of the detection signal DETA1 generated by the edge detector 270A and the detection signal DETB1 generated by the edge detector 270B. The adder 33A includes the adder circuit 34 and the latch section 35. The latch section 35 is configured to capture a signal supplied from the adder circuit 34 and output the captured signal from the output terminal Q in a case where the clock signal CLKA is in the low level, and generate the detection value VALA by maintaining a signal at the output terminal Q in a case where the clock signal CLKA is in the high level.

Likewise, the adder 33B is configured to generate the detection value VALB by performing addition processing, on the basis of the detection signal DETA2 generated by the edge detector 270A and the detection signal DETB2 generated by the edge detector 270B. The adder 33B includes the adder circuit 34 and the latch section 35. The latch section 35 is configured to capture a signal supplied from the adder circuit 34 and output the captured signal from the output terminal Q in a case where the clock signal CLKB is in the low level, and generate the detection value VALB by maintaining a signal at the output terminal Q in a case where the clock signal CLKB is in the high level.

Likewise, the adder 33C is configured to generate the detection value VALC by performing addition processing, on the basis of the detection signal DETA3 generated by the edge detector 270A and the detection signal DETB3 generated by the edge detector 270B. The adder 33C includes the adder circuit 34 and the latch section 35. The latch section 35 is configured to capture a signal supplied from the adder circuit 34 and output the captured signal from the output terminal Q in a case where the clock signal CLKC is in the low level, and generate the detection value VALC by maintaining a signal at the output terminal Q in a case where the clock signal CLKC is in the high level.

Likewise, the adder 33D is configured to generate the detection value VALD by performing addition processing, on the basis of the detection signal DETA4 generated by the edge detector 270A and the detection signal DETB4 generated by the edge detector 270B. The adder 33D includes the adder circuit 34 and the latch section 35. The latch section 35 is configured to capture a signal supplied from the adder circuit 34 and output the captured signal from the output terminal Q in a case where the clock signal CLKD is in the low level, and generate the detection value VALD by maintaining a signal at the output terminal Q in a case where the clock signal CLKD is in the high level.

The count section 290A is configured to generate the count value CNTA by performing cumulative addition processing, on the basis of the detection value VALA generated by the adder 33A. The count section 290A includes the adder circuit 37, the flip-flop (F/F) section 48, and the counter 49. The adder circuit 37 is configured to add the detection value VALA generated by the adder 33A and a value (accumulated value VALA1) held by the flip-flop section 48. The flip-flop section 48 is configured to sample a signal outputted from the adder circuit 37 and hold a sampled result as the accumulated value VALA1 on the basis of the falling edge of the clock signal CLKA. In addition, the flip-flop section 48 has a function of setting the carry flag FCA active every time the accumulated value VALA1 reaches a predetermined upper limit value. The counter 49 is configured to increment the count value CNTA on the basis of the carry flag FCA generated by the flip-flop section 48.

Likewise, the count section 290B is configured to generate the count value CNTB by performing cumulative addition processing, on the basis of the detection value VALB generated by the adder 33B. The count section 290A includes the adder circuit 37, the flip-flop (F/F) section 48, and the counter 49. The adder circuit 37 is configured to add the detection value VALB generated by the adder 33B and a value (accumulated value VALB1) held by the flip-flop section 48. The flip-flop section 48 is configured to sample a signal outputted from the adder circuit 37 and hold a sampled result as the accumulated value VALB1 on the basis of the falling edge of the clock signal CLKB. In addition, the flip-flop section 48 has a function of setting the carry flag FCB active every time the accumulated value VALB1 reaches a predetermined upper limit value. The counter 49 is configured to increment the count value CNTB on the basis of the carry flag FCB generated by the flip-flop section 48.

Likewise, the count section 290C is configured to generate the count value CNTC by performing cumulative addition processing, on the basis of the detection value VALC generated by the adder 33C. The count section 290C includes the adder circuit 37, the flip-flop (F/F) section 48, and the counter 49. The adder circuit 37 is configured to add the detection value VALC generated by the adder 33C and a value (accumulated value VALC1) held by the flip-flop section 48. The flip-flop section 48 is configured to sample a signal outputted from the adder circuit 37 and hold a sampled result as the accumulated value VALC1 on the basis of the falling edge of the clock signal CLKC. In addition, the flip-flop section 48 has a function of setting the carry flag FCC active every time the accumulated value VALC1 reaches a predetermined upper limit value. The counter 49 is configured to increment the count value CNTC on the basis of the carry flag FCC generated by the flip-flop section 48.

Likewise, the count section 290D is configured to generate the count value CNTD by performing cumulative addition processing, on the basis of the detection value VALD generated by the adder 33D. The count section 290D includes the adder circuit 37, the flip-flop (F/F) section 48, and the counter 49. The adder circuit 37 is configured to add the detection value VALD generated by the adder 33D and a value (accumulated value VALD1) held by the flip-flop section 48. The flip-flop section 48 is configured to sample a signal outputted from the adder circuit 37 and hold a sampled result as the accumulated value VALD1 on the basis of the falling edge of the clock signal CLKD. In addition, the flip-flop section 48 has a function of setting the carry flag FCD active every time the accumulated value VALD1 reaches a predetermined upper limit value. The counter 49 is configured to increment the count value CNTD on the basis of the carry flag FCD generated by the flip-flop section 48.

The clock generator 262 is configured to generate clock signals CLKA, CLKB, CLKC, and CLKD that configure the four-phase clock signal on the basis of an instruction from the photodetection controller 25 and supply the clock signals CLKA to CLKD to the plurality of photodetection unit U in the photodetection array 261.

The readout controller 263 is configured to control an operation of supplying the readout section 164 with the count values CNTA, CNTB, CNTC, and CNTD generated in each of the plurality of photodetection units U in the photodetection array 261 on the basis of an instruction from the photodetection controller 25.

The readout section 264 is configured to generate the data DT including the count values CNTA, CNTB, CNTC, and CNTD supplied from the plurality of photodetection units U in the photodetection array 261 and output the generated data DT on the basis of an instruction from the photodetection controller 25.

FIGS. 20A, 20B, 20C, 20D, 20E, 20F, 20G, 20H, 20I, 20J, 20K, 20L, 20M, 20N, 20O, 20P, 20Q, 20R, 20S, 20T, 20U, and 20V illustrate an operation example of the photodetection unit U. FIG. 20A indicates a waveform of light emitted from the light-emitting section 11. FIGS. 20B, 20C, 20D, and 20E respectively indicate waveforms of the clock signals CLKA to CLKD. FIG. 20F indicates a waveform of the pulse signal PLSA. FIG. 20G indicates a waveform of a signal S271 outputted from the latch 271 of the edge detector 270A. FIG. 20H indicates a waveform of a signal S272 outputted from the latch 272 of the edge detector 270A. FIG. 20I indicates a waveform of a signal S273 outputted from the latch 273 of the edge detector 270A. FIG. 20J indicates a waveform of a signal S274 outputted from the latch 274 of the edge detector 270A. FIG. 20K indicates a waveform of the detection signal DETA1. FIG. 20L indicates a waveform of the detection signal DETA2. FIG. 20M indicates a waveform of the detection signal DETA3. FIG. 20N indicates a waveform of the detection signal DETA4. FIG. 20O indicates a waveform of a signal indicating the detection value VALA. FIG. 20P indicates a waveform of a signal indicating the accumulated value VALA1. FIG. 20Q indicates a waveform of a signal indicating the carry flag FCA. FIG. 20R indicates a waveform of a signal indicating the count value CNTA. FIG. 20S indicates a waveform of a signal indicating the detection value VALB. FIG. 20T indicates a waveform of a signal indicating the accumulated value VALB1. FIG. 20U indicates a waveform of a signal indicating the carry flag FCB. FIG. 20V indicates a waveform of a signal indicating the count value CNTB. A quarter of a period of each of the clock signals CLKA to CLKD is the detection period Pdet in the edge detectors 270A and 270B. Specifically, a period in which the clock signal CLKA is in the high level is the detection period PdetA. A period in which the clock signal CLKB is in the high level is the detection period PdetB. A period in which the clock signal CLKC is in the high level is the detection period PdetC. A period in which the clock signal CLKD is in the high level is the detection period PdetD.

In a period from a timing t71 to a timing t73 and a period from a timing t79 to a timing t81, the light-emitting section 11 emits the light pulse L0 toward the detection object OBJ on the basis of an instruction from the controller 14 (FIG. 20A). A portion of the light pulse L0 is reflected by the detection object OBJ. The reflected light pulse L1 then enters the photodetector 20 through the optical system 12. The light-receiving section 31A generates the pulse signal PLSA by detecting the reflected light pulse L1 (FIG. 20E). This pulse signal PLSA includes a pulse P8 starting from a timing t72, a pulse P9 starting from a timing t76, and a pulse P10 starting from a timing t80.

The latch 272 of the edge detector 270A captures the pulse signal PLSA, and outputs the captured signal from the output terminal Q in a case where the clock signal CLKA is in the low level, and generates the signal S271 by maintaining a signal at the output terminal Q in a case where the clock signal CLKA is in the high level (FIGS. 20B, 20F, and 20G). Accordingly, the signal S271 changes from the low level to the high level in response to a falling edge of the clock signal CLKA at the timing t73 after the pulse signal PLSA has risen, and changes from the high level to the low level in response to a falling edge of the pulse signal PLSA at a timing t74 in a period in which the clock signal CLKA is in the low level. In addition, the signal S271 changes from the low level to the high level in response to a rising edge of the pulse signal PLSA at the timing t76 in a period in which the clock signal CLKA is in the low level, and changes from the high level to the low level in response to a falling edge of the pulse signal PLSA at a timing t78 in a period in which the clock signal CLKA is in the low level. In addition, the signal S271 changes from the low level to the high level in response to a falling edge of the clock signal CLKA at the timing t81 after the pulse signal PLSA has risen, and changes from the high level to the low level in response to a falling edge of the pulse signal PLSA at a timing t83 in a period in which the clock signal CLKA is in the low level.

The latch 281 of the edge detector 270A captures a signal outputted from the NOR circuit 276, and outputs the captured signal from the output terminal Q in a case where the clock signal CLKA is in the high level, and generates the detection signal DETA1 by maintaining a signal at the output terminal Q in a case where the clock signal CLKA is in the high level (FIG. 20K).

Accordingly, the detection signal DETA1 changes from the low level to the high level in response to a rising edge of the pulse signal PLSA at the timing t72 in a period in which the clock signal CLKA is in the high level, and changes from the high level to the low level in response to a rising edge of the clock signal CLKA at the timing t79. This pulse (edge pulse PE8) of the detection signal DETA1 is a pulse based a rising edge of the pulse P8 (FIG. 20F) of the pulse signal PLSA. The timing t72 at which the pulse P8 of the pulse signal PLSA starts is a timing in the detection period PdetA from the timing t71 to the timing t73; therefore, the edge pulse PE8 of the detection signal DETA1 straddles the timing t73 at which this detection period PdetA ends.

In addition, the detection signal DETA1 changes from the low level to the high level in response to a rising edge of the pulse signal PLSA at the timing t80 in a period in which the clock signal CLKA is in the high level, and changes from the high level to the low level in response to a rising edge of the clock signal CLKA at a timing t84. This pulse (edge pulse PE10) of the detection signal DETA1 is a pulse based on a rising edge of the pulse P10 (FIG. 20F) of the pulse signal PLSA. The timing t80 at which the pulse P10 of the pulse signal PLSA starts is a timing in the detection period PdetA from the timing t79 to the timing t81; therefore, the edge pulse PE10 of the detection signal DETA1 straddles the timing t81 at which this detection period PdetA ends.

The latch 272 of the edge detector 270A captures the pulse signal PLSA, and outputs the captured signal from the output terminal Q in a case where the clock signal CLKB is in the low level, and generates the signal S272 by maintaining a signal at the output terminal Q in a case where the clock signal CLKB is in the high level (FIGS. 20C, 20F, and 20H). Accordingly, the signal S272 changes from the low level to the high level in response to the rising edge of the pulse signal PLSA at the timing t72 in a period in which the clock signal CLKB is in the low level, and changes from the high level to the low level in response to a falling edge of the clock signal CLKB at a timing t75 after the pulse signal PLSA has fallen. In addition, the signal S272 changes from the low level to the high level in response to the rising edge of the pulse signal PLSA at the timing t76 in a period in which the clock signal CLKB is in the low level, and changes from the high level to the low level in response to the falling edge of the pulse signal PLSA at the timing t78 in a period in which the clock signal CLKB is in the low level. In addition, the signal S272 changes from the low level to the high level in response to the rising edge of the pulse signal PLSA at the timing t80 in a period in which the clock signal CLKB is in the low level, and changes from the high level to the low level in response to the falling edge of the pulse signal PLSA at the timing t83 in a period in which the clock signal CLKB is in the low level.

The latch 282 of the edge detector 270A captures a signal outputted from the NOR circuit 277, and outputs the captured signal from the output terminal Q in a case where the clock signal CLKB is in the high level, and generates the detection signal DETA2 by maintaining a signal at the output terminal Q in a case where the clock signal CLKB is in the low level (FIG. 20L). Accordingly, the detection signal DETA2 maintains the low level. In other words, rising edges of the pulses P8, P9, and P10 of the pulse signal PLSA are not in the detection period PdetB; therefore, the detection signal DETA2 maintains the low level.

The latch 273 of the edge detector 270A captures the pulse signal PLSA, and outputs the captured signal from the output terminal Q in a case where the clock signal CLKC is in the low level, and generates the signal S273 by maintaining a signal at the output terminal Q in a case where the clock signal CLKC is in the high level (FIGS. 20D, 20F, and 20I). Accordingly, the signal S273 changes from the low level to the high level in response to the rising edge of the pulse signal PLSA at the timing t72 in a period in which the clock signal CLKC is in the low level, and changes from the high level to the low level in response to the falling edge of the pulse signal PLSA at the timing t74 in a period in which the clock signal CLKC is in the low level. In addition, the signal S273 changes from the low level to the high level in response to a falling edge of the clock signal CLKC at a timing t77 after the pulse signal PLSA has risen, and changes from the high level to the low level in response to the falling edge of the pulse signal PLSA at the timing t78 in a period in which the clock signal CLKC is in the low level. In addition, the signal S273 changes from the low level to the high level in response to the rising edge of the pulse signal PLSA at the timing t80 in a period in which the clock signal CLKC is in the low level, and changes from the high level to the low level in response to the falling edge of the pulse signal PLSA at the timing t83 in a period in which the clock signal CLKC is in the low level.

The latch 283 of the edge detector 270A captures a signal outputted from the NOR circuit 278, and outputs the captured signal from the output terminal Q in a case where the clock signal CLKC is in the high level, and generates the detection signal DETA3 by maintaining a signal at the output terminal Q in a case where the clock signal CLKC is in the low level (FIG. 20M).

Accordingly, the detection signal DETA3 changes from the low level to the high level in response to the rising edge of the pulse signal PLSA at the timing t76 in a period in which the clock signal CLKC is in the high level, and changes from the high level to the low level in response to a rising edge of the clock signal CLKC at a timing t82. This pulse (edge pulse PE9) of the detection signal DETA3 is a pulse based on a rising edge of the pulse P9 (FIG. 20F) of the pulse signal PLSA. The timing t76 at which the pulse P9 of the pulse signal PLSA starts is a timing in the detection period PdetC from the timing t75 to the timing t77; therefore, the edge pulse PE9 of the detection signal DETA3 straddles the timing t77 at which this detection period PdetC ends.

The latch 274 of the edge detector 270A captures the pulse signal PLSA, and outputs the captured signal from the output terminal Q in a case where the clock signal CLKD is in the low level, and generates the signal S274 by maintaining a signal at the output terminal Q in a case where the clock signal CLKD is in the high level (FIGS. 20E, 20F, and 20J). Accordingly, the signal S274 changes from the low level to the high level in response to the rising edge of the pulse signal PLSA at the timing t72 in a period in which the clock signal CLKD is in the low level, and changes from the high level to the low level in response to the falling edge of the pulse signal PLSA at the timing t74 in a period in which the clock signal CLKD is in the low level. In addition, the signal S274 changes from the low level to the high level in response to the rising edge of the pulse signal PLSA at the timing t76 in a period in which the clock signal CLKD is in the low level, and changes from the high level to the low level in response to a falling edge of the clock signal CLKD at the timing t79 after the pulse signal PLSA has fallen. In addition, the signal S274 changes from the low level to the high level in response to the rising edge of the pulse signal PLSA at the timing t80 in a period in which the clock signal CLKD is in the low level, and changes from the high level to the low level in response to a falling edge of the clock signal CLKD at the timing t84 after the pulse signal PLSA has fallen.

The latch 284 of the edge detector 270A captures a signal outputted from the NOR circuit 279, and outputs the captured signal from the output terminal Q in a case where the clock signal CLKD is in the high level, and generates the detection signal DETA4 by maintaining a signal at the output terminal Q in a case where the clock signal CLKD is in the low level (FIG. 20N). Accordingly, the detection signal DETA4 maintains the low level. In other words, rising edges of the pulses P8, P9, and P10 of the pulse signal PLSA are not in the detection period PdetD; therefore, the detection signal DETA4 maintains the low level.

Thus, the light-receiving section 31A generates the pulse signal PLSA by detecting the reflected light pulse L1. The edge detector 270A detects the rising edge of the pulse signal PLSA in the detection period PdetA to generate the detection signal DETA1 including the edge pulse PE based on this rising edge. The edge detector 270A detects the rising edge of the pulse signal PLSA in the detection period PdetB to generate the detection signal DETA2 including the edge pulse PE based on this rising edge. The edge detector 270A detects the rising edge of the pulse signal PLSA in the detection period PdetC to generate the detection signal DETA3 including the edge pulse PE based on this rising edge. The edge detector 270A detects the rising edge of the pulse signal PLSA in the detection period PdetD to generate the detection signal DETA4 including the edge pulse PE based on this rising edge.

Likewise, the light-receiving section 31B generates the pulse signal PLSB by detecting the reflected light pulse L1. The edge detector 270B detects the rising edge of the pulse signal PLSB in the detection period PdetA to generate the detection signal DETB1 including the edge pulse PE based on this rising edge. The edge detector 270B detects the rising edge of the pulse signal PLSB in the detection period PdetB to generate the detection signal DETB2 including the edge pulse PE based on this rising edge. The edge detector 270B detects the rising edge of the pulse signal PLSB in the detection period PdetC to generate the detection signal DETB3 including the edge pulse PE based on this rising edge. The edge detector 270B detects the rising edge of the pulse signal PLSB in the detection period PdetD to generate the detection signal DETB4 including the edge pulse PE based on this rising edge.

The adder circuit 34 of the adder 33A then calculates the number of the edge pulses PE in the detection signals DETA1 and DETB1. Then, the latch section 35 captures a signal supplied from the adder circuit 34 and outputs the captured signal from the output terminal Q in a case where the clock signal CLKA is in the low level, and generates the detection value VALA by maintaining a signal at the output terminal Q in a case where the clock signal CLKA is in the high level (FIG. 20O). Accordingly, the adder 33A generates the detection value VALA on the basis of the falling edge of the clock signal CLKA.

Likewise, the adder circuit 34 of the adder 33B calculates the number of the edge pulses PE in the detection signals DETA2 and DETB2. Then, the latch section 35 captures a signal supplied from the adder circuit 34 and outputs the captured signal from the output terminal Q in a case where the clock signal CLKB is in the low level, and generates the detection value VALB by maintaining a signal at the output terminal Q in a case where the clock signal CLKB is in the high level (FIG. 20S). Accordingly, the adder 33B generates the detection value VALB on the basis of the falling edge of the clock signal CLKB.

Likewise, the adder circuit 34 of the adder 33C calculates the number of the edge pulses PE in the detection signals DETA3 and DETB3. Then, the latch section 35 captures a signal supplied from the adder circuit 34 and outputs the captured signal from the output terminal Q in a case where the clock signal CLKC is in the low level, and generates the detection value VALC by maintaining a signal at the output terminal Q in a case where the clock signal CLKC is in the high level. Accordingly, the adder 33C generates the detection value VALC on the basis of the falling edge of the clock signal CLKC.

Likewise, the adder circuit 34 of the adder 33D calculates the number of the edge pulses PE in the detection signals DETA4 and DETB4. Then, the latch section 35 captures a signal supplied from the adder circuit 34 and outputs the captured signal from the output terminal Q in a case where the clock signal CLKD is in the low level, and generates the detection value VALD by maintaining a signal at the output terminal Q in a case where the clock signal CLKD is in the high level. Accordingly, the adder 33D generates the detection value VALD on the basis of the falling edge of the clock signal CLKD.

Then, in the count section 290A, the adder circuit 37 adds the detection value VALA generated by the adder 33A and the accumulated value VALA1 held by the flip-flop section 48. The flip-flop section 48 then samples a signal outputted from the adder circuit 37 on the basis of a falling edge of the clock signal CLKA to generate the accumulated value VALA1 (FIG. 20P). In addition, the flip-flop section 48 sets the carry flag FCA active every time the accumulated value VALA1 reaches a predetermined upper limit value (FIG. 20Q). The counter 49 increments the count value CNTA on the basis of this carry flag FCA (FIG. 20R).

Likewise, in the count section 290B, the adder circuit 37 adds the detection value VALB generated by the adder 33B and the accumulated value VALB1 held by the flip-flop section 48. The flip-flop section 48 then samples a signal outputted from the adder circuit 37 on the basis of a falling edge of the clock signal CLKB to generate the accumulated value VALB1 (FIG. 20T). In addition, the flip-flop section 48 sets the carry flag FCB active every time the accumulated value VALB1 reaches a predetermined upper limit value (FIG. 20U). The counter 49 increments the count value CNTB on the basis of this carry flag FCB (FIG. 20V).

Likewise, in the count section 290C, the adder circuit 37 adds the detection value VALC generated by the adder 33C and the accumulated value VALC1 held by the flip-flop section 48. The flip-flop section 48 then samples a signal outputted from the adder circuit 37 on the basis of a falling edge of the clock signal CLKC to generate the accumulated value VALC1. In addition, the flip-flop section 48 sets the carry flag FCC active every time the accumulated value VALC1 reaches a predetermined upper limit value. The counter 49 increments the count value CNTC on the basis of this carry flag FCC.

Likewise, in the count section 290D, the adder circuit 37 adds the detection value VALD generated by the adder 33D and the accumulated value VALD1 held by the flip-flop section 48. The flip-flop section 48 then samples a signal outputted from the adder circuit 37 on the basis of a falling edge of the clock signal CLKD to generate the accumulated value VALD1. In addition, the flip-flop section 48 sets the carry flag FCD active every time the accumulated value VALD1 reaches a predetermined upper limit value. The counter 49 increments the count value CNTD on the basis of this carry flag FCD.

Thus, in the photodetection system 4, each of the plurality of edge detectors 170 includes the first latch circuit (latch 271) that generates the first signal (signal S271) by latching the pulse signal PLS on the basis of the clock signal CLKA, the second latch circuit (latch 272) that generates the second signal (signal S272) by latching the pulse signal PLS on the basis of the clock signal CLKB, the first combination circuit (NOR circuit 276) that generates the third signal on the basis of the pulse signal PLS and the first signal (signal S271), and the second combination circuit (NOR circuit 277) that generates the fourth signal on the basis of the pulse signal PLS and the second signal (signal S272). Accordingly, it is possible to reduce the number of circuits even in a case where the edge pulse PE generated by the edge detector 170 is supplied to one of the two adders 33A and 33B in accordance with the detection period Pdet, which makes it possible to reduce a circuit area.

Furthermore, in the photodetection system 4, each of the plurality of edge detectors 170 includes the third latch circuit that generates a fifth signal (signal S273) by latching the pulse signal PLS on the basis of the clock signal CLKC, the fourth latch circuit (latch 274) that generates a sixth signal (signal S274) by latching the pulse signal PLS on the basis of the clock signal CLKD, a third combination circuit (NOR circuit 278) that generates a seventh signal on the basis of the pulse signal PLS and the fifth signal (signal S273), and a fourth combination circuit (NOR circuit 279) that generates an eighth signal on the basis of the pulse signal PLS and the sixth signal (signal S274). Accordingly, it is possible to reduce the number of circuits even in a case where the edge pulse PE generated by the edge detector 170 is supplied to one of the four adders 33A to 33D, which makes it possible to reduce a circuit area.

In addition, in the photodetection system 4, cumulative addition processing is performed on the basis of the detection value VALA to generate the count value CNTA that is an accumulated value of the detection values VALA, and cumulative addition processing is performed on the basis of the detection value VALB to generate the count value CNTB that is an accumulated value of the detection values VALB. Likewise, cumulative addition processing is performed on the basis of the detection value VALC to generate the count value CNTC that is an accumulated value of the detection values VALC, and cumulative addition processing is performed on the basis of the detection value VALD to generate the count value CNTD that is an accumulated value of the detection values VALD. This makes it possible to calculate the accumulated value of the detection values VALA in a plurality of detection periods Pdet1, calculate the accumulated value of the detection values VALB in a plurality of detection periods Pdet2, calculate the accumulated value of the detection values VALC in a plurality of detection periods Pdet3, and calculate the accumulated value of the detection values VALD in a plurality of detection periods Pdet4. As a result, in the photodetection system 4, it is possible to expand a count range, which makes it possible to enhance detection accuracy of the photodetection system 4.

As described above, in the present embodiment, each of the plurality of edge detectors includes the first latch circuit that generates the first signal by latching the pulse signal on the basis of the clock signal, the second latch circuit that generates the second signal by latching the pulse signal on the basis of another clock signal, the first combination circuit that generates the third signal on the basis of the pulse signal and the first signal, and the second combination circuit that generates the fourth signal on the basis of the pulse signal and the second signal, which makes it possible to reduce a circuit area even in a case where the generated edge pulse is supplied to one of two adders in accordance with the detection period. Pdet. Other effects are similar to those in the third embodiment described above.

5. Example of Application to Mobile Body

The technology (the present technology) according to the present disclosure is applicable to a variety of products. For example, the technology according to the present disclosure may be achieved as a device mounted on any type of mobile body such as an automobile, an electric vehicle, a hybrid electric vehicle, a motorcycle, a bicycle, a personal mobility, an airplane, a drone, a vessel, or a robot.

FIG. 21 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 21, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 21, an audio speaker 12061, a display section 12062, and an instrument panel 12063 are illustrated as the output device. The display section 12062 may, for example, include at least one of an on-board display and a head-up display.

FIG. 22 is a diagram depicting an example of the installation position of the imaging section 12031.

In FIG. 22, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 22 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

The example of the vehicle control system to which the technology according to the present disclosure may be applied has been described above. The technology according to the present disclosure may be applied to the imaging section 12031 among the components described above. In the photodetection system 1 mounted on a vehicle, it is possible to reduce a circuit area, which makes it possible to reduce, for example, a device size. This makes it possible to easily mount the photodetection system 1 on a vehicle, for example. In addition, in the photodetection system 1 mounted on the vehicle, it is possible to increase resolution, which makes it possible to enhance, for example, detection accuracy. This allows the vehicle control system 12000 to implement, with high accuracy, collision avoidance or shock mitigation for vehicles, a following driving function based on vehicle-to-vehicle distance, a vehicle speed maintaining driving function, a warning function of collision of the vehicle, a warning function of deviation of the vehicle from a lane, and the like.

Although the present technology has been described above with reference to some embodiments, the modification examples, and specific application examples thereof, the present technology is not limited to these embodiments and the like, and may be modified in a variety of ways.

For example, in the respective embodiments described above, the light-receiving section 31A having a circuit configuration illustrated in FIG. 5 is provided, but this is not limitative. In place of the circuit configuration illustrated in FIG. 5, for example, the light-receiving section 31A having a circuit configuration illustrated in FIG. 23 may be provided. This light-receiving section 31A includes the photodiode PD, the transistors MN11 to MN13 and MP14, the inverters IV1 and IV3, a buffer BUF, and the delay circuit DEL. The transistors MN11 to MN13 are N-type MOS transistors, and the transistor MP14 is a P-type MOS transistor.

The photodiode PD has the anode coupled to the drain of the transistor MN11 and the gate of the transistor MN13, and the cathode supplied with the power supply voltage VDD1. The transistor MN11 has the gate coupled to the output terminal of the delay circuit DEL and the input terminal of the inverter IV3, the drain coupled to the anode of the photodiode PD and the gate of the transistor MN13, and the source supplied with the power supply voltage VSS. The transistor MN12 has the gate coupled to the output terminal of the inverter IV3 and the gate of the transistor MP14, the drain coupled to the source of the transistor MN13, and the source grounded. The transistor MN13 has the gate coupled to the anode of the photodiode PD and the drain of the transistor MN11, the drain coupled to the drain of the transistor MP14 and the input terminal of the inverter IV1, and the source coupled to the drain of the transistor MN12. The transistor MP14 has the gate coupled to the output terminal of the inverter IV3 and the gate of the transistor MN12, the source supplied with the power supply voltage VDD2, and the drain coupled to the drain of the transistor MN13 and the input terminal of the inverter IV1. The inverter IV1 has the input terminal coupled to the drain of the transistor MN13 and the drain of the transistor MP14, and the output terminal coupled to an input terminal of the buffer BUF and the input terminal of the delay circuit DEL. The buffer BUF has the input terminal coupled to the output terminal of the inverter IV1 and the input terminal of the delay circuit DEL, and an output terminal coupled to the edge detector 40A in a stage subsequent to the light-receiving section 31A. The delay circuit DEL has the input terminal coupled to the output terminal of the inverter IV1 and the input terminal of the buffer BUF, and the output terminal coupled to the input terminal of the inverter IV3 and the gate of the transistor MN11. The inverter IV3 has the input terminal coupled to the output terminal of the delay circuit DEL and the gate of the transistor MN11, and the output terminal coupled to the gate of the transistor MN12 and the gate of the transistor MP14.

It is to be noted that the effects described herein are merely illustrative and non-limiting, and other effects may be included.

It is to be noted that the present technology may have the following configurations. According to the present technology having the following configurations, it is possible to reduce a circuit area.

(1)

A photodetection device including:

a plurality of light-receiving sections that each includes a light-receiving element, and generates a pulse signal including a pulse corresponding to a result of light reception by the light-receiving element;

a plurality of edge detectors each of which is provided for a corresponding one of the plurality of light-receiving sections, and generates a detection signal by detecting an edge of the pulse in the pulse signal generated by the corresponding one of the plurality of light-receiving sections; and an adder that generates a detection value indicating number of the pulses by performing addition processing on the basis of a plurality of the detection signals generated by the plurality of edge detectors, in which
each of the plurality of edge detectors includes
a first latch circuit that generates a first signal by latching the pulse signal on the basis of a first clock signal,
a second latch circuit that generates a second signal by latching the first signal on the basis of a second clock signal that is an inverted signal of the first clock signal,
a combination circuit that generates a third signal on the basis of the pulse signal, the first signal, and the second signal, and
a third latch circuit that generates the detection signal by latching the third signal on the basis of the first clock signal.

(2)
The photodetection device according to (1), in which
each of the plurality of edge detectors detects an edge of the pulse in a detection period based on the first clock signal and the second clock signal, and
a pulse width of the pulse is equal to or larger than a time width of the detection period.

(3)
The photodetection device according to (2), in which a time length of the detection period is a time length corresponding to a period of the first clock signal.

(4)
The photodetection device according to any one of (1) to (3), further including a cumulative adder that generates an accumulated value by performing cumulative addition processing on the basis of the detection value.

(5)
The photodetection device according to (4), further including a counter that performs count processing, in which
the cumulative adder sets a flag active every time the accumulated value reaches a predetermined value, and
the counter performs the count processing on the basis of the flag.

(6)
The photodetection device according to any one of (1) to (5), in which
a plurality of the light-receiving elements is provided on a first semiconductor substrate, and
the plurality of edge detectors is provided on a second semiconductor substrate bonded to the first semiconductor substrate.

(7)
A photodetection device including:
a plurality of light-receiving sections that each includes a light-receiving element, and generates a pulse signal including a pulse corresponding to a result of light reception by the light-receiving element;
a plurality of edge detectors each of which is provided for a corresponding one of the plurality of light-receiving sections, and generates a first detection signal and a second detection signal by detecting an edge of the pulse in the pulse signal generated by the corresponding one of the plurality of light-receiving sections;
a first adder that generates a first detection value indicating number of the pulses by performing addition processing on the basis of a plurality of the first detection signals generated by the plurality of edge detectors; and
a second adder that generates a second detection value indicating number of the pulses by performing addition processing on the basis of a plurality of the second detection signals generated by the plurality of edge detectors, in which
each of the plurality of edge detectors includes a first latch circuit that generates a first signal by latching the pulse signal on the basis of a first clock signal,
a second latch circuit that generates a second signal by latching the pulse signal on the basis of a second clock signal,
a first combination circuit that generates a third signal on the basis of the pulse signal and the first signal, and
a second combination circuit that generates a fourth signal on the basis of the pulse signal and the second signal, and
each of the plurality of edge detectors generates the first detection signal on the basis of the third signal, and generates the second detection signal on the basis of the fourth signal.

(8)
The photodetection device according to (7), in which
each of the plurality of edge detectors further includes
a third latch circuit that generates the first detection signal by latching the third signal on the basis of a third clock signal that is an inverted signal of the first clock signal, and
a fourth latch circuit that generates the second detection signal by latching the fourth signal on the basis of a fourth clock signal that is an inverted signal of the second clock signal.

(9)
The photodetection device according to (7) or (8), in which the second clock signal is an inverted signal of the first clock signal.

(10)
The photodetection device according to (7) or (8), in which a phase of the second clock signal is different from a phase of the first clock signal.

(11)
The photodetection device according to any one of (7) to (10), in which
each of the plurality of edge detectors detects an edge of the pulse in a detection period based on the first clock signal and the second clock signal, and
a pulse width of the pulse is equal to or larger than a time width of the detection period.

(12)
The photodetection device according to (11), in which
the first clock signal changes between a first level and a second level, and
a time length of the detection period is a time length of a period in which the first clock signal maintains the first level.

(13)
The photodetection device according to any one of (7) to (12), further including a cumulative adder that generates an accumulated value by performing cumulative addition processing on the basis of the first detection value.

(14)
The photodetection device according to (13), further including a counter that performs count processing, in which
the cumulative adder sets a flag active every time the accumulated value reaches a predetermined value, and
the counter performs the count processing on the basis of the flag.

(15)
The photodetection device according to (13), in which
the first detection value includes a third detection value and a fourth detection value, and
the cumulative adder generates a first accumulated value by performing the cumulative addition processing on the basis of the third detection value, and generates a second accumulated value by performing the cumulative addition processing on the basis of the fourth detection value.

(16)

The photodetection device according to (15), further including a first counter and a second counter that perform count processing, in which the cumulative adder sets a first flag active every time the first accumulated value reaches a predetermined value, and sets a second flag active every time the second accumulated value reaches the predetermined value, the first counter performs the count processing on the basis of the first flag, and the second counter performs the count processing on the basis of the second flag.

(17)

The photodetection device according to any one of (7) to (16), in which a plurality of the light-receiving elements is provided on a first semiconductor substrate, and the plurality of edge detectors is provided on a second semiconductor substrate bonded to the first semiconductor substrate.

(18)

A photodetection system including:

a light-emitting section that emits light; and a photodetector that detects light reflected by a detection object of the light emitted from the light-emitting section, in which the photodetector includes a plurality of light-receiving sections that each includes a light-receiving element, and generates a pulse signal including a pulse corresponding to a result of light reception by the light-receiving element, a plurality of edge detectors each of which is provided for a corresponding one of the plurality of light-receiving sections, and generates a detection signal by detecting an edge of the pulse in the pulse signal generated by the corresponding one of the plurality of light-receiving sections, and an adder that generates a detection value indicating number of the pulses by performing addition processing on the basis of a plurality of the detection signals generated by the plurality of edge detectors, and each of the plurality of edge detectors includes a first latch circuit that generates a first signal by latching the pulse signal on the basis of a first clock signal, a second latch circuit that generates a second signal by latching the first signal on the basis of a second clock signal that is an inverted signal of the first clock signal, a combination circuit that generates a third signal on the basis of the pulse signal, the first signal, and the second signal, and a third latch circuit that generates the detection signal by latching the third signal on the basis of the first clock signal.

(19)

A photodetection system including:

a light-emitting section that emits light; and a photodetector that detects light reflected by a detection object of the light emitted from the light-emitting section, in which the photodetector includes a plurality of light-receiving sections that each includes a light-receiving element, and generates a pulse signal including a pulse corresponding to a result of light reception by the light-receiving element, a plurality of edge detectors each of which is provided for a corresponding one of the plurality of light-receiving sections, and generates a first detection signal and a second detection signal by detecting an edge of the pulse in the pulse signal generated by the corresponding one of the plurality of light-receiving sections, a first adder that generates a first detection value indicating number of the pulses by performing addition processing on the basis of a plurality of the first detection signals generated by the plurality of edge detectors, and a second adder that generates a second detection value indicating number of the pulses by performing addition processing on the basis of a plurality of the second detection signals generated by the plurality of edge detectors, each of the plurality of edge detectors includes a fourth latch circuit that generates a first signal by latching the pulse signal on the basis of a first clock signal, a second latch circuit that generates a second signal by latching the pulse signal on the basis of a second clock signal, a first combination circuit that generates a third signal on the basis of the pulse signal and the first signal, and a second combination circuit that generates a fourth signal on the basis of the pulse signal and the second signal, and each of the plurality of edge detectors generates the first detection signal on the basis of the third signal, and generates the second detection signal on the basis of the fourth signal.

This application claims the priority on the basis of Japanese Patent Application No. 2020-179257 filed on Oct. 26, 2020 with Japan Patent Office, the entire contents of which are incorporated in this application by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A photodetection device comprising:

a plurality of light-receiving sections that each includes a light-receiving element, and generates a pulse signal including a pulse corresponding to a result of light reception by the light-receiving element;

a plurality of edge detectors each of which is provided for a corresponding one of the plurality of light-receiving sections, and generates a detection signal by detecting an edge of the pulse in the pulse signal generated by the corresponding one of the plurality of light-receiving sections; and an adder that generates a detection value indicating number of the pulses by performing addition processing on a basis of a plurality of the detection signals generated by the plurality of edge detectors, wherein each of the plurality of edge detectors includes a first latch circuit that generates a first signal by latching the pulse signal on a basis of a first clock signal, a second latch circuit that generates a second signal by latching the first signal on a basis of a second clock signal that is an inverted signal of the first clock signal, a combination circuit that generates a third signal on a basis of the pulse signal, the first signal, and the second signal, and a third latch circuit that generates the detection signal by latching the third signal on a basis of the first clock signal.

2. The photodetection device according to claim 1, wherein each of the plurality of edge detectors detects an edge of the pulse in a detection period based on the first clock signal and the second clock signal, and a pulse width of the pulse is equal to or larger than a time width of the detection period.

3. The photodetection device according to claim 2, wherein a time length of the detection period is a time length corresponding to a period of the first clock signal.

4. The photodetection device according to claim 1, further comprising a cumulative adder that generates an accumulated value by performing cumulative addition processing on a basis of the detection value.

5. The photodetection device according to claim 4, further comprising a counter that performs count processing, wherein the cumulative adder sets a flag active every time the accumulated value reaches a predetermined value, and the counter performs the count processing on a basis of the flag.

6. The photodetection device according to claim 1, wherein a plurality of the light-receiving elements is provided on a first semiconductor substrate, and the plurality of edge detectors is provided on a second semiconductor substrate bonded to the first semiconductor substrate.

7. A photodetection device comprising:

a plurality of light-receiving sections that each includes a light-receiving element, and generates a pulse signal including a pulse corresponding to a result of light reception by the light-receiving element;

a plurality of edge detectors each of which is provided for a corresponding one of the plurality of light-receiving sections, and generates a first detection signal and a second detection signal by detecting an edge of the pulse in the pulse signal generated by the corresponding one of the plurality of light-receiving sections;

a first adder that generates a first detection value indicating number of the pulses by performing addition processing on a basis of a plurality of the first detection signals generated by the plurality of edge detectors; and a second adder that generates a second detection value indicating number of the pulses by performing addition processing on a basis of a plurality of the second detection signals generated by the plurality of edge detectors, wherein each of the plurality of edge detectors includes a first latch circuit that generates a first signal by latching the pulse signal on a basis of a first clock signal, a second latch circuit that generates a second signal by latching the pulse signal on a basis of a second clock signal, a first combination circuit that generates a third signal on a basis of the pulse signal and the first signal, and a second combination circuit that generates a fourth signal on a basis of the pulse signal and the second signal, and each of the plurality of edge detectors generates the first detection signal on a basis of the third signal, and generates the second detection signal on a basis of the fourth signal.

8. The photodetection device according to claim 7, wherein each of the plurality of edge detectors further includes a third latch circuit that generates the first detection signal by latching the third signal on a basis of a third clock signal that is an inverted signal of the first clock signal, and a fourth latch circuit that generates the second detection signal by latching the fourth signal on a basis of a fourth clock signal that is an inverted signal of the second clock signal.

9. The photodetection device according to claim 7, wherein the second clock signal is an inverted signal of the first clock signal.

10. The photodetection device according to claim 7, wherein a phase of the second clock signal is different from a phase of the first clock signal.

11. The photodetection device according to claim 7, wherein each of the plurality of edge detectors detects an edge of the pulse in a detection period based on the first clock signal and the second clock signal, and a pulse width of the pulse is equal to or larger than a time width of the detection period.

12. The photodetection device according to claim 11, wherein the first clock signal changes between a first level and a second level, and a time length of the detection period is a time length of a period in which the first clock signal maintains the first level.

13. The photodetection device according to claim 7, further comprising a cumulative adder that generates an accumulated value by performing cumulative addition processing on a basis of the first detection value.

14. The photodetection device according to claim 13, further comprising a counter that performs count processing, wherein the cumulative adder sets a flag active every time the accumulated value reaches a predetermined value, and the counter performs the count processing on a basis of the flag.

15. The photodetection device according to claim 13, wherein the first detection value includes a third detection value and a fourth detection value, and the cumulative adder generates a first accumulated value by performing the cumulative addition processing on a basis of the third detection value, and generates a second accumulated value by performing the cumulative addition processing on a basis of the fourth detection value.

16. The photodetection device according to claim 15, further comprising a first counter and a second counter that perform count processing, wherein the cumulative adder sets a first flag active every time the first accumulated value reaches a predetermined value, and sets a second flag active every time the second accumulated value reaches the predetermined value, the first counter performs the count processing on a basis of the first flag, and the second counter performs the count processing on a basis of the second flag.

17. The photodetection device according to claim 7, wherein a plurality of the light-receiving elements is provided on a first semiconductor substrate, and

the plurality of edge detectors is provided on a second semiconductor substrate bonded to the first semiconductor substrate.

18. A photodetection system comprising:

a light-emitting section that emits light; and a photodetector that detects light reflected by a detection object of the light emitted from the light-emitting section, wherein the photodetector includes a plurality of light-receiving sections that each includes a light-receiving element, and generates a pulse signal including a pulse corresponding to a result of light reception by the light-receiving element, a plurality of edge detectors each of which is provided for a corresponding one of the plurality of light-receiving sections, and generates a detection signal by detecting an edge of the pulse in the pulse signal generated by the corresponding one of the plurality of light-receiving sections, and an adder that generates a detection value indicating number of the pulses by performing addition processing on a basis of a plurality of the detection signals generated by the plurality of edge detectors, and each of the plurality of edge detectors includes a first latch circuit that generates a first signal by latching the pulse signal on a basis of a first clock signal, a second latch circuit that generates a second signal by latching the first signal on a basis of a second clock signal that is an inverted signal of the first clock signal, a combination circuit that generates a third signal on a basis of the pulse signal, the first signal, and the second signal, and a third latch circuit that generates the detection signal by latching the third signal on a basis of the first clock signal.

19. A photodetection system comprising:

a light-emitting section that emits light; and

a photodetector that detects light reflected by a detection object of the light emitted from the light-emitting section, wherein the photodetector includes a plurality of light-receiving sections that each includes a light-receiving element, and generates a pulse signal including a pulse corresponding to a result of light reception by the light-receiving element, a plurality of edge detectors each of which is provided for a corresponding one of the plurality of light-receiving sections, and generates a first detection signal and a second detection signal by detecting an edge of the pulse in the pulse signal generated by the corresponding one of the plurality of light-receiving sections, a first adder that generates a first detection value indicating number of the pulses by performing addition processing on a basis of a plurality of the first detection signals generated by the plurality of edge detectors, and a second adder that generates a second detection value indicating number of the pulses by performing addition processing on a basis of a plurality of the second detection signals generated by the plurality of edge detectors, each of the plurality of edge detectors includes a fourth latch circuit that generates a first signal by latching the pulse signal on a basis of a first clock signal, a second latch circuit that generates a second signal by latching the pulse signal on a basis of a second clock signal, a first combination circuit that generates a third signal on a basis of the pulse signal and the first signal, and a second combination circuit that generates a fourth signal on a basis of the pulse signal and the second signal, and each of the plurality of edge detectors generates the first detection signal on a basis of the third signal, and generates the second detection signal on a basis of the fourth signal.

* * * * *